(12) United States Patent
Wang et al.

(10) Patent No.: US 7,491,263 B2
(45) Date of Patent: Feb. 17, 2009

(54) STORAGE ASSEMBLY

(75) Inventors: Xingwu Wang, Wellsville, NY (US);
Howard J. Greenwald, Rochester, NY (US)

(73) Assignee: Technology Innovation, LLC, Pittsford, NY (US)

( * ) Notice: Subject to any disclaimer, the term of this patent is extended or adjusted under 35 U.S.C. 154(b) by 680 days.

(21) Appl. No.: 11/151,073

(22) Filed: Jun. 13, 2005

(65) Prior Publication Data

US 2006/0163752 A1    Jul. 27, 2006

Related U.S. Application Data

(63) Continuation-in-part of application No. 11/099,055, filed on Apr. 5, 2005, now Pat. No. 7,425,232, which is a continuation-in-part of application No. 11/042,219, filed on Jan. 25, 2005.

(60) Provisional application No. 60/559,555, filed on Apr. 5, 2004.

(51) Int. Cl.
*F17C 11/00* (2006.01)

(52) U.S. Cl. .................. 96/108; 502/80; 502/526; 206/0.7; 977/962

(58) Field of Classification Search .................. 96/108, 96/154; 502/60, 80, 400, 415, 526; 206/0.7; 423/248, 648.1, 328.1; 977/813–815, 962
See application file for complete search history.

(56) References Cited

U.S. PATENT DOCUMENTS

| 3,268,313 | A | 8/1966 | Burgman |
|---|---|---|---|
| 3,421,873 | A | 1/1969 | Burgman |
| 3,510,393 | A | 5/1970 | Burgman |
| 3,599,861 | A | 8/1971 | DeMartini |
| 3,625,360 | A | 12/1971 | Schickel |
| 3,650,721 | A | 3/1972 | Hammel |
| 3,782,075 | A | 1/1974 | Kirkland |
| 3,804,741 | A | 4/1974 | Robson |
| 3,835,996 | A | 9/1974 | Singewald |
| 3,887,524 | A | 6/1975 | Kirchner |
| 3,891,537 | A | 6/1975 | Tokumoto |
| 3,920,781 | A | 11/1975 | Eror |
| 3,948,770 | A | 4/1976 | Goodrich |
| 3,948,771 | A | 4/1976 | Bielefeldt |
| 3,955,754 | A | 5/1976 | Schaper |
| 3,956,140 | A | 5/1976 | Nahm |
| 4,010,242 | A | 3/1977 | Iler |
| 4,015,773 | A | 4/1977 | Thylefors |

(Continued)

OTHER PUBLICATIONS

Lvov, Yuri M., Nanofabrication of Ordered Multilayers by Alternate Adsorbtion of Polyions, Nanoparticles and Proteins: From Planar Films to Microtemplates, from latech.edu, Mar. 27, 2005, http://www2.latech.edu/-ylvov/research.html.

(Continued)

*Primary Examiner*—Frank M Lawrence
(74) *Attorney, Agent, or Firm*—Buchanan Ingersoll Rooney, P.C.

(57) ABSTRACT

A gas storage assembly that has an enclosure within which are disposed at least about 100 inorganic tubules are present for each cubic micron of volume of the enclosure. The assembly has a storage capacity of at least 20 grams of hydrogen per liter of volume of the enclosure.

62 Claims, 11 Drawing Sheets

U.S. PATENT DOCUMENTS

| | | |
|---|---|---|
| 4,017,303 A | 4/1977 | Koester |
| 4,019,934 A | 4/1977 | Takayama |
| 4,049,411 A | 9/1977 | Long |
| 4,050,915 A | 9/1977 | Brown |
| 4,066,526 A | 1/1978 | Yeh |
| 4,071,339 A | 1/1978 | Griffiths |
| 4,098,676 A | 7/1978 | Robson |
| 4,098,678 A | 7/1978 | Schwarzenbek |
| 4,115,563 A | 9/1978 | John |
| 4,116,824 A | 9/1978 | Somkaite |
| 4,129,249 A | 12/1978 | Todd |
| 4,150,099 A | 4/1979 | Robson |
| 4,152,404 A | 5/1979 | Farmer |
| 4,158,521 A | 6/1979 | Anderson |
| 4,178,695 A | 12/1979 | Erbeia |
| 4,201,570 A | 5/1980 | Fitch |
| 4,241,035 A | 12/1980 | Farmer |
| 4,247,392 A | 1/1981 | Goncharov |
| 4,252,799 A | 2/1981 | Feigelson |
| 4,261,507 A | 4/1981 | Baumler |
| 4,315,918 A | 2/1982 | Gayst |
| 4,335,139 A | 6/1982 | Watts |
| 4,339,072 A | 7/1982 | Hiller |
| 4,343,604 A | 8/1982 | Minjolle |
| 4,374,146 A | 2/1983 | Phillips |
| 4,375,406 A | 3/1983 | Santilli |
| 4,378,289 A | 3/1983 | Hunter |
| 4,394,253 A | 7/1983 | Van Nordstrand |
| 4,413,771 A | 11/1983 | Rohde |
| 4,413,772 A | 11/1983 | Rohde |
| 4,413,773 A | 11/1983 | Rohde |
| 4,415,711 A | 11/1983 | Jones |
| 4,421,699 A | 12/1983 | Inoguchi |
| 4,446,244 A | 5/1984 | Van Nordstrand |
| 4,457,746 A | 7/1984 | Feterl |
| 4,470,695 A | 9/1984 | Holzhauser |
| 4,478,718 A | 10/1984 | Saget |
| 4,490,407 A | 12/1984 | Lafon |
| 4,505,833 A | 3/1985 | Lipowski |
| 4,509,985 A | 4/1985 | Davidovits |
| 4,515,688 A | 5/1985 | Vargas |
| 4,518,704 A | 5/1985 | Okabayashi |
| 4,522,752 A | 6/1985 | Sisto |
| 4,523,748 A | 6/1985 | Latter |
| 4,533,468 A | 8/1985 | Ensor |
| 4,547,286 A | 10/1985 | Hsiung |
| 4,608,357 A | 8/1986 | Silverman |
| 4,626,279 A | 12/1986 | Bjornberg |
| 4,637,990 A | 1/1987 | Torobin |
| 4,648,864 A | 3/1987 | Evans |
| 4,650,569 A | 3/1987 | Vargas |
| 4,671,909 A | 6/1987 | Torobin |
| 4,673,491 A | 6/1987 | Sedlaczek |
| 4,729,760 A | 3/1988 | Saget |
| 4,743,545 A | 5/1988 | Torobin |
| 4,748,121 A | 5/1988 | Beaver |
| 4,762,709 A | 8/1988 | Sheumaker |
| 4,772,475 A | 9/1988 | Fukui |
| 4,793,980 A | 12/1988 | Torobin |
| 4,797,286 A | 1/1989 | Thakkar |
| 4,798,630 A | 1/1989 | Dunaway |
| 4,810,734 A | 3/1989 | Kawasumi |
| 4,824,429 A | 4/1989 | Keunen |
| 4,838,606 A | 6/1989 | Furubayashi |
| 4,853,230 A | 8/1989 | Lovgren |
| 4,867,917 A | 9/1989 | Schnur |
| 4,867,931 A | 9/1989 | Cochran, Jr. |
| 4,877,501 A | 10/1989 | Schnur |
| 4,889,885 A | 12/1989 | Usuki |
| 4,904,624 A | 2/1990 | Yeckley |
| 4,911,981 A | 3/1990 | Schnur |
| 4,919,932 A | 4/1990 | Limbert |
| 4,929,444 A | 5/1990 | Johnston |
| 4,931,242 A | 6/1990 | Uchimura |
| 4,941,904 A | 7/1990 | Barch |
| 4,944,883 A | 7/1990 | Schoendorfer |
| 4,960,450 A | 10/1990 | Schwarz |
| 4,960,571 A | 10/1990 | Bhagat |
| 4,990,291 A | 2/1991 | Schoen |
| 4,992,112 A | 2/1991 | Reuter |
| 4,992,271 A | 2/1991 | Hanisch |
| 4,997,655 A | 3/1991 | Nagy |
| 5,030,600 A | 7/1991 | Hida |
| 5,049,382 A | 9/1991 | Price |
| 5,053,127 A | 10/1991 | Schoendorfer |
| 5,055,307 A | 10/1991 | Tsuru |
| 5,112,619 A | 5/1992 | Thakkar |
| 5,133,974 A | 7/1992 | Paradissis |
| 5,147,045 A | 9/1992 | Chi |
| 5,156,856 A | 10/1992 | Iwasaki |
| 5,171,206 A | 12/1992 | Marque |
| 5,173,488 A | 12/1992 | Haeger |
| 5,174,935 A | 12/1992 | Kubicek |
| 5,178,814 A | 1/1993 | Lemond |
| 5,182,014 A | 1/1993 | Goodman |
| 5,182,020 A | 1/1993 | Grimwood |
| 5,212,143 A | 5/1993 | Torobin |
| 5,215,697 A | 6/1993 | Toki |
| 5,229,014 A | 7/1993 | Collins |
| 5,246,689 A | 9/1993 | Beck |
| 5,256,270 A | 10/1993 | Tokumoto |
| 5,294,393 A | 3/1994 | Toki |
| 5,296,175 A | 3/1994 | Iwasaki |
| 5,300,300 A | 4/1994 | Egidio |
| 5,306,616 A | 4/1994 | Lupski |
| 5,314,685 A | 5/1994 | Tyla |
| 5,333,378 A | 8/1994 | Sjobom |
| 5,358,719 A | 10/1994 | Mellul |
| 5,360,616 A | 11/1994 | Garza Flores |
| 5,384,133 A | 1/1995 | Boyes |
| 5,397,759 A | 3/1995 | Torobin |
| 5,445,829 A | 8/1995 | Paradissis |
| 5,464,057 A | 11/1995 | Albano |
| 5,492,696 A | 2/1996 | Price |
| 5,512,203 A | 4/1996 | Kolattukudy |
| 5,530,052 A | 6/1996 | Takekoshi |
| 5,542,543 A | 8/1996 | Yasukuni |
| 5,561,976 A | 10/1996 | Chu |
| 5,562,919 A | 10/1996 | Doty |
| 5,576,012 A | 11/1996 | Bauer |
| 5,587,179 A | 12/1996 | Gergely |
| 5,593,744 A | 1/1997 | Van Vechten |
| 5,615,976 A | 4/1997 | Fujimoto |
| 5,633,014 A | 5/1997 | Garza Flores |
| 5,641,622 A | 6/1997 | Lake |
| 5,643,604 A | 7/1997 | Angeles Uribe |
| 5,651,925 A | 7/1997 | Ashley |
| 5,651,976 A | 7/1997 | Price |
| 5,653,951 A | 8/1997 | Rodriguez |
| 5,656,289 A | 8/1997 | Cho |
| 5,674,173 A | 10/1997 | Hlavinka |
| 5,701,191 A | 12/1997 | Iwasaki |
| 5,704,490 A | 1/1998 | Reynard |
| 5,705,191 A | 1/1998 | Price |
| 5,707,439 A | 1/1998 | Takekoshi |
| 5,714,025 A | 2/1998 | Brungardt |
| 5,722,923 A | 3/1998 | Lui |
| 5,753,736 A | 5/1998 | Bhat |
| 5,776,618 A | 7/1998 | Lu |
| 5,792,039 A | 8/1998 | Green |
| 5,816,322 A | 10/1998 | Albano |
| 5,820,302 A | 10/1998 | Roberts |
| 5,829,598 A | 11/1998 | Whitlock |
| 5,834,019 A | 11/1998 | Gergely |

| | | |
|---|---|---|
| 5,839,271 A | 11/1998 | Illbruck |
| 5,843,211 A | 12/1998 | Bielefeldt |
| 5,874,091 A | 2/1999 | Grollier |
| 5,906,570 A | 5/1999 | Langley |
| 5,906,792 A | 5/1999 | Schulz |
| 5,910,322 A | 6/1999 | Rivett |
| 5,913,768 A | 6/1999 | Langley |
| 5,939,319 A | 8/1999 | Hlavinka |
| 5,951,877 A | 9/1999 | Langley |
| 6,013,206 A | 1/2000 | Price |
| 6,039,977 A | 3/2000 | Venkatraman |
| 6,040,330 A | 3/2000 | Hausheer |
| 6,051,146 A | 4/2000 | Green |
| 6,063,019 A | 5/2000 | Wade |
| 6,063,313 A | 5/2000 | Briskin |
| 6,071,422 A | 6/2000 | Hlavinka |
| 6,074,453 A | 6/2000 | Anderson |
| 6,132,534 A | 10/2000 | Roberts |
| 6,143,052 A | 11/2000 | Kiyokawa |
| 6,149,942 A | 11/2000 | Scheiwe |
| 6,150,410 A | 11/2000 | Engh |
| 6,159,538 A | 12/2000 | Rodriguez |
| 6,180,608 B1 | 1/2001 | Gefter |
| 6,197,395 B1 | 3/2001 | Van Vechten |
| 6,197,787 B1 | 3/2001 | Franson |
| 6,197,849 B1 | 3/2001 | Zilg |
| 6,231,980 B1 | 5/2001 | Cohen |
| 6,248,771 B1 | 6/2001 | Shenoy |
| 6,267,899 B1 | 7/2001 | Greig |
| 6,268,385 B1 | 7/2001 | Whittle |
| 6,280,759 B1 | 8/2001 | Price |
| 6,290,753 B1 | 9/2001 | Maeland |
| 6,290,771 B1 | 9/2001 | Kim |
| 6,290,919 B1 | 9/2001 | Yokoyama |
| 6,294,108 B1 | 9/2001 | Speronello |
| 6,294,142 B1 | 9/2001 | Nazri |
| 6,294,153 B1 | 9/2001 | Modi |
| 6,303,626 B1 | 10/2001 | Abramovici |
| 6,309,623 B1 | 10/2001 | Weers |
| 6,320,148 B1 | 11/2001 | Yoon |
| 6,323,451 B1 | 11/2001 | Stencel |
| 6,329,623 B1 | 12/2001 | Yan |
| 6,354,986 B1 | 3/2002 | Hlavinka |
| 6,387,398 B1 | 5/2002 | Vollhardt |
| 6,391,340 B1 | 5/2002 | Malmqvist-Granlund |
| 6,401,816 B1 | 6/2002 | Price |
| 6,433,040 B1 | 8/2002 | Dellamary |
| 6,452,564 B1 | 9/2002 | Schoen |
| 6,461,621 B1 | 10/2002 | Gagnebien |
| 6,498,313 B1 | 12/2002 | Stencel |
| 6,506,972 B1 | 1/2003 | Wang |
| 6,517,800 B1 | 2/2003 | Cheng |
| 6,521,599 B2 | 2/2003 | Ponsati Obiols |
| 6,531,507 B1 | 3/2003 | Pflaum |
| 6,565,885 B1 | 5/2003 | Tarara |
| 6,591,617 B2 | 7/2003 | Wolfe |
| 6,596,055 B2 | 7/2003 | Cooper |
| 6,617,020 B2 | 9/2003 | Zhou |
| 6,638,495 B2 | 10/2003 | Kabalnov |
| 6,648,997 B2 | 11/2003 | Stratton |
| 6,653,329 B1 | 11/2003 | Whittle |
| 6,667,323 B1 | 12/2003 | Whittle |
| 6,669,482 B1 | 12/2003 | Shile |
| 6,669,882 B2 | 12/2003 | Seok |
| 6,672,077 B1 | 1/2004 | Bradley |
| 6,673,999 B1 | 1/2004 | Wang |
| 6,674,009 B2 | 1/2004 | Fomperie |
| 6,698,267 B1 | 3/2004 | Olsson |
| 6,713,671 B1 | 3/2004 | Wang |
| 6,730,324 B2 | 5/2004 | Troczynski |
| 6,765,144 B1 | 7/2004 | Wang |
| 6,768,053 B1 | 7/2004 | Wang |
| 6,815,609 B1 | 11/2004 | Wang |
| 6,844,492 B1 | 1/2005 | Wang |
| 6,846,985 B2 | 1/2005 | Wang |
| 6,864,418 B2 | 3/2005 | Wang |
| 6,876,886 B1 | 4/2005 | Wang |
| 2004/0210289 A1 | 10/2004 | Wang |
| 2004/0226603 A1 | 11/2004 | Wang |
| 2004/0254419 A1 | 12/2004 | Wang |
| 2005/0025797 A1 | 2/2005 | Wang |
| 2005/0079132 A1 | 4/2005 | Wang |
| 2005/0107870 A1 | 5/2005 | Wang |
| 2005/0119725 A1 | 6/2005 | Wang |

OTHER PUBLICATIONS

Lueking, Angela et al., Hydrogen Storage in Carbon Nanotubes: Residual Metal Content and Pretreatment Temperature, from fuelcelltoday.com, Jul. 9, 2004, http://www.fuelcelltoday.com/FuelCellToday/IndustryInformation/IndustryInformationExternal/NewsDisplayArticle/O,1602,3159.00.html.

Atlas Mining Company Enters into Collaborative Agreement with NaturalNano Inc., from Industrialnewsupdate.com, Mar. 30, 2005, http://www.industrialnewsupdate.com/news/metals-mining/archives/2005/01/atlas_mining_co.pho.

S. White et al., "Fabricated Microvascular Networks," AFRL Technology Horizons, Apr. 2004, pp. 34-35 from http://www.afrlhorizons.com/Briefs/Apr04/OSR0305.html.

R. Price, "Microtubular Encapsulation Technology Developed by the Naval Research Laboratory," exact publication date unknown, but prior to Dec. 2004.

D. Swanson, "Halloysite Microtubules for Controlled Release," on-line presentation file of Montana State University, available at http://www.atlasmining.com/Microtubule-Research.ppt Exact publication date unknown but prior to Dec. 2004.

S.R. Levis et al., "Characterization of halloysite for use as a microtubular drug delivery system," International Journal of Pharmaceuticals 243 (2002) 125-134.

S.R. Levis et al., "Use of coated microtubular halloysite for the sustained release of diltiazem hydrochloride propranolol hydrochloride," International Journal of Pharmaceuticals 253 (2003) 145-157.

OHMCRAFT product application literature, "Thick Film on Steel fact sheet," Aug. 13, 2004, obtained from http://www.ohmcraft.com/PDFs/LiteratureDocuments/ThickFilmSteelFactSheet.pdf.

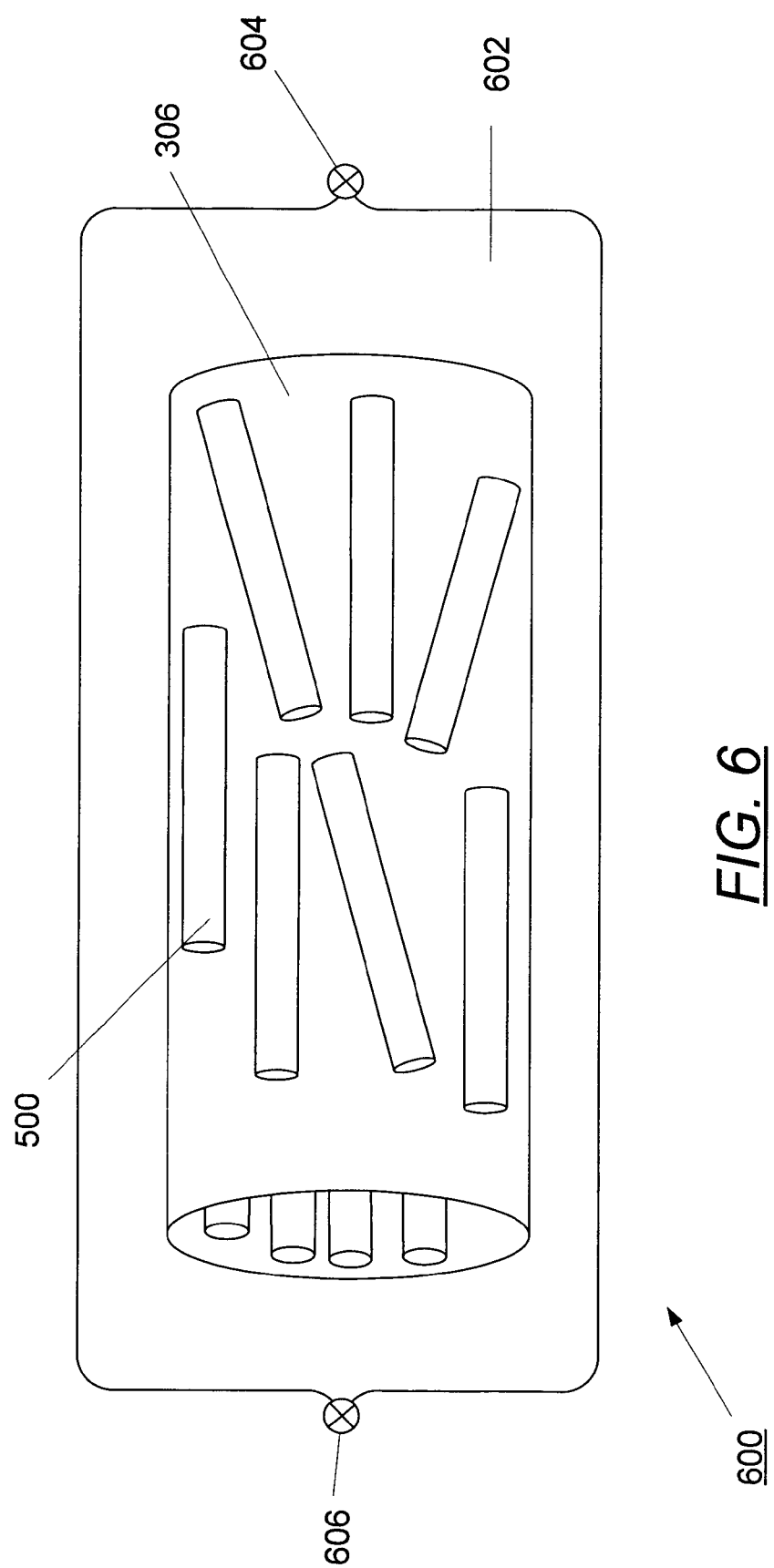

STORAGE ASSEMBLY

CROSS REFERENCE TO RELATED PATENT APPLICATIONS

This application is a continuation-in-part of applicants' patent application Ser. No. 11/099,055, filed on Apr. 5, 2005, now U.S. Pat No. 7,425,232, which in turn was a continuation-in-part of applicants' co-pending patent application U.S. Ser. No. 11/042,219, filed on Jan. 25, 2005, and which also claims priority from U.S. Provisional Application No. 60/559,555 filed Apr. 5,2004.

FIELD OF THE INVENTION

A storage assembly comprised of a tubules that is capable of storing at least about 20 grams of hydrogen per liter of volume of such assembly. In one embodiment, such tubules are halloysite rods.

BACKGROUND OF THE INVENTION

Molecular hydrogen, $H_2$, has been examined as a possible alternative fuel source. Unfortunately, molecular hydrogen also has numerous drawbacks that have prevented its wide scale use as a fuel. One such disadvantage is the gaseous state of molecular hydrogen. Hydrogen gas is exceptionally difficult to store and transport. The prior art is replete with attempts to design simple, inexpensive hydrogen storage devices to address this need. These attempts include U.S. Pat. No. 4,838,606 to Hunter (Hydrogen Storage System); U.S. Pat. No. 6,074,453 to Anderson (Ultrafine Hydrogen Storage Powders); U.S. Pat. No. 6,143,052 to Kiyokawa (Hydrogen Storage Material); U.S. Pat. No. 6,672,077 to Bradley (Hydrogen Storage in Nanostructure with Physisorption); U.S. Pat. No. 5,906,792 to Schulz (Nanocrystaline Composite for Hydrogen Storage); U.S. Pat. No. 5,653,951 to Rodriguez (Storage of Hydrogen in Layered Nanostructures); and the like. The disclosure of each of these patents is hereby incorporated by reference into this specification.

Attempts have been made to provide hydrogen storage devices comprised of carbon nanotubes. By way of illustration, U.S. Pat. No. 5,653,951 of Rodriguez et al. describes a hydrogen storage device comprised of carbon nanotubes (see, e.g., claim 26).

The hydrogen storage efficiency carbon nanotubes is not that great, generally being less than about 15 grams of hydrogen per liter of storage volume. It is an object of this invention, in one embodiment thereof, to provide a storage assembly with a storage capability substantially greater than about 15 grams of hydrogen per liter of storage volume.

SUMMARY OF THE INVENTION

In accordance with this invention, there is provided an apparatus for storing gas which is comprised of an enclosure within which is disposed a multiplicity of tubules and molecular hydrogen, wherein at least 20 grams of hydrogen can be disposed within such enclosure per liter of storage volume of such enclosure.

BRIEF DESCRIPTION OF THE DRAWINGS

The invention will be described by reference to the following drawings, in which like numerals refer to like elements, and in which:

FIG. 6 is a schematic view of a substrate with halloysite rods disposed within a sealed storage container;

DESCRIPTION OF THE PREFERRED EMBODIMENTS

Figure 1:
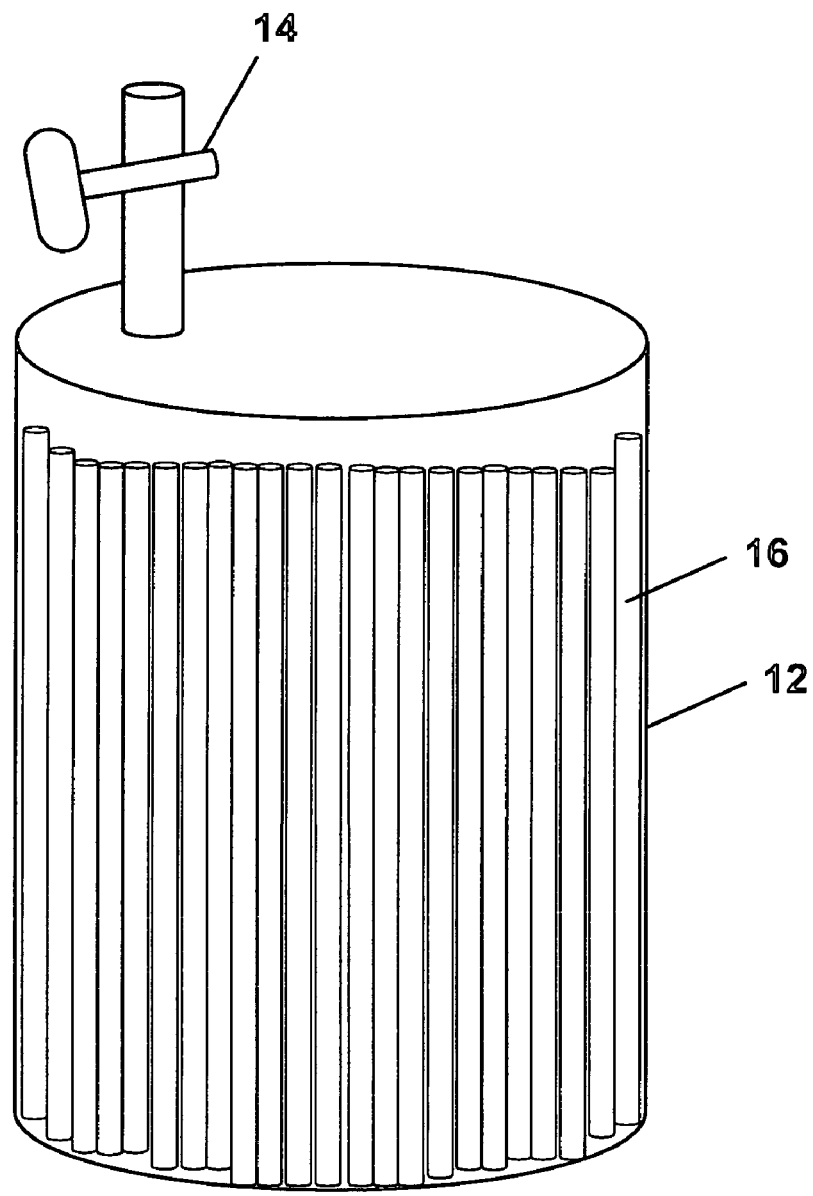
FIG. 1 is a schematic illustration of a test apparatus for testing the storage efficiency of the enclosure of this invention.

For a general understanding of the present invention, reference is made to the drawings. In the drawings, like reference numerals have been used throughout to designate identical elements.

Both carbon and non-carbon nanotubes are known, but only carbon nanotubes have been used as hydrogen storage devices. Other, non-carbon nanotubes are known to exist, but have not been utilized as hydrogen storage devices. As disclosed in U.S. Pat. No. 6,401,816 to Price (Efficient Method for Subsurface Treatments, Including Squeeze Treatments) "Several naturally occurring minerals will, under appropriate hydration conditions, form tubules and other microstructures . . . The most common of these is halloysite, an inorganic aluminosilicate belonging to the kaolnite group of clay minerals . . . . In hydrated form the mineral forms good tubules. In dehydrated form the mineral forms broken, collapsed, split or partially unrolled tubules." The entire content of U.S. Pat. No. 6,401,816 is hereby incorporated by reference into this specification. For additional information related to halloysite as well as other microtubule-like ceramics, reference may be had to U.S. Pat. No. 5,651,976 to Price (Controlled Release of Active Agents using Inorganic Tubules); U.S. Pat. No. 5,492,696 to Price (Controlled Release Microstructures); U.S. Pat. No. 5,705,191 to Price (Sustained Delivery of Active Compounds from Tubules, with Rational Control); U.S. Pat. No. 6,280,759 to Price (Method of Controlled Release and Controlled Release Microstructures); U.S. Pat. No. 5,246,689 to Beck (Synthetic Porous Crystalline Material Its Synthesis and Use); U.S. Pat. No. 4,098,676 to Robson (Synthetic Halloysites as Hydrocarbon Conversion Catalysts); U.S. Pat. No. 6,231,980 to Cohen (BX CY NZ Nanotubes and Nanoparticles); U.S. Pat. No. 4,960,450 to Schwarz (Selection and Preparation of Activated Carbon for Fuel Gas Storage); and the like. The content of each of the aforementioned United States patents is hereby incorporated by reference into this specification.

In one preferred embodiment, the enclosure of this invention is comprised of naturally occurring inorganic tubules.

These tubules are well known to those skilled in the art and often are a naturally occurring mineral such as, e.g., a clay mineral.

The tubules may be hydrated halloysite tubules. As is disclosed in U.S. Pat. No. 6,401,816, the entire disclosure of which is hereby incorporated by reference into this specification, "Several naturally occurring minerals will, under appropriate hydration conditions, form tubules and other microstructures suitable for use in the present invention. The most common of these is halloysite, an inorganic aluminosilicate belonging to the kaolinite group of clay minerals. See generally, Bates et al., "Morphology and structure of endellite and halloysite", American Mineralogists 35 463-85 (1950), which remains the definitive paper on halloysite. The mineral has the chemical formula $Al_2O_3 \cdot 2SiO_2 \cdot nH_2O$. In hydrated form the mineral forms good tubules. In dehydrated form the mineral forms broken, collapsed, split, or partially unrolled tubules."(See lines 46-57 of column 3)

The term "hydrated halloysite" is used in the claims of U.S. Pat. No. 4,019,934, the entire disclosure of which is hereby incorporated by reference into this specification. Claim 1 of this patent refers to an "inorganic gel." Claim 4 of the patent recites that "4. The inorganic gel-ammonium nitrate composite material as claimed in claim 1 wherein said inorganic gel is prepared from a material selected from the group consisting of hydrated halloysite and montmorillonite." As is disclosed in column 1 of such patent, "The purified and swollen inorganic gel prepared from a clay such as montmorillonite group, vermiculite, hydrated halloysite, etc., by the manner described hereinafter contains free water, bound water, and water of crystallization . . . . "

It should be noted that different terms are used for "hydrated halloysite." As is also disclosed in U.S. Pat. No. 6,401,816 (see lines 58-65 of column 3), "The nomenclature for this halloysite mineral is not uniform. In the United States, the hydrated tubule form of the mineral is called endellite, and the dehydrated form is called halloysite. In Europe, the hydrated tubule form of the mineral is called halloysite, and the dehydrated form is called is called meta-halloysite. To avoid confusion, mineralogists will frequently refer to the hydrated mineral as halloysite 10 .A., and the dehydrated mineral as halloysite 7 .A."

As is also disclosed in U.S. Pat. No. 6,401,816 (see the paragraph commencing on line 66 of column 3), it was reported by Bates et al. that the tube diameter of halloysite ranges from 400 to 1900 angstroms with a median value of 700 angstroms, the hole diameter of halloysite ranges from 200 to 1000 angstroms with a median value of 400 angstroms, and the wall thickness of halloysite ranges from 100 to 700 angstroms with a median value of 200 angstroms.

As is also disclosed in U.S. Pat. No. 6,401,816 (see the paragraph starting at line 9 of column 4), "Tube lengths range from 0.1 to about 0.75 μm. Morphologically, both hydrated and dehydrated halloysite comprise layers of single silica tetrahedral and alumina octahedral units. They differ in the presence or absence of a layer of water molecules between the silicate and alumina layers. The basal spacing of the dehydrated form is about 7.2 angstroms, and the basal spacing of the hydrated form is about 10.1 angstroms (hence the names halloysite 7 .A. and halloysite 10 .A). The difference, about 2.9.A., is about the thickness of a monolayer of water molecules."

As is also disclosed in U.S. Pat. No. 6,401,816 (see the paragraph beginning at line 19 of column 4), "A theory for the formation of hollow tubular microcrystals is presented in Bates et al. There is a lattice mismatch between the gibbsite ($Al_2O_3$) and silicate ($SiO_2$) layers. Water molecules interposed between the layers prevents "tetrahedral rotation" in the silicate layer. Halloysite 10 angstroms dehydrates to halloysite 7 .angstroms at about 110° C. All structural water is lost at about 575° C. The interlayer water in halloysite 10 .angstroms may be replaced by organic liquids such as ethylene glycol, di- and triethylene glycol, and glycerine."

In one embodiment, the tubule used in applicants' assembly is endellite. As is disclosed in U.S. Pat. No. 6,401,816, endellite is the hydrated form of halloysite; see, e.g., column 3 of such patent. Reference may also be had to U.S. Pat. No. 3,956,140 (drilling fluids), U.S. Pat. No. 4,375,406 (fibrous clay composition), U.S. Pat. No. 4,150,099 (synthetic halloysites), U.S. Pat. No. 4,158,521 (method of stabilizing clay formations), U.S. Pat. No. 4,421,699 (method for producing a cordierite body), U.S. Pat. No. 4,505,833 (stabilizing clayey formations), U.S. Pat. No. 4,509,985 (early high-strength mineral polymers), 4,828 U.S. Pat. No. 5,561,976 (release of active agents using in, 726 (stabilizing clayey formations), organic tubules), U.S. Pat. No. 5,820,302 microstructures is imogolite." Reference also may be had, e.g., to United States patents (aggregate mixtures and structures), and the like. The entire disclosure of each of these United States patents is hereby incorporated by reference into this specification.

In another embodiment, the tubule used in applicants' assembly is cylindrite. As is disclosed in U.S. Pat. No. 6,401,816 (see column 4), "Another mineral that will, under appropriate conditions, form tubules and other microstructures is cylindrite. Cylindrite belongs to the class of minerals known as sulfosalts." Reference may also be had, e.g., to U.S. Pat. Nos. 4,415,711, 5,561,976 (controlled release of active agents with inorganic tubules), U.S. Pat. No. 5,701,191 (sustained delivery of active compounds from tubules), U.S. Pat. No. 5,753,736 (dimensionally stable fibers), and the like. The entire disclosure of each of these United States patents is hereby incorporated by reference into this specification.

In another embodiment, tubule used in applicants' assembly is a sulfosalt known as "Boulangerite." Reference may be had, e.g., to column 4 of U.S. Pat. No. 6,401,816. Reference may also be had to U.S. Pat. Nos. 4,515,688; 4,626,279; 4,650,569; 5,182,014; 5,615,976 (inorganic tubules); U.S. Pat. No. 5,705,191 (sustained active delivery of compounds from tubules); U.S. Pat. No. 6,669,882 (process for making fiber having functional mineral powder), and the like. The entire disclosure of each of these United States patents is hereby incorporated by reference into this specification.

In another embodiment, the tubule used in applicants' assembly imogolite. Reference may be had, e.g., to U.S. Pat. No. 6,401,816 (see column 4). Reference also may be had, e.g., to U.S. Pat. No. 4,152,404 (synthetic imogolite), U.S. Pat. No. 4,241,035 (synthetic imogolite), U.S. Pat. No. 4,252, 799 (synthetic imogolite), U.S. Pat. No. 4,394,253 (imogolite catalyst), U.S. Pat. No. 4,446,244 (imogolite catalyst), and the like. The entire disclosure of each of these United States patents is hereby incorporated by reference into this specification.

In one preferred embodiment, and as is described in the claims of U.S. Pat. No. 5,651,976 (the entire disclosure of which is hereby incorporated by reference into this specification), the tubules used in applicants' assembly has an inner diameter of from about 200 angstroms to about 2000 angstroms and having lengths ranging from about 0.1 microns to about 2.0 microns. This patent claims (in claim 1)" I. A composition for use in the delivery of an active agent at an effective rate for a selected time, comprising: hollow mineral microtubules selected from the group consisting of halloysite. cylindrite, boulangerite, and imogolite, wherein said microtubules have inner diameters ranging from about 200 Angstroms to about 2000 Angstroms, and have lengths ranging from about 0.1 µm to about 2.0 µm, wherein said active agent is selected from the group consisting of pesticides, antibiotics, antihelmetics, antifouling compounds, dyes, enzymes, peptides. bacterial spores, fungi, hormones, and drugs and is contained within the lumen of said microtubules, and wherein outer and end surfaces of said microtubules are essentially free of said adsorbed active agent."

Although the term "diameter" is often used to refer to the maximum cross-sectional dimension of the hydrated halloysite tubules, the cross-sectional shape of such tubules is not necessarily circular. In one embodiment, such cross-sectional shape is circular. In another embodiment, such cross-sectional shape is rectangular. In yet another embodiment, such cross-sectional shape is square. In yet another embodiment, such cross-sectional shape is irregular. Whenever the term "diameter" is used in this specification to refer to tubules, it is to be understood that such term refers to the maximum cross-sectional dimension.

It is preferred that the tubules used in the assemblies and compositions of this invention be inorganic, i.e., that they contain no carbon. In one embodiment, such tubules are organic and contain hydrocarbon moieties.

Thus, e.g., some or all of the tubules may be ". . . biologically-derived, high-aspect rod-shaped particles of microscopic dimensions . . . ," as that term is defined and describe in U.S. Pat. No. 6,452,564, the entire disclosure of which is hereby incorporated by reference into this specification. Claim 2 of this patent describes "2. The composite of claim 1 wherein said microtubules comprise biologically-derived, high-aspect rod-shaped particles of microscopic dimensions having an electroless plated conductive coating thereon." In the specification of such patent, it is disclosed that "Considering the aforementioned microtubules in more detail, these microtubules are preferably a system of biologically-derived, high-aspect ratio, rods or tubes of microscopic dimensions, and are made electrically conductive by electroless plating as discussed above. As indicated above, the microtubules . . . are based on research done a number of years ago, wherein researchers at the Naval Research Laboratories in Washington, D.C., discovered particles with the size and shape appropriate for percolation. These microtubules are biologically derived, hollow organic cylinders of half-micron diameter and lengths of tens to hundreds of microns. The cylinders are coated with metal to render them conductive by an electroless process. Once metallized, the microtubules can be dried to a powder and dispersed into polymer matrices at varying loading densities to form the composite."

U.S. Pat. No. 6,452,564 also discloses that "In a preferred embodiment, the microtubules are formed from diacetylenic lipid (1,2 bis(tricosa-10,12-diynoyl)-sn-glycero-3-phosphocholine), or DC8,9PC. See, for example, A. N. Lagarkov and A. K. Sarychev, Phys. Rev. B 53, 6318 (1996) and F. Behroozi, M. Orman, R. Reese, W. Stockton, J. Calvert, F. Rachfold and P. Schoen, J. Appl. Phys. 68, 3688 (1990). The lipid is dissolved in alcohol at 50° C., water is added, and the temperature lowered to room temperature. The lipid self-assembles itself into microtubules and subsequently precipitates. The particles are rinsed and coated with a palladium catalyst and mixed with metal ions and reductants. In contact with the catalyst, the metal ions-are reduced to neutral metal on the surface of the microtubules and coat the structure with a conductive layer of metal of several tenths of a micron thickness. Several metal species are available for use in this process, but nickel and copper appear to be of greatest potential usefulness for the present invention."

By way of further illustration, the organic microtubules may be made by the process described in U.S. Pat. No. 6,013, 206, the entire disclosure of which is hereby incorporated by reference into this specification. Claim 1 of this patent discloses that "1. A method of forming lipid microtubules, comprising the steps of: dissolving a lipid in a methanol/ethanol/water solvent in which the vol % of methanol is about 50 to about 95 based on the total combined volume of methanol and ethanol, and the total combined vol % of methanol and ethanol is about 60 to about 90, based on the total volume of said methanol/ethanol/water solvent; allowing lipid microtubules to self-assemble in said methanol/ethanol/water solvent; and separating said formed lipid microtubules from said methanol/ethanol/water solvent."

By way of further illustration, U.S. Pat. No. 6,280,759, the entire disclosure of which is hereby incorporated by reference into this specification, discloses that "It is further known that polymerizable phospholipids form hollow cylindrical structures which are commonly referred to as tubules. These are described in U.S. Pat. Nos. 4,877,501 and 4,990,291. The efficient synthesis of these compounds is fully described in U.S. Pat. No. 4,867,917 entitled "Method for Synthesis of Diacetylenic Compounds". The methods necessary to coat these microstructures with a range of metals is fully described in U.S. Pat. No. 4,911,981 entitled "Metal Clad Lipid Microstructures". These tubules are hollow tube-shaped microstructures fabricated by self organization of polymerizable diacetylenic phospholipid molecules. Morphologically, tubules are analogous to soda straws with diameters of approximately 0.05 to 0.7 µm and lengths from 1 to 1,000 µm. The tubule diameter, the length and the number of bilayers comprising the wall are all controllable parameters which are controlled by the fabrication methods employed."

U.S. Pat. No. 6,280,759 also discloses that "The preparation of tubules is also discussed in an article by Schnur et al., "Lipid-based Tubule Microstructures", Thin Solid Films, 152, pp. 181-206, (1987) and the articles cited therein. That same article, in which one of the inventors is a co-author, also describes metal coating tubules and using them as microvials to entrap, transport and deliver polymeric reagents to a desired site. However, there is no suggestion of using such tubules for controlled release of an active agent.

Burke et al, ("Entrapment of 6-Carboxyfluorescein within Cylindrical Phospholipid Microstructures", Thomas G. Burke, Alok Singh, Paul Yager, Annals of the New York Academy of Sciences. Biological Approaches to the Controlled Delivery of Drugs, Ed. R. L. Juliano, 507, 330-333 (1987)) disclose the entrapment of the hydrophilic fluorophore, 6-carboxyfluorescein, in the lumens of such tubules. The movement of liposomes within the tubule is reported. Again, there is no suggestion of utilizing such tubules for the slow, controlled release of an active agent."

The assembly of this invention is capable of storing a certain amount of gas per unit volume. This capability may be measured by the assembly depicted in FIG. 1 and with the process described in connection with such Figure.

FIG. 1 is a schematic of a test assembly 10 comprised of a container 12, a valve 14, and a multiplicity of halloysite tubules 16. As will be apparent to those skilled in the art, this container 12 is but one of the many enclosures which can be tested by the process described below to determine its hydrogen storage capacity.

In the preferred embodiment depicted in FIG. 1, the container 12 has a volume of 1 liter. In a standard test, conducted at a temperature of 25 degrees Celsius, hydrogen under a pressure of 2,000 pounds per square inch is flowed into the container for 10 minutes. Thereafter, the valve 14 is closed.

Referring again to FIG. 1, The mass of hydrogen that has flowed into the container 12 is then determined. With the preferred assembly of this invention, at least about 20 grams of hydrogen will flow into such container 12. In one embodiment, the storage capability of container 12 is at least about 21 grams of hydrogen and, more preferably, at least about 22 grams of hydrogen. In another embodiment, the storage capability of such container 12 is at least about 23 grams of hydrogen and, more preferably, at least about 24 grams of hydrogen.

The storage capacity of any of the enclosures of this invention may be tested in substantial accordance with the aforementioned procedure. The enclosure assembly to be tested (not shown) will preferably be sealed so that any hydrogen gas that enters into it cannot escape it, and the amount of hydrogen that is flowed into the container for 10 minutes at a pressure of 2,000 pounds will then be determined. Thereafter, the weight of such hydrogen (in grams) will be divided by the volume of enclosure (in liters) to determine the storage capacity (in grams of hydrogen per liter).

Container 12 is but one enclosure that may be used in applicants' invention, and it is comprised of the "hydrated halloysite" tubules. In one embodiment, when such halloysite tubules are used, it is preferred that the average length of such halloysite tubules be at least about 1 micron, and it is preferred that such tubules have an average outside diameter of at least about 10 nanometers and, more preferably, at least about 50 nanometers. In one embodiment, the average outside diameter is from about 80 to about 110 nanometers.

In one embodiment, at least about 100 of such halloysite tubules are present for each cubic micron of volume of such container 12. It is preferred to have at least about 150 of such tubules for each cubic micron of such volume in the enclosure of this invention.

Figure 1A:
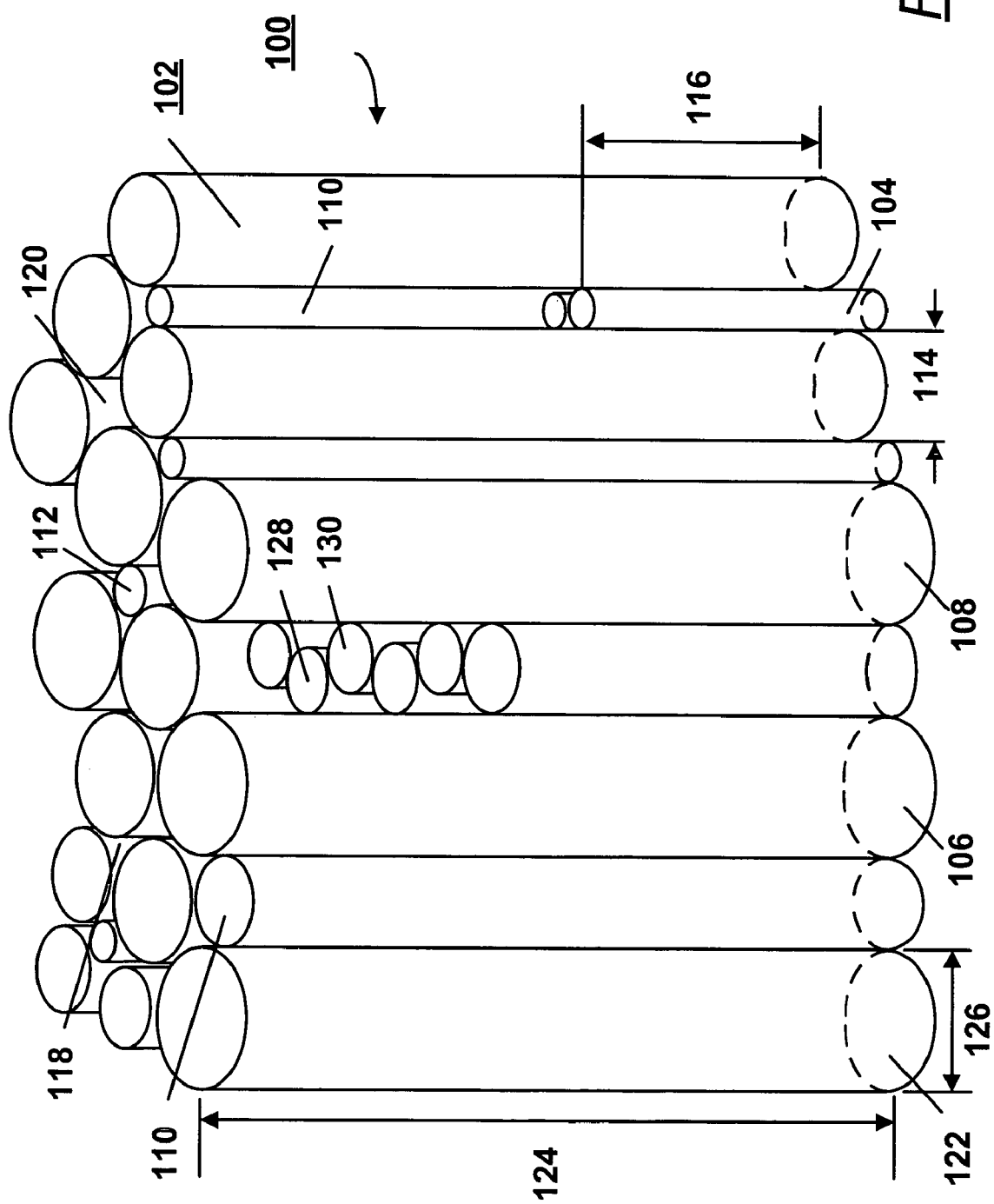
FIG. 1A is a schematic illustration of a multiplicity of tubules and glass beads disposed within the enclosure of FIG. 1.

FIG. 1A is a schematic illustration of a halloysite assembly 100 that is comprised of halloysite tubules 102, 104, 106, 108, 110, 112 which may have different outside diameters 114 and/or different lengths 116. As will be apparent, it is desirable to pack these tubules as efficiently as possible within an enclosure so as to minimize intertubular spaces 118, 120, etc. For the sake of simplicity of representation, the enclosure within which the halloysite assembly 100 is disposed is omitted in FIG. 1A.

Referring again to FIG. 1A, and in the preferred embodiment depicted, the halloysite assembly 100 may also contain porous glass fibers 122. These glass fibers are well known and are described, e.g., in U.S. Pat. No. 3,650,721 (method of forming micro-porous glass fibers), U.S. Pat. No. 4,050,915 (ferrule and use thereof for cooling a melt spun hollow glass fiber as it emerges from a spinnerette), U.S. Pat. No. 4,748,121 (porous glass fibers with immobilized biochemically active material), and the like. The entire disclosure of each of these U.S. Patents is hereby incorporated by reference into this specification.

By way of illustration, the porous glass fibers may be formed by the process claimed in U.S. Pat. No. 3,650,721. Claim 1 of this patent describes "The method of forming microporous fibers from a phase-separable borosilicate glass comprising a. melting said glass, b. drawing the glass at elevated temperatures into fibers of about 0.5 to about 20 microns diameter, c. phase separating the glass at an elevated temperature below the miscibility temperature of the glass in the range of from about 450° C. to about 750° C. for a sufficient time period to form a silica-rich phase and a substantially continuous borate-rich phase, d. cooling the phase-separated glass, and e. leaching the glass to remove a sufficient quantity of the borate-rich phase to form microporous fibers having interconnecting pores."

By way of yet further illustration, the porous glass fibers may be formed by the process described in U.S. Pat. No. 4,748,121, the entire disclosure of which is hereby incorporated by reference into this specification; and the porous glass fibers used in applicants' claimed enclosure, in one preferred embodiment, may the porous glass fibers made by the process of such U.S. Pat. No. 4,748,121, with or without "biochemically active material."

U.S. Pat. No. 4,748,121 claims (in claim 1) "1. Method of producing glass fibers with a discrete length having nonliving immobilized biochemically active material, comprising: a. forming sized glass fibers having a filament diameter from about 3 to about 150 microns and having a composition comprising greater than 35 up to about 60 weight percent $B_2O_3$, about 1 to about 10 weight percent alkali metal oxides, about 30 to about 65 weight percent $SiO_2$, up to about 5 weight percent $ZrO_2$, and up to about 4 weight percent $Al_2O_3$, b. gathering the sized fibers into one or more strands, c. collecting the one or more strands on a winder into a multi-layered package, d. removing the one or more glass fiber strands from the multilayered cylindrical package, e. heat treating the glass fibers at a temperature in the range of about 400° to about 600° C. for a period of time of about 10 minutes to about 64 hours to phase separate glass into a boron-rich phase and a silica-rich phase, f. water leaching the glass fibers at an elevated temperature, g. acid leaching the glass fibers at elevated temperatures with dilute inorganic or organic acid solutions to produce porous silica-rich fibers having a pore volume of about 0.5 to 1.5 cc/gm, h. contacting the porous fibers with one or more nonliving biochemically active materials to immobilize the material in the internal surface area and on the external surface area of the glass fibers, i. maintaining the activity of the nonliving biochemically active material on and in the glass fibers." Claim 8 of such patent describes "8. Porous silica rich glass fibers containing immobilized nonliving biochemically active material prepared by the method of claim 1."

In column 2 of U.S. Pat. No. 4,748,121, it is disclosed that the process of such patent can be used to make either hollow or solid porous glass fibers. At lines 34-50 of such column 2, it is disclosed that "The porous glass fibers with immobilized biochemically active materials are either hollow or solid silica-rich fibers. The fiber diameter can range from less than around 3 microns to around 150 microns or more. The lengths can vary from mere particles to discrete lengths of less than an inch, including as low as around 0.03 inch (0.08 cm) to any continuous fiber lengths. All of the fibrous material maintain at least a semblance of fiber characteristics ranging from a fibrous curvature for particles from fractured or broken fiber lengths to a complete fiber cylindrical form for the discrete lengths of fibers. The mean pore diameter of the majority of pores in the fibers can range from about 10 angstroms to about 3,000 angstroms. The biochemically active material immobilized on and/or in the fibers are maintained in an active state by the fibers being surrounded with a stabilizing fluid and/or temperature environment." For better understanding in the following disclosure and in the claims of the present application, the following terms have the following definitions.

U.S. Pat. No. 4,748,121 discloses that the porous glass fibers it discloses may contain "biochemically active material." This term is defined in the section of the patent beginning at line 65 of column 2, wherein it is disclosed that "The term 'biochemically active material' refers to natural or synthetic substances which are either biological or biochemical substances, or materials which are capable of interacting with a biological or biochemical substance, or material produced from a biochemical or biological substance, where these materials have chemical, biochemical or biological activity, catalytic activity or production capability. Nonexclusive examples of the biochemically active material include proteins; nucleic acids; nucleoproteins; polynucleotides; polynucleosides; lipoproteins; isozymes; lysozymes; co-enzymes including co-factors and prosthetic groups; hormones; endorphins; enkaphlins; peptides; apoenzymes; organic or inorganic matter constituting substrates for enzymes; hybridomas, antibodies including monoclonal antibodies; antigens; immunoglobulins; antigen-antibody complexes; lymphokines; and other immunological material; viruses; plasmids; growth factors; antibiotics; and living, dead and genetically transformed prokaryotic and eukaryotic cells such as bacterial, yeast, mold, fungi, plant, and animal cells including mammalian cells; bound dependent cells such as cells from insects, fish, reptiles, aves, mammals and other vertebrates and invertebrates where such cells, for instance, can be brain cells, epithelial cells, lung cells, heart cells, fibroblast cells, embryonic cells and cells from other organs of these creatures; and parts of cells such as cytoplasm, ectoplasm, endoplasm, karyolymp, karylosomes, nucleoli, chromatin, chondriosomes, mitrochondria, golgi bodies or trophospongium, where the parts of the cells or dead cells are capable of conducting or participating in at least one of the following chemical reactions, biological interactions, metabolism, growth, response to stimuli and reproduction. Typical examples of biochemically active proteins are various enzymes, nonexclusive examples of which include: oxidoreductases, hydroxylases, hydrolases, transferases, lyases, isomerases, ligases, etc. Examples of transferases are cretin phosphokinase, glycerol kinase, pyruvate kinase, hexokinase, etc. Examples of isomerases are glucose phosphate isomerase, alanine isomerase, glucose isomerase, etc. Typical examples of ligase is glutathione synthetase. Example of hydrolase are creatininase, cretinase, cephalosporinase, penicillinase, cephalosporin acylase, penicillin acylase, aminoacylase, urease, bromelein, papaine, chymotrypsin, trypsin, pepsin, galactosidase, glucosidase, amylase, phosphatase, cholesterolesterase, acetylchlolineesterase, phospholipase, lipase, etc. Examples of oxidoreductases are lipoxygenase, catalase, peroxidase, uricase, diaphorase, sarcosine oxidase, amine oxidase, amino acid oxidase, glutamic acid dehydrogenase, pyruvic acid oxidase, chlolineoxidase, galactoseoxidase, cholesteroloxidase, glucoseoxidase, 3-hydroxybutyrate dehydrogenase, glucose-6-phosphase dehydrogenase, galactose dehydrogenase, lactate dehydrogenase, glycerol phosphate dehydrogenase, glycerol dehydrogenase, alcohol dehydrogenase, biochemically or chemically modified enzymes and synthetic enzymes and the like."

At column 6 of U.S. Pat. No. 4,748,121 (beginning at line 15), it is disclosed how to make hollow glass fibers. The patent discloses that "The glass batch compositions are melted in a furnace at temperatures and times to obtain a fiberizable viscosity for the molten glass. Generally, the batch is heated to 2000° F. (1093° C.) to 3000° F. (1649° C.) for 1 hour to about 6 hours or longer. The molten glass is attenuated from the orifices of a bushing or spinnerets located on a forehearth connected to the furnace. The attenuation is conducted by mechanical means (winding or chopping) or thermal means by using heated fluid flow. Where the fibers are formed and attenuated as hollow glass fibers, they can be formed and attenuated by methods described in U.S. Pat. Nos. 3,268,313; 3,421,873; 3,510,393, all of which are hereby incorporated by reference. Any other method of forming and attenuating the fibers as known by those skilled in the art can also be used. The fibers may be cooled, treated with a chemical protecting agent, i.e., a sizing composition, and gathered into one or more strands and chopped or collected as continuous fibers or strands by any method known to those skilled in the art. U.S. Pat. Nos. 4,071,339 and 4,049,411, incorporated herein by reference are typical of such methods."

At column 9 of U.S. Pat. No. 4,748,121, beginning at line 16, it is disclosed that "The porous glass fibers of the invention, whether solid or hollow, are silica-rich, around 90% or more silica, and have a mean pore diameter controlled to be in the range of about 10 to about 3,000 angstroms from any of the aforementioned pore generating operations. The lengths vary from the particulate to continuous fibers, where discrete lengths of fibers have a pore volume in the range of about 0.5 to about 1.5 preferably about 0.5 to about 1.2 and fiber diameters from about 3 microns to 150 microns or more. To these glass fibers, the biochemically active material is applied and becomes associated with the glass fibers either by adsorption directly onto the glass surface or by entrapment through precipitation or by covalent bonding through a linking agent, or by crosslinking with a crosslinking agent."

In the process of U.S. Pat. No. 4,748,121, the "biochemically active material" is applied to the porous glass fibers (whether hollow or solid) after the formation of such fibers. In one embodiments of applicants' process, after the formation of such porous glass fibers, they are then admixed with a multiplicity of inorganic tubules (such as, e.g., hydrated halloysite tubules), and the "biochemically active material" is thereafter applied to the mixture, whereby it attaches itself to the porous glass fibers.

U.S. Pat. No. 4,748,121 discusses the application of the "biochemically active material" after the formation of the porous glass fibers at columns 9-12 of such patent, disclosing that: "In applying the biochemically active material to the porous glass fiber, where the biochemically active material is adsorbed on and into the glass fiber, the application is by combining the two materials. This combination can occur, for instance, in a column process in which the glass fibers are packed in a column, or in a batch process in which the glass fibers are dispersed in a vessel or are submerged and surrounded by the biochemically active material in a vessel. In immobilizing the biochemically active material on the glass fibers, a medium can be used to maintain the activity of the biochemically active material. Any medium may be employed which does not deactivate the particular biochemically active material. Preferably, pH buffered aqueous solutions are used for the nonliving biochemically active material. The solutions are adjusted to the various pH requirements of the particular biochemically active material in order to maintain the activity of the species without denaturing it. For example, useful pH buffered aqueous solutions include: acetate buffers of pH 4 to 6, phosphate buffers of pH 6 to 8, borate buffers to pH 8 to 9, and these can be used for enzymes, proteins and nonliving cells or parts of cells with activity levels in these pH ranges. For living cells and parts of cells and some immunological materials, the medium also includes nutrients to maintain the living activity of these biochemically active material. Any nutrient medium or culturing medium known to those skilled in the art of biochemistry and/or cellular biology to be useful for specific cells or parts of cells can be used." (See column 9, lines 31-60)

U.S. Pat. No. 4,748,121 also discloses that (in the paragraph beginning at lines 61 of column 9) "The adsorption is performed at a temperature at which the biochemically active material is not deactivated, usually at about 0° C. to about 40° C. The amount of biochemically active material used may be as much as that which saturates the adsorption capacity of the porous glass fibers. The quantity adsorbed on the glass fibers can be determined by the presence or absence of a degree of activity of the biochemically active species in an inert medium or by subjecting the immobilized biochemically active material to biochemical activity assay as known to those skilled in the art or by any other method known to those skilled in the art. For instance, a total protein assay can be conducted or a percentage of activity of total protein can be determined."

U.S. Pat. No. 4,748,121 also discloses that (in the paragraph beginning at lines 8 of column 10) "In bonding the biochemically active material to the porous glass fibers by the covalent bonding method, any known dual functional linking agent which has an inorganic functional moiety and an organic functional moiety can be used. The inorganic moiety attaches to the internal and external surfaces of the porous glass fibers and has the organic moiety available for covalent bonding with any reactable organic moiety of the biochemically active material. Examples of these linking agents include organofunctional silane coupling agents, organofunctional titanate complexes and any other organofunctional coupling agents known to those skilled in the art to be used with glass fibers. Also the linking agent can be a combination coupling agent, where the organo functional coupling agent is reacted with an intermediate compound which is reactable with the biochemically active material. An example of this method includes reacting a material such as glutaraldehyde with an amino-organo functional silane and either applying the reacted organo functional silane to the porous glass fibers or applying the amino-organo functional silane to the porous glass fiber and then treating the silynated glass fiber with the glutaraldehyde. A particularly suitable linking agent which can be used without an intermediate compound is the silyl aldehyde coupling agent available from Union Carbide under the trade designation Y9657. This material is unhydrolyzed, partially hydrolyzed, or fully hydrolyzed form is applied to the glass fibers. The silyl portion of the molecule reacts with the glass fiber surface leaving the aldehyde portion of the molecule available for reaction with the biochemically active material."

U.S. Pat. No. 4,748,121 also discloses that (in the paragraph beginning at lines 39 of column 10) "The organo functional coupling agent is applied to the porous glass fibers preferably in an aqueous treatment by having the porous glass fibers submerged in, sprayed with or contacted by the aqueous solution having the organo functional coupling agent. When an intermediate compound is used, it can also be applied in the same fashion and maintained in contact with the glass fiber for a period of time and at such temperatures to optimize the reaction of the intermediate compound with the linking agent. Examples of the intermediate compounds include the following: hexamethylene diisothiocyanate, toluene diisocyanate, xylene diisocyanate, glutaraldehyde, dialdehyde starch, dimethyl adipimidate, dimethyl suberimidate, dimethyl-3,3'-dithiobispropionimidate, succinic acid anhydride, croton aldehyde, acrolein, and the like material alone or in combination, whereby said compound is bonded to the biochemically active material directly or through an intermediate spacer compound such as lysine, hexamethylene diamine, and the like."

Referring again to FIG. 1A, and to the preferred embodiment depicted, the enclosure 100 may also contain hollow glass fibers. As is disclosed in U.S. Pat. No. 4,748,121, such hollow glass fibers may also be porous glass fibers. Means for making such hollow glass fibers are well known to those skilled in the art. Reference may be had, e.g., to U.S. Pat. No. 4,050,915 (ferrule and use thereof for cooling a melt spun hollow glass fiber as it emerges from a spinnerette), U.S. Pat. No. 4,748,121 (discussed in the preceding section of this specification), U.S. Pat. No. 4,941,904 (method and apparatus for forming hollow fibers), and the like. The entire disclosure of each of these United States patents is hereby incorporated by reference into this specification.

By way of illustration, U.S. Pat. No. 4,941,904 claims (in claim 1 thereof) "1. A method for producing a plurality of hollow glass fibers, comprising the steps of: feeding molten glass through a plurality of tips, supplying a pressurized gas or gaseous mixture through a delivery tube located concentrically within each said tip, injecting said gas or gaseous mixture into said molten glass through the discharge end of each said delivery tube at a distance greater than 0.066 inches beyond the terminus of each said tip up to a distance beyond which the formation of a hollow lumen is no longer possible inside said molten glass, attenuating, and simultaneously cooling said molten glass so as to produce a hollow glass fiber from each said tip with a length 124 of from about 500 nanometers to 1 millimeter, and preferably from about 800 nanometers to about 3 microns, and more preferably from about 900 to about 1100 nanometers."

Referring again to FIG. 1A, some or all of the porous glass fibers and/or the hollow glass fibers may be replaced by solid glass fibers. Regardless of which type(s) of glass fiber(s) is used, it is preferred that it be present in concentration of from about 1 to about 10 volume percent, by total volume of inorganic tubules and glass fiber.

Regardless of the type of glass fiber used, and referring again to FIG. 1A, the average outside diameter 126 of the glass fiber should preferably be from about 100 nanometers to 1 micron, and more preferably from about 200 to 400 nanometers. In one aspect of this embodiment, the average outside diameter 126 of the glass fiber is greater than the average outside diameter of the halloysite tubules, being at least about 1.5 times as great.

In one embodiment, the assembly 100 is comprised of less than 10 volume percent of such fibers 122. In one aspect of this embodiment, one uses from about 1 to 5 volume percent of such glass fibers, by total volume of such glass fibers and hydrated halloysite tubules.

Without wishing to be bound to any particular theory, applicants believe that the use of such porous glass fibers imparts a certain degree of mechanical integrity to assembly 100. It is preferred that such assembly 100 have a flexural strength of at least about 4 MegaPascals and, preferably, at least about 10 MegaFasacls. In one embodiment, such assembly has a flexural strength of at least about 100 MegaPascals.

Flexural strength is the strength of a material in bending, i.e., resistance to fracture, and it may be measured by means well known to those skilled in the art. Reference may be had, e.g., to U.S. Pat. No. 4,904,624 (silicon nitride with improved high temperature strength), U.S. Pat. No. 5,030,600 (novel sialon composition), U.S. Pat. No. 5,593,744 (hollow reinforcing members and composites containing the same), U.S. Pat. No. 6,197,395 (hollow reinforcing members and composites containing the same), and the like. The entire disclosure of each of these U.S. Patents is hereby incorporated by reference into this specification.

By way of illustration, and not limitation, U.S. Pat. No. 5,030,600 discusses one means of determining flexural strength, stating that "The sintered cylinders produced by the aforementioned treatment, when the composite material of this invention is used in the test, will have a flexural strength of from about 300 to about 900 megapascals and, preferably, from about 550 to about 700 megaPascals. The flexural strength of said cylinders is determined in accordance with A.S.T.M. Standard Test F-417-78, the disclosure of which is hereby incorporated by reference into this specification."

In one preferred embodiment, the enclosure assemblies of this invention have a compressive strength of at least about 2,000 kilograms per square centimeter when tested in accordance with the procedure of U.S. Pat. No. 6,290,771, the entire disclosure of which is hereby incorporated by reference into this specification.

U.S. Pat. No. 6,290,771 describes an "Activated kaolin powder compound for mixing with cement . . . ." In Examples 1 and 2 of this patent, a description is presented of a method for determining the compressive strength and the flexural strength of various mineral compositions.

The "Example 1" of U.S. Pat. No. 6,290,771 appears at column 7 of such patent. It discloses that "Cement of 450 g, activated kaolin of 50 g, sands of 1,500 g, water of 250g and superplasticizer of 5 g were mixed together. Specimens of mortar of 40×40×160 mm were prepared from the mixture. The specimens were wet-cured in a 3-in-1 mold for 24 hours, and water-cured for 28 days. Three specimens (Specimens I, II and III) were prepared."

The "Comparative Example 1" of U.S. Pat. No. 6,290,771 was also disclosed at such column 7. In such column 7, it was stated that "A conventional mortar was prepared. Cement of 500 g, sands of 1,500 g, water of 250 g and superplasticizer of 5 g were mixed together. Specimens of mortar of 40×40×160 mm were prepared from the mixture. The specimens were wet-cured in a 3-in-1 mold for 24 hours, and water-cured for 28 days. Three specimens (Specimens I, II and III) were prepared."

The "Comparative Example 2" of U.S. Pat. No. 6,290,771 also appeared in such column 7, wherein it was disclosed that "Comparative Example 2 was performed as in Example 1 with the exceptions that unactivated kaolin of 50 g was employed instead of the activated kaolin of 50 g. Three specimens (Specimens I, II and III) were prepared . . . . Flexural strength, compressive strength and water permeability were measured for the specimens of Example 1 and Comparative Examples 1 and 2. . . . Flexural strengths were measured according to Korean Industrial Standard KS L 5105. The distance of points was 100 mm and the applied force was 5 kg.multidot.force per second. The strengths of the specimens were shown in Table 6."

The results of these experiments were discussed at columns 7-8 of U.S. Pat. No. 6,290,771, wherein it was disclosed that "As shown in Table 6, the mortar according to the present invention (Example 1) has an increase of 14.9% of the conventional mortar (Comparative Example 1) in flexural strength. The mortar using unactivated kaolin (Comparative Example 2) shows a decrease of 27.3% of the conventional mortar (Comparative Example 1) in flexural strength."

U.S. Pat. No. 6,290,771 also discloses that (in column 7) "Compressive strengths were measured according to KS L 5105. The applied force was 80 kg.multidot.force per second. After measurement of the flexural strength, six specimens per Example were tested. The compressive strengths of the specimens were shown in Table 7. . . . As shown in Table 7, the mortar according to the present invention (Example 1) has an increase of 25.8% of the conventional mortar (Comparative Example 1) in compressive strength. The mortar using unactivated kaolin (Comparative Example 2) shows a decrease of 8.9% of the conventional mortar (Comparative Example 1) in compressive strength."

The best compressive strength obtainable in the experiments reported in U.S. Pat. No. 6,290,771 was 958 kilograms per square centimeter (see Table 7, Example 1). By comparison, when the experiments of U.S. Pat. No. 6,290,771 are repeated using applicants' enclosure assemblies, the compressive strength obtained is at least 2,000 kilograms per square centimeter. In one embodiment, the compressive strength so obtained is at least 3,000 kilograms per square centimeter. The term "compressive strength," as used in this specification (and in the claims of this case), refers to the value obtained when 50 grams of the composition in question is used in the test specified in U.S. Pat. No. 6,290,771.

In one preferred embodiment, the enclosure assembly of this invention, in addition to containing the inorganic tubules (such as, e.g., the hydrated halloysite tubules), also contains from about 1 to about 10 volume percent (and preferably from about 1 to about 5 volume percent) of microspheres which may be solid microspheres, hollow microspheres, or porous microspheres.

As is known to those skilled in the art, microspheres are spherical particles that are made of glass or ceramic or resins. There are at least two different types of glass microspheres, solid and hollow. Solid spheres, made of soda-lime glass, range in size from 4 to 5,000 microns in diameter. Hollow glass microspheres have densities ranging from about 5 to about 50 pounds per cubic foot.

In one preferred aspect of this embodiment, the microspheres used are porous microspheres. The manufacture and use of such microspheres is well known to those skilled in the art; reference may be had to U.S. Pat. No. 3,782,075 (completely porous microspheres for chromatographic uses), U.S. Pat. No. 4,010,242 (uniform oxide microspheres and a process for their manufacture), U.S. Pat. No. 4,743,545 (hollow porous microspheres containing biocatalyst) U.S. Pat. No. 4,793,980 (hollow porous microspheres as substrates and containers for catalyst), U.S. Pat. No. 4,671,909 (method for making hollow porous microspheres), U.S. Pat. No. 5,212,143 (hollow porous microspheres made from dispersed particle compositions), U.S. Pat. No. 5,306,616 (injectable pharmaceutical composition), U.S. Pat. No. 5,358,719 (porous microspheres coated with a perfluorinated oil, a fluorinated silicone oil or a silicone gum, and cosmetic compositions containing them), U.S. Pat. No. 5,512,203 (injectable pharmaceutical composition), U.S. Pat. No. 5,643,604 (parenteral dosage form), U.S. Pat. No. 5,633,014 (injectable pharmaceutical composition), U.S. Pat. No. 5,874,091 (cosmetic composition comprising a dispersion of lipid vesicles), U.S. Pat. No. 6,309,623 (stabilized preparations for use in metered dose inhalers), U.S. Pat. No. 6,461,621 (cosmetic composition in the form of a molded powder cake containing hollow microcapsules), U.S. Pat. No. 6,565,885 (method of spray drying pharmaceutical compositions), and the like. The entire disclosure of each of these United States patents is hereby incorporated by reference into this specification.

In one embodiment, the glass beads, such as the porous glass beads 128 and 130, preferably have a maximum dimension of from about 1 centimeter to about 1 millimeter and, more preferably, from about 200 to about 600 nanometers.

The microspheres used in the enclosure assemblies of this invention may be the porous microspheres disclosed in U.S. Pat. No. 3,782,075, the entire disclosure of which is hereby incorporated by reference into this specification. Claim 1 of this patent describes "In an apparatus for use in chromatographic separation comprising a region through which materials to be separated are passed, the improvement wherein said region comprises a plurality of uniform-sized porous microspheres having an average diameter of about 0.5 to about 20 microns, substantially all of said microspheres having a diameter ranging from about 0.5 to about 1.5 times the average diameter of the microspheres in said powder, said microspheres consisting essentially of a plurality of uniform-sized colloidal particles, having a refractory metal oxide surface, arranged in a interconnected three-dimensional lattice, said colloidal particles occupying less than 50% of the volume of said microspheres with the remaining volume being occupied by interconnected pores having a uniform pore size distribution."

The microspheres used in the enclosure assemblies of this invention may be made by the process described in U.S. Pat. No. 4,010,242, the entire disclosure of which is hereby incorporated by reference into this specification. This patent claims, in claim 1 thereof, "1. A process for forming uniform-sized inorganic microspheres comprising the steps of: a. forming an aqueous sol containing uniform-sized inorganic-refractory colloidal particles which have hydroxylated surfaces and which are dispersible in said aqueous sol, said colloidal particles being isodimensional or rod-shaped particles with at least two dimensions in the range of 5 to 500 millimicrons and a third dimension in the range of 5 to 1,000 millimicrons; b. forming a homogeneous solution of said aqueous sol with a polymerizable material comprising formaldehyde and a second organic material selected from the group consisting of urea and melamine; c. reducing the pH of said solution to a level at which polymerization of said polymerizable materials occurs to cause coacervation of said organic material and said colloidal particles into substantially spherical microspheres having a diameter of about 0.5 to about 20.0 microns and to initiate copolymerization of said organic materials, said colloidal particles being insoluble in the acid medium at the selected pH; d. solidifying the microspheres so formed; e. collecting, washing and drying said microspheres; and f. oxidizing said microspheres at elevated temperatures to burn off the organic material without melting said colloidal particles, whereby forming uniform-sized porous inorganic microspheres."

The properties of the porous microspheres of U.S. Pat. No. 4,010,242 are discussed in column 3 thereof, wherein it is disclosed that "Powders of uniform-sized, substantially spherical, microparticles having an average diameter of about 0.5 to about 20 microns, preferably 1.0 to 10 microns, are also within the scope of this invention. The microparticles in this powder have a diameter ranging from 0.5 to 1.5, preferably 0.8 to 1.2, times the average diameter of the microparticles in the powder, and are composed of a plurality of uniform-sized colloidal ultimate particles having an oxide surface and at least two dimensions in the range of 5 to 500 millimicrons with the third dimension in the range of 5 to 1000 millimicrons. These colloidal particles are arranged in a three-dimensional matrix within the polymer sphere. Prior to burning off the organic material, the particles will contain a large percentage of polymer, generally greater than 50% by volume. When the organic material is burned off at about 550° C. the colloidal particles form a lightly interconnected three-dimensional network of inorganic material surrounding a plurality of uniform-sized pores. The pore content of the microspheres remains high, normally greater than 50% by volume. On the other hand, the specific surface area of the particles after removal of the organic component at 550° C. is approximately equal to a comparable amount of the colloidal material. The particles of the present invention, therefore, constitute a unique structure with an extremely high pore volume and surface area and a uniform pore distribution. Furthermore, the size of the microparticles in the powder is extremely uniform. Less than 5% by weight of the particles have a particle diameter smaller than 0.5 times the average sphere diameter and less than 5% by weight have a sphere diameter greater than 1.5 times the average sphere diameter. Preferably the range is 0.8 to 1.2 times the average sphere diameter."

The microspheres used in the enclosure assemblies of this invention may be the porous mullite microspheres disclosed in U.S. Pat. No. 4,608,357, the entire disclosure of which hereby incorporated by reference into this specification. Claim 1 of this patent describes "Porous mechanically and thermally stable microspheres consisting essentially of mullite obtained from caustic leached calcined clay, said bodies having palladium impregnated thereon." These microspheres may be used in applicants' enclosures with or without such palladium.

U.S. Pat. No. 4,608,357 discloses that, when halloysite is calcined, it is converted into porous mullite. As is disclosed in column 5 of this patent. "Clays that are suitable for conversion into porous mullite are those which, upon calcination, are converted into mullite and free silica, e.g., kaolinites, halloysites, smectites, and illites. Prior to calcination, the clay is formed into agglomerates of a size and shape corresponding substantially to the size and shape of the support particles. For example, when the promoter product is to be used in the form of a fluidizable solid, the clay is spray dried to form microspheres which are calcined and then leached. The particle size distribution of the clay and its degree of agglomeration in the green bodies influence the macropore structure of the calcined body prior to leaching and this macroporosity is retained in the porous mullite after leaching."

The microspheres used in the enclosure assemblies of this invention may be the hollow porous microsphere catalysts described in U.S. Pat. No. 4,637,990, the entire disclosure of which is hereby incorporated by reference into this specification. Claim 1 of this patent describes "1. Hollow porous microsphere catalysts of substantially uniform diameter of 200 to 10,000 microns and of substantially uniform wall thickness of 1.0 to 1000 microns, the walls of said microspheres comprise sintered together particles which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, said walls include entrance means through which catalyst can be introduced into the interconnecting voids and into the single central cavity of the microspheres, said microspheres have catalyst on the particles forming the walls or have catalyst contained within the single central cavity or have catalyst on the particles forming the walls and have catalyst contained within the single central cavity, and the walls of said microspheres are free of latent solid or liquid blowing gas materials and are substantially free of relatively thinned wall portions or sections and bubbles."

The microspheres used in applicants' enclosure assemblies may be hollow porous microspheres, and these hollow porous microspheres may be made by the process described in U.S. Pat. No. 4,671,909, the entire disclosure of which is hereby incorporated by reference into this specification. Claim 1 of this patent describes "1. A method for making hollow porous microspheres of 200 to 10,000 microns diameter and of 1 to 1000 microns wall thickness from a stable dispersion of a dispersed particle film forming composition, said composition comprising dispersed particles in a continuous liquid phase, said method comprising feeding said dispersed particle composition and a blowing gas to a coaxial blowing nozzle, said coaxial blowing nozzle having an inner coaxial nozzle for said blowing gas and an outer coaxial nozzle for said dispersed particle composition and a coaxial blowing nozzle orifice, feeding said blowing gas to said inner nozzle, feeding said dispersed particle composition to said outer nozzle to blow and form, in the region of said coaxial blowing nozzle orifice, hollow dispersed particle composition microspheres having stable film walls, removing said hollow microspheres from the region of said coaxial blowing nozzle orifice, surface tension forces acting on said hollow microspheres to cause said hollow microspheres to form a spherical shape, treating said removed hollow microspheres to bring the dispersed particles into point to point contact and to harden them to obtain hollow green microspheres; and subjecting said hollow green microspheres to a sufficiently high temperature for a sufficient period of time to remove the continuous liquid phase from the hollow green microspheres and to sinter the dispersed particles at their points of contant and to form within the walls of said hollow microspheres interconnecting voids that are continuous from the outer wall surface to the inner wall surface of the hollow microspheres, and to obtain hollow porous microspheres having substantially uniform void content and substantially uniform distribution of the voids in the walls of the microspheres."

The microspheres used in the enclosure assemblies of this invention may be the rigid hollow porous microspheres described in U.S. Pat. No. 4,743,545, the entire disclosure of which is hereby incorporated by reference into this specification. Claim 1 of this patent describes "1. A bioreactor comprising rigid hollow porous microspheres of substantially uniform diameter of 200 to 10,000 microns and of substantially uniform wall thickness of 1 to 1000 microns, the walls of said microspheres comprise sintered together particles which define interconnecting voids within the walls, said microspheres having a single hollow central void forming intracapsular space in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, said walls including entrance means through which biocatalyst can be introduced into the intracapsular space, biocatalyst within the intracapsular space and fluid permeable means extending across said entrance means for immobilizing the biocatalyst within the intracapsular space, said entrance means being larger than the maximum dimension of said biocatalyst." The hollow porous microspheres of this patent are described at columns 6, 7, 8, and 9 of this patent, wherein it is disclosed that "The hollow porous inorganic microspheres provide the uniformly sized containers for the biocatalyst and the structural support for the permselective membrane. Suitable methods for manufacturing these microspheres and their physical properties and dimensions are disclosed in and are the subject matter of applicant's copending application Ser. No. 639,126 "Hollow Porous Microspheres And Method And Apparatus For Producing Them" filed on Aug. 9, 1984. The entire disclosure of the copending application is incorporated herein in its entirety by reference thereto."

U.S. Pat. No. 4,743,545 also discloses that "Quite briefly, the hollow porous microspheres are made from aqueous or non-aqueous suspensions or dispersions of finely divided inorganic or organic solid particles, particularly ceramic, glass, metal and metal glass particles, having particle diameters in the range of from about 0.01 to 10 microns (μ), a binder material, a film stabilizing agent, a dispersing agent for the solid particles, and a continuous aqueous or non-aqueous liquid phase. The suspension or dispersion is blown into microspheres using a coaxial blowing nozzle, the microspheres are heated to evaporate the solvent and further heated or cooled to harden the microspheres. The hardened microspheres are then subjected to elevated temperatures to decompose and remove the binder and any residual solvent or low boiling or melting materials. The resulting porous hollow microspheres are then fired at further elevated temperatures to cause the particles to sinter and/or fuse at the points of contact of the particles with each other such that the particles coalesce to form a strong rigid network (lattice structure) of the sintered-together particles."

U.S. Pat. No. 4,743,545 also discloses that "The application Ser. No. 639,126 discloses a method and apparatus for using a coaxial blowing nozzle and a blowing gas to blow hollow microspheres from a continuous liquid phase and dispersed particle film forming composition comprising feeding the blowing gas to an inner coaxial nozzle, feeding the dispersed particle film forming composition to an outer coaxial nozzle, forming spherically shaped hollow microspheres in the region of the orifice of the coaxial blowing nozzle and removing the hollow microspheres from the region of the orifice of the coaxial blowing nozzle. An embodiment of the method and apparatus is to use a transverse jet entraining fluid to assist in the microsphere formation and the detaching of the hollow microspheres from the blowing nozzle. The continuous liquid phase of the dispersed particle film forming composition allows the hollow microspheres to be blown by forming a stable film to contain the blowing gas while the hollow microsphere is being blown and formed. The dispersed particles in the dispersed particle composition, as the dispersed particle composition is forming the hollow microsphere and after the microsphere is formed, link up with each other to form a rigid or relatively rigid lattice work of dispersed particles which dispersed particle lattice work with the binder and continuous liquid phase comprise the hollow green microspheres. The hollow microspheres after they are formed can be hardened in ambient atmosphere or by heating and removing a portion of the continuous phase. The hardened hollow green microspheres have sufficient strength for handling and further treatment without significant breaking or deforming of the microspheres."

U.S. Pat. No. 4,743,545 also discloses that "The hardened green microspheres are treated at elevated temperatures to remove the remainder of the continuous liquid phase and volatile materials such as binder, film stabilizing agent and dispersing agent. The treatment at elevated temperatures sinters and coalesces the dispersed solid particles to form rigid hollow porous microspheres that are substantially spherical in shape, have substantially uniform diameters and have substantially uniform wall thickness. The heating at elevated temperatures, in removing the continuous phase and added materials, creates interconnecting voids in the walls of the microspheres which result in the porous characteristics of the microspheres. The sintering and coalescing of the dispersed solid particles, depending on the time and temperature of the heating step can cause a small degree of compaction of the dispersed particles and can cause the coalescing of the particles at the points in which they are in contact to form rigid, uniform size and shaped microspheres of uniform wall thickness, uniform void content and uniform distribution of voids in the walls and high strength. Because the porosity is a result of the removal of the continuous phase from uniformly dispersed solid particles, the pores are continuous from the outer wall surface of the microsphere to the inner wall surface of the microsphere and the walls of the microspheres have substantially uniform void content and uniform distribution of the voids that are created."

U.S. Pat. No. 4,743,545 also discloses that "The hollow porous microspheres preferably are substantially spherical, have substantially uniform diameters, and have substantially uniform wall thickness and the walls have uniform void content and void distribution and voids which are connected to each other and to the inner and outer microsphere wall surfaces. The walls of the hollow porous microspheres are free of latent solid or liquid blowing gas materials, and are substantially free of relatively thinned wall portions or sections and bubbles."

U.S. Pat. No. 4,743,545 also discloses that "The hollow green microspheres and hollow porous microspheres made in accordance with method and apparatus of application Ser. No. 639,126 can be made from a wide variety of film forming dispersed particle compositions, particularly dispersed ceramic, glass, metal, metal glass and plastic particle compositions and mixtures thereof. The dispersed particle compositions comprise an aqueous or nonaqueous continuous liquid phase and have the necessary viscosities when being blown to form stable films. The hollow microsphere stable film wall after the microsphere is formed rapidly changes from liquid to solid to form hollow green microspheres. The hollow green microspheres can be substantially spherical in shape and can be substantially uniform in diameter and wall thickness."

U.S. Pat. No. 4,743,545 also discloses that "The hollow green microspheres as they are being formed and/or after they are formed can have a portion of the continuous liquid phase removed from the dispersed particle composition from which the microspheres were formed. The removal of continuous liquid phase can act to bring the dispersed particles closer together and into point to point contact with each other. The dispersed particles can then link up with each other to form a rigid or relatively rigid lattice work of dispersed particles which particles lattice work with the binder (if one is used) and continuous liquid phase (that remains) comprise the hollow green microspheres. The hollow green microspheres are free of any latent solid or liquid blowing gas materials or latent blowing gases. The walls of the hollow green microspheres are free or substantially free of any holes, relatively thinned wall portions or sections, trapped gas bubbles, or sufficient amounts of dissolved gases to form bubbles. The term "latent" as applied to latent solid or liquid blowing gas materials or latent blowing gases is a recognized term of art. The term latent in this context refers to blowing agents that are present in or added to glass, metal and plastic particles. In the prior art processes the glass, metal and plastic particles containing the "latent blowing agent" are subsequently heated to vaporize and/or expand the latent blowing agent to blow or "puff" the glass, metal or plastic particles to form microspheres. The hollow green microspheres, because the walls are substantially free of any holes, thinned sections, trapped gas bubbles, and/or sufficient amounts of dissolved gases to form trapped bubbles, are substantially stronger than the hollow green microspheres heretofore produced. The hollow green and hollow porous microspheres contain a single central cavity, i.e. the single cavity is free of multiple wall or cellular structures. The walls of the hollow green and hollow porous microspheres are free of bubbles, e.g. foam sections."

U.S. Pat. No. 4,743,545 also discloses that "The hollow green and hollow porous microspheres can be made in various diameters and wall thickness, depending upon the desired end use of the microspheres. The microspheres can have an outer diameter of 200 to 10,000 microns, preferably 500 to 6000 microns and more preferably 1000 to 4000 microns. The microspheres can have a wall thickness of 1.0 to 1000 microns, preferably 5.0 to 400 microns and more preferably 10 to 100 microns. When the dispersed particles are sintered, the smaller particles can be dissolved into the larger particles. The sintered particles in the hollow porous microspheres can be generally regular in shape and have a size of 0.1 to 60 microns, preferably 0.5 to 20 microns, and more preferably 1 to 10 microns."

U.S. Pat. No. 4,743,545 also discloses that "In certain embodiments of the invention, the ratio of the diameter to the wall thickness, and the conditions of firing and sintering the hollow microspheres can be selected such that the microspheres are flexible, i.e., can be deformed a slight degree under pressure without breaking. The preferred embodiment of the invention, particularly with the ceramic materials, is to select the ratio of the diameter to wall thickness and the conditions of firing and sintering the hollow porous microspheres such that rigid hollow porous microspheres are obtained."

U.S. Pat. No. 4,743,545 also discloses that "The hollow microspheres produced using the transverse jet embodiment are substantially spherical and have substantially uniform diameters and wall thickness. The hollow microspheres that are produced without the use of an external fluctuating pressure field, e.g., without the use of the transverse jet entraining fluid, can be substantially spherical and can have substantially uniform diameters or they can have thickened wall portions on opposite sides of the microspheres at the points at which the filaments are connected. The thickness of the thickened portions depends in part on the viscosity of the dispersed particle composition, the rate of hardening, the distance away from the coaxial blowing nozzle when they harden and the ability of the surface tension properties of the dispersed particle composition to absorb and distribute in the wall of the microsphere the portions of the dispersed particle composition that form the filaments."

U.S. Pat. No. 4,743,545 also discloses that "The preferred hollow microspheres are the substantially spherical microspheres. However, in some applications the hollow microspheres with the thickened wall portions can also be used. The thickened wall portions can be 1.01 to 2.0 times the microsphere wall thickness; can be 1.1 to 1.5 times the microsphere wall thickness; and can be 1.2 to 1.3 times the microsphere wall thickness. The cross section of the microsphere other than the thickened wall portion section is substantially spherical and of substantially uniform wall thickness. All the microspheres produced under a given set of operating conditions and dispersed particle composition constituents are substantially the same in sphericity, wall thickness, void content and void distribution. A specific advantage of the process of the present invention is that in the production of hollow microspheres, the preceding and the following microspheres that are produced are substantially the same. The lower viscosity dispersed particle compositions tend to produce the more spherical microspheres and the higher viscosity dispersed particle compositions tend to produce microspheres with thickened wall portions at opposite ends of the hollow microspheres."

The microspheres used in applicants' enclosure assemblies may be fiber-reinforced hollow porous microspheres disclosed in U.S. Pat. No. 4,867,931, the entire disclosure of which is hereby incorporated by reference into this specification. Claim 1 of this patent describes "1. A method for making fiber reinforced hollow porous microspheres of 200 to 10,000 microns diameter and of 1 to 1000 microns wall thickness from a stable dispersion of a fiber and dispersed particle film forming composition, said composition comprising fibers and dispersed particles in a continuous liquid phase, wherein said fibers have a diameter of 0.5 to 10 microns and a length of 2 to 500 microns and the ratio of fiber diameter to length is 1:3 to 1:100 said method comprising feeding said fibers and dispersed particle composition and a blowing gas to a coaxial blowing nozzle, said coaxial blowing nozzle having an inner coaxial nozzle for said blowing gas and an outer coaxial nozzle for said fiber and dispersed particle composition and a coaxial blowing nozzle orifice, feeding said blowing gas to said inner nozzle, feeding said fiber and dispersed particle composition to said outer nozzle to blow and form, in the region of said coakial blowing nozzle orifice, hollow fiber and dispersed particle composition microspheres having stable film walls, removing said hollow microspheres from the region of said coaxial blowing nozzle orifice, surface tension forces acting on said hollow microspheres to cause said hollow microspheres to form a spherical shape, treating said removed hollow microspheres to bring the fibers and dispersed particles into point to point contact and to harden them to obtain fiber reinforced hollow green microspheres, wherein said fibers are evenly distributed and are deposited between the dispersed particles to form a mat of fibers; and subjecting said fiber reinforced hollow green microspheres to a sufficiently high temperature for a sufficient period of time to remove the continuous liquid phase from the hollow green microspheres and to sinter or otherwise bond the fibers to each other and to the particles and to sinter the dispersed particles at their points of contact and to form within the walls of said hollow microspheres interconnecting voids that are continuous from the outer wall surface to the inner wall surface of the hollow microspheres, and to obtain fiber reinforced hollow porous microspheres having substantially uniform distribution of fibers in the walls, substantially uniform void content and substantially uniform distribution of the voids in the walls of the microspheres."

The properties of the fiber reinforced microspheres of U.S. Pat. No. 4,867,931 are described at columns 22, 23, and 24 of such patent, wherein it is disclosed that "The fiber reinforced hollow green microspheres and fiber reinforced hollow porous microspheres made in accordance with the present invention can be made from a wide variety of film forming fiber and dispersed particle compositions, particularly ceramic fibers, glass fibers, metal and metal glass fibers and plastic fibers and dispersed ceramic, glass, metal, metalglass and plastic particles and mixtures thereof. The fiber and dispersed particle compositions comprise an aqueous or non-aqueous continuous liquidphase and have the necessary viscosities when being blown to form stable films. The hollow microsphere stable film wall after the microsphere is formed rapidly changes from liquid to solid to form fiber reinforced hollow green microspheres. The fiber reinforced hollow green microspheres can be substantially spherical in shape and can be substantially uniform in diameter and wall thickness and can have fibers uniformly dispersed in the walls of the microspheres."

U.S. Pat. No. 4,867,931 also discloses that "The fiber reinforced hollow green microspheres as they are being formed and/or after they are formed can have a portion of the continuous liquid phase removed from the fibers and dispersed particle composition from which the microspheres were formed. The removal of continuous liquid phase can act to bring the fibers and dispersed particles closer together and into point to point contact with each other. The fibers and dispersed particles can then link up with each other to form a rigid or relatively rigid lattice work of fibers and dispersed particles which fibers and particles lattice work with the binder (if one is used) and continuous liquid phase (that remains) comprise the fiber reinforced hollow green microspheres."

U.S. Pat. No. 4,867,931 also discloses that "The fiber reinforced hollow green microspheres are free of any latent solidor liquid blowing gas materials or latent blowing gases. The walls of the hollow green microspheres are free or substantially free of any holes, relatively thinned wall portions or sections, trapped gas bubbles, or sufficient amounts of dissolved gases to form bubbles."

U.S. Pat. No. 4,867,931 also discloses that "In applicant's invention the fiber reinforced hollow green microspheres, because the walls contain fibers and are substantially free of any holes, thinned sections, trapped gas bubbles, and/or sufficient amounts of dissolved gases to form trapped bubbles, are substantially stronger than the hollow green microspheres heretofore produced."

U.S. Pat. No. 4,867,931 also discloses that "The fiber reinforced hollow green and fiber reinforced hollow porous microspheres contain a single central cavity, i.e., the single cavity is free of multiple wall or cellular structures. The walls of the hollow green and hollow porous microspheres are free of bubbles, e.g., foam sections."

U.S. Pat. No. 4,867,931 also discloses that "The fiber reinforced hollow green and fiber reinforced hollow porous microspheres can be made in various diameters and wall thickness, depending upon the desired end use of the microspheres. The microspheres can have an outer diameter of 200 to 10,000 microns, preferably 500 to 6000 microns and more preferably 1000 to 4000 microns. The microspheres can have a wall thickness of 1.0 to 1000 microns, preferably 5.0 to 400 microns and more preferably 10 to 100 microns."

U.S. Pat. No. 4,867,931 also discloses that "When the dispersed particles are sintered, the smaller particles can be incorporated into the larger growing particles. The sintered particles in the hollow porous microspheres can be generally regular in shape and have a size of 0.1 to 60 microns, preferably 0.5 to 20 microns, and more preferably 1 to 10 microns."

U.S. Pat. No. 4,867,931 also discloses that "The fiber reinforced porous microspheres depending on their intended use, for example, as a substrate for catalyst or separation or biotech membranes, can have diameters of 1200 to 6000 microns and wall thickness of 10 to 200 microns, and preferably diameters of 2000 to 4000 microns and wall thicknesses of 20 to 100 microns."

U.S. Pat. No. 4,867,931 also discloses that "Where the fiber reinforced microspheres are formed in a manner such that they are connected by continuous thin filaments, that is they are made in the form of filaments microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/100 to 1/30 of the diameter of the microspheres."

U.S. Pat. No. 4,867,931 also discloses that "The porosity of the walls, i.e., the void content, of the fiber reinforced hollow fired microspheres can be 5% to 45%, preferably 15% to 35% and more preferably 20% to 30% by volume of the microsphere wall."

U.S. Pat. No. 4,867,931 also discloses that "The fiber reinforced hollow porous microspheres produced in accordance with the present invention, depending in part on the volume percent fibers and fiber diameter and length, on the dispersed particle size, e.g., 0.1 to 3.0 microns, and dispersed particle size distribution, volume percent dispersed solids used and firing temperatures, can contain interconnecting voids or channels between the sintered particles in which the distance between particles, can be, for example, 1 to 5 microns. In order to obtain a more controlled and more uniform pore size the hollow porous microspheres can be treated to fill or partially fill and seal the interconnecting voids in the walls of the microspheres with a sol gel, i.e., a dispersed particle composition of colloidal size particles dispersed in a liquid phase.

The hollow microspheres are again fired to sinter the colloidal size particles in the interconnecting voids. The colloidal size particles on firing link up to form a rigid latticework of particles across the interconnecting voids, sinter to the surface of the particles forming the interconnecting voids and the firing removes the liquid phase from the colloidal dispersed particles."

The microspheres used in applicants' enclosure assemblies may be the hollow porous microspheres described in U.S. Pat. No. 5,212,143, the entire disclosure of which is hereby incorporated by reference into this specification. Claim 1 of this patent describes "1. Hollow porous microspheres having a substantially uniform diameter within the range of 500 to 6,000 microns and having a substantially uniform wall thickness within the range of 5.0 to 400 microns, the walls of said hollow microspheres comprise sintered together particles, said sintered together particles being selected from the group consisting of glass, metal and metal glass particles, which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, and the walls of said hollow microspheres are free of latent solid or liquid blowing gas materials and are substantially free of relatively thinned wall portions and bubbles."

One may also use the coated porous microspheres in applicants' enclosure assemblies that are disclosed in U.S. Pat. No. 5,358,719, the entire disclosure of which is hereby incorporated by reference into this specification. This patent claims (in claim 1) "1. Porous microspheres having fixed on the exterior surface thereof a coating of a substance not penetrating the interior of the pores of said microspheres, said coating consisting of a member selected from the group consisting of a perfluorinated oil, a fluorinated silicone oil and a silicone gum having the formula [Figure] wherein R represents —CH3, OH or —CH=CH2, R' represents —CH3 or —C6 H5 and n is such that said silicone gum has a viscosity greater than $1 \times 10^{-2}$ m2/s at 25° C."

One may use solid, non porous microspheres in applicants' enclosure assemblies. Thus, by way of illustration, one may use the solid, non-porous microspheres disclosed in U.S. Pat. No. 5,360,616, the entire disclosure of which is hereby incorporated by reference into this specification. Claim 1 of this patent describes "Solid, non-porous microspheres of a diameter between 1 and 300 μm, wherein said microspheres consist of an injectable steroid and wherein said microspheres are obtained by spraying said steroid in the melted state to form droplets and rapidly freezing said droplets in a gas." As is disclosed in such patent, the microspheres may consist essentially of progesterone (see Example 1), beta-estradiol (see Example 2), cholesterol (see Example 3), Naproxen (see example 4), and indomethazin (see Example 7), "microspheres of fats and/or waxes . . . loaded with particles of a polypeptide" (see lines 51-53 of column 1), etc.

The microspheres used in applicants' enclosure assemblies may be the hollow porous microspheres described in U.S. Pat. No. 5,397,759, the entire disclosure of which is hereby incorporated by reference into this specification. Claim 1 of this patent describes "1. Hollow porous microspheres having essentially the same diameter within the range of 500 to 6,000 microns and having essentially the same wall thickness within the range of 5.0 to 400 microns, the walls of said hollow microspheres comprise sintered together particles which define interconnecting voids within the walls and a single central cavity in the interior of the microspheres and inner and outer microsphere wall surfaces, said interconnecting voids are continuous and extend from the outer wall surface to the inner wall surface, said walls have essentially uniform void content and said interconnecting voids are essentially uniformly distributed in the walls of the hollow microspheres, and the walls of said hollow microspheres are free of latent solid or liquid blowing gas materials and are essentially free of relatively thinned wall portions and bubbles."

One may use the solid, non-porous microspheres of U.S. Pat. No. 5,512,203, the entire disclosure of which is hereby incorporated by reference into this specification, in the enclosures of this invention. These microspheres consist essentially of an injectable analgesic. Thus, and as is described in claim 1 of this patent, the patent discloses "1. Solid, non-porous microspheres having a diameter in the range of from 1-300 μm, wherein said microspheres consist essentially of an injectable analgesic having a melting temperature above 60° C. and thermostable above its melting point and wherein said microspheres are obtained by spraying said analgosic in the melted state to form droplets and rapidly freezing said droplets."

Alternatively, one may use the solid, non-microspheres of U.S. Pat. No. 5,633,014, the entire disclosure of which is hereby incorporated by reference into this specification, which are described, e.g., in claim 1 of such patent. Such claim 1 discloses "1. Solid, non-porous microspheres for administration to a receiving organism said microspheres having a diameter in the range of 1-300 μm, and consisting essentially of: an injectable analgesic that undergoes a decomposition reaction below the melting temperature of said analgesic; and an adjuvant not active on the receiving organism but which, when mixed with the analgesic, decreases the melting point of the analgesic below its decomposition temperature and wherein said microspheres are obtained by spraying a mixture of said analgesic and adjuvant in the melted state to form droplets and rapidly freezing said droplets."

The non-porous microspheres described in the claims of U.S. Pat. No. 5,643,604, the entire disclosure of which is hereby incorporated by reference into this specification, also may be used in applicants' enclosure assemblies. Claim 1 of this patent describes". A pharmaceutical formulation suitable for compounding for parenteral administration to a mammal comprising solid, non-porous microspheres, said microspheres having a diameter of between 5 and 300 μm, wherein said microspheres consist of cholesterol as a carrier substance and particles of a pharmaceutically active substance homogeneously disbursed within said cholesterol carrier substance, wherein said microspheres are obtained by spraying said cholesterol in the melted state in which said pharmacologically active substance is either in the dissolved state or in the form of particles less than 5 μm, to form droplets and rapidly freezing said droplets."

One may use the perforated microstructures described in U.S. Pat. No. 6,309,623, the entire disclosure of which is hereby incorporated by reference into this specification. Claim 1 of this patent describes "A stable respiratory dispersion for the pulmonary delivery of one or more bioactive agents comprising a suspension medium having dispersed therein a plurality of perforated microstructures having a mean aerodynamic diameter of less than 5 μm and comprising at least one bioactive agent wherein said suspension medium comprises at least one propellant and substantially permeates said perforated microstructures wherein more than 30% of the average particle volume of the perforated microstructures is permeated by said suspension medium."

Similar perforated microstructures are described in U.S. Pat. No. 6,433,040 (the entire disclosure of which is hereby incorporated by reference into this specification), and they also may be used in the enclosure assemblies of this invention. Claim 1 of such patent describes "1. A method for delivering one or more bioactive agents comprising the steps of: providing a stabilized dispersion comprising a nonaqueous suspension medium having dispersed therein a plurality of perforated microstructures wherein said suspension medium substantially permeates said perforated microstructures, and wherein said perforated microstructures comprise a bioactive agent; and administering by liquid dose instillation a therapeutically effective amount of said stabilized dispersion to at least a portion of the nasal or pulmonary passages of a patient in need thereof."

By way of further illustration, one may use the hollow microspheres described in U.S. Pat. No. 6,461,621, the entire disclosure of which is hereby incorporated by reference into this specification. Claim 14 of this patent discloses "14. A cosmetic molded powder cake composition consisting essentially of: hollow microspheres having at least one cavity and being present in an amount ranging from 0.1 to 50% by weight relative to the total weight of said composition, at least one non-hollow particle pigment acceptable for cosmetic compositions, at least one oily binder, and at least one non-hollow particle complementary charge acceptable for cosmetic compositions; said hollow microspheres having a diameter of less than 70 μm, and said binder being present in an amount of up to 20% by weight of said composition."

One may use the perforated microspheres produced by the process of U.S. Pat. No. 6,565,885, the entire disclosure of which is hereby incorporated by reference into this specification. Claim 1 of this patent describes "1. A method for forming a powder comprising perforated microstructures for pharmaceutical applications by spray drying comprising the steps of: providing a feed stock comprising a bioactive agent, surfactant, and a blowing agent wherein said blowing agent is selected from the group consisting of fluorinated compounds, nonfluorinated oils, ammonium salts, alcohols, chloroform, ethyl acetate, acetone, nitrogen, carbon dioxide, camphor, and latex wherein the ratio of blowing agent/surfactant is between 1.0-60 w/w; atomizing said feed stock to produce dispersed droplets; drying said droplets to form perforated microstructures comprising said bioactive agent and surfactant; and collecting said perforated microstructures."

One may use the perforated microspheres disclosed in U.S. Pat. No. 6,638,495, the entire disclosure of which is hereby incorporated by reference into this specification. This patent claims "1. A system for the pulmonary administration of a bioactive agent comprising: a fluid reservoir; a metering valve operably associated with said fluid reservoir; and a stabilized dispersion in said fluid reservoir wherein said stabilized dispersion comprises a suspension medium having dispersed therein a plurality of perforated microstructures comprising a mean aerodynamic diameter of less than 5 μm and comprising at least one bioactive agent wherein said suspension medium comprises at least one propellant wherein more than 30% of the average particle volume of the perforated microstructures is permeated by said suspension medium."

The microspheres used in the enclosure assemblies of this invention may be the calcium phosphate microspheres disclosed in U.S. Pat. No. 6,730,324, the entire disclosure of which is hereby incorporated by reference into this specification. As is disclosed in this patent, "Drug Encapsulation in HA has been achieved in the past by simple post-impregnation of a sintered, porous HA ceramic [K. Yamamura et al, J. Biomed. Mater. Res., 26, 1053-64,1992]. In this process, the drug molecules simply adsorb onto surface of the porous ceramic. The drug release is accomplished through desorption and leaching and the drug to the surrounding tissue after exposure to physiological fluid. Unfortunately, most of the adsorbed drug molecules release from such system in a relatively short period of time. Impregnation of drug material into porous sintered calcium phosphate microspheres has been reported in patent literature. 'Slow release' porous granules are claimed in U.S. Pat. No. 5,055,307 [S. Tsuru et al, 1991], wherein the granule is sintered at 200-1400 C and the drug component impregnated into its porosity. 'Calcium phosphate microcarriers and microspheres' are claimed in WO 98/43558 by B. Starling et al [1998], wherein hollow microspheres are sintered and impregnated with drugs for slow release. D. Lee et al claim poorly crystalline apatite [WO98/16209] wherein macro-shapes harden and may simultaneously encapsulate drug material for slow release. It has been suggested to use porous, composite HA as a carrier for gentamicin sulfate (GS), an aminoglycoside antibiotic to treat bacterial infections at infected osseous sites [J. M. Rogers-Foy et al, J. Inv. Surgery 12 (1997) 263-275]. The presence of proteins in HA coatings did not affect the dissolution properties of either calcium or phosphorus ions and that it was solely dependent on the media [Bender S. A. et al. Biomaterials 21 (2000) 299-305]."

Mixtures of Tubules and Microspheres

In one preferred embodiment, a mixture of tubules and non-tubular material is prepared with a particle size such that at least about 90 percent of the mixture has particles within the range of from about 0.1 microns to about 1,000 microns and, more preferably, from about 1 to about 100 microns. The tubular material may be, e.g., selected from the group consisting of inorganic tubular material (such as, e.g., the hydrated halloysite tubular material) and the "biologically derived" microtubular material. The non-tubular material may be, e.g., selected from the group consisting of microspheres (such as, e.g., porous glass microspheres and glass fiber (such as, e.g., porous glass fiber); in one embodiment, the non-tubular material is porous glass microsphere material.

In one embodiment, a mixture of hydrated halloysite tubules and porous glass microspheres is provided. In this embodiment, it is preferred that the mixture comprise at least about 10 weight percent, and more preferably at least about 50 weight percent, of the hydrated halloysite material. In another embodiment, the mixture is comprised of at least about 60 weight percent of the hydrated halloysite material. In another embodiment, the mixture is comprised of at least about 70 weight percent of the hydrated halloysite material. In another embodiment, the mixture is comprised of at least about 80 weight percent of the hydrated halloysite material. In another embodiment, the mixture is comprised of at least about 90 weight percent of the hydrated halloysite material.

This mixture may be formulated by conventional means for one or more pharmaceutical means. One may use any of the formulation processes and/or compositions described in the prior art. Thus, by way of illustration and not limitation, one may use one or more of the processes and/or compositions of U.S. Pat. No. 4,115,563 (pharmaceutical steroid formulation), U.S. Pat. No. 4,178,695 (new process for preparing pharmaceutical, cosmetic, or diagnostic formulations), U.S. Pat. No. 4,315,918 (pharmaceutical formulation of guar gum), U.S. Pat. No. 4,335,139 (pharmaceutical formulations containing prostacyclin compounds), U.S. Pat. No. 4,374,146

(topical inflammatory pharmaceutical formulations), U.S. Pat. No. 4,490,407 (method for preparing galenic formulations), U.S. Pat. No. 4,470,695 (method for coating pharmaceutical formulations), U.S. Pat. No. 4,762,709 (liquid prolonged release pharmaceutical formulations containing ionic constituents), U.S. Pat. No. 4,772,475 (controlled-release multiple units pharmaceutical formulation), U.S. Pat. No. 4,797,286 (orally administerable sustained release pharmaceutical formulations), U.S. Pat. No. 4,853,230 (pharmaceutical formulations of acid labile substances for oral use), U.S. Pat. No. 4,919,932 (pharmaceutical formulation for the treatment of bacterial infections), U.S. Pat. No. 4,929,444 (low pH pharmaceutical formulation), U.S. Pat. No. 4,997,655 (pharmaceutical formulation ensuring the transdermal absorption of the active ingredient), U.S. Pat. No. 5,112,619 (orally administerable sustained release pharmaceutical formulation), U.S. Pat. No. 5,133,974 (extended release pharmaceutical formulations), U.S. Pat. No. 5,173,488 (stable injectable pharmacentical formulation), U.S. Pat. No. 5,300,300 (controlled release gastroresistant pharmaceutical formulations for oral administration), U.S. Pat. No. 5,333,378 (pharmaceutical formulation in the form of aqueous suspension), U.S. Pat. No. 5,384,133 (pharmaceutical formulations comprising microcapsules), U.S. Pat. No. 5,445,829 (extended release pharmaceutical formulations), U.S. Pat. No. 5,562,919 (dried animal plasma as a pharmaceutical excipient for compressed tablet formulation), U.S. Pat. No. 5,576,012 (pharmaceutical aqueous formulations containing a sparingly soluble pharmaceutical active compound with a solubuling polymeric agent), U.S. Pat. No. 5,587,179 (pharmaceutical agent in the form of an efferscent and/or disintegrating tablet or of instant granulate), U.S. Pat. No. 5,656,289 (pharmaceutical formulations that have a biologically active hydrophilic phase and a chylomicra-containing hydrophobic phase), U.S. Pat. No. 5,834,019 (pharmaceutical formulation containing a hydrophobic active substance and an effervescent system), U.S. Pat. No. 5,910,322 (delayed release pharmaceutical formulation), U.S. Pat. No. 6,039,977 (pharmaceutical hydrogel formulations), U.S. Pat. No. 6,040,330 (pharmaceutical formulations of taxanes), U.S. Pat. No. 6,063,313 (process for the preparation of fine particle pharmaceutical formulations), U.S. Pat. No. 6,149,942 (pharmaceutical pellet formulation), U.S. Pat. No. 6,150,410 (pH independent extended release pharmaceutical formulation), U.S. Pat. No. 6,180,608 (pharmaceutical formulations for sustained drug delivery), U.S. Pat. No. 6,197,787 (pharmaceutical formulation containing poorly soluble drug substances), U.S. Pat. No. 6,248,771 (formulations for hydrophobic pharmaceutical agents), U.S. Pat. No. 6,268,385 (dry blend pharmaceutical formulations), U.S. Pat. No. 6,294,153 (aerosol pharmaceutical formulation for pulmonary and nasal delivery), U.S. Pat. No. 6,303,626 (pharmaceutical formulations in dry form for the oral administration of a cyclic quaternary ammonium compound), U.S. Pat. No. 6,387,398 (process for producing cosmetic and pharmaceutical formulations), U.S. Pat. No. 6,391,340 (dry powder pharmaceutical formulation), U.S. Pat. No. 6,521,599 (stable pharmaceutical formulation), U.S. Pat. No. 6,531,507 (stabilized pharmaceutically effective composition), U.S. Pat. No. 6,653,329 (granulated pharmaceutical formulations and method for making the same), U.S. Pat. No. 6,667,323 (dry blend pharmaceutical formulations), U.S. Pat. No. 6,669,482 (formulations for hydrophobic pharmaceutical formulations), and the like. The entire disclosure of each of these United States patents is hereby incorporated by reference into this specification.

The mixtures described hereinabove may be made into pharmaceutical formulations by conventional means.

Thus, by way of illustration and not limitation, one may utilize such a mixture to prepare the fine pharmaceutical formulations described in U.S. Pat. No. 6,063,313, the entire disclosure of which is hereby incorporated by reference into this specification. This patent claims (in claim 1 thereof) "1. A process for the preparation of fine particle pharmaceutical formulations comprising the steps of a) adding to the dry components of the formulation an extrusion aid material, wherein the extrusion aid material is a pharmaceutically acceptable oil or a wax having a drop point ranging between about 15° C. and 115° C.; b) thoroughly blending the dry mixture; c) wetting the mixture resulting from step b) to form a granular mixture of the formulation; d) extruding the granular mixture through a mesh to form an extrudate; e) spheronizing the extrudate; and f) drying the fine particles resulting from step e) to form a fine particle formulation."

The process described in U.S. Pat. No. 6,063,313 is adapted to mix tubules of hydrated halloysite with other materials. As is disclosed in the "background" section of this patent, "Conventional processes for preparing fine particle pharmaceutical formulations by extrusion/spheronization involve the steps of blending the dry ingredients which make up the formulation, wetting the dry powdered blend, extruding the resulting wetted blend, and forming the extrudate into fine particles by spheronization. Generally, the size of particles produced by the above method is limited to particle sizes ranging above about 0.5 mm. Moreover, the amount of water added in the wetting step must be carefully controlled. Excess water causes the extrudate in the extrusion step to take on the consistency of "mud" while too little water causes the wetted material to rupture the screens of the extrusion equipment. The result is that without very careful process control of the amount of water added to the formulation in the wetting step, batches may be unacceptable with attendant loss of time and/or money. There is thus a need for a convenient, cost-effective and efficient method for making fine particle pharmaceutical formulations which overcome the disadvantages inherent in prior art methods."

As is described in the "detailed description . . . " section of U.S. Pat. No. 6,063,313, the formulations made by the process of this patent may include "therapeutically active compounds." As is disclosed in such patent, such compounds include ". . . pharmaceutically acceptable salts, esters, amides and prodrugs. The therapeutically active compounds may be any therapeutically active compounds for which oral administration is desired. However, the selected therapeutically active compound should be compatible with the selected extrusion aid material and any excipients. Some examples of therapeutically active compounds that may be used in the present invention include, but are not limited to: α-adrenergic agonists such as clonidine and pseudoephedrine; analgesics such as acetaminophen, aspirin, and ibuprofen; antianginals such as verapamil and nifedipine; antibacterials (antibiotics) such as penicillin, erythromycin, tetracycline, amoxicillin, trimethoprim and clarithromycin; antidepressants such as imipramine; antiinflammatory agents such as indomethacin and zileuton; antimigrane agents such as ergotamine; antineoplastics such as methotrexate and etoposide; antivirals such as acyclovir and zidovudine; calcium channel blockers such as diltiazem and verapamil; cardiotonic agents such as digoxin; expectorants such as quaifenesin; bronchodialators such as theophylline; antihypertensives such as methyldopa; antihistamines such as diphenhydramine, dextromethorphan, phenyltoloxamine, brompheniramine, and chlorpheniramine; diuretics such as furosemide and hydrochlorothiazide; antiepileptics such as tiagabine, phenytoin sodium, divalproex sodium, trimethadione, and paramethadione; central nervous system stimulators such as caffeine and pemoline; decongestants such as phenylepinephrine and phenylephrine; inorganic salts such as potassium chloride and calcium carbonate; enzymes such as pancreatic enzyme; and vitamins."

U.S. Pat. No. 6,063,313 also discloses that "The term "pharmaceutically acceptable salts, esters, amides and prodrugs" as used herein refers to those carboxylate salts, amino acid addition salts, esters, amides and prodrugs of the compounds of the present invention which are, within the scope of sound medical judgment, suitable for use in contact with the tissues of patients without undue toxicity, irritation, allergic response, and the like, as well as the zwitterionic forms, where possible, of the compounds of the invention."

U.S. Pat. No. 6,063,313 also discloses that "The term "salts" refers to the relatively non-toxic, inorganic and organic acid addition salts of compounds of the present invention. These salts can be prepared in situ during the final isolation and purification of the compounds or by separately reacting the purified compound in its free base form with a suitable organic or inorganic acid and isolating the salt thus formed. Representative salts include the hydrobromide, hydrochloride, sulfate, bisulfate, nitrate, acetate, oxalate, valerate, oleate, palmitate, stearate, laureate, borate, benzoate, lactate, phosphate, tosylate, citrate, maleate, fumarate, succinate, tartrate, naphthylate, mesylate, glucoheptonate, lactiobionate, and laurylsulphonate salts and the like. These may include cations based on the alkali and alkaline earth metals, such as sodium, lithium, potassium, calcium, magnesium, and the like, as well as non-toxic ammonium, quaternary ammonium and amine cations including, but not limited to, ammonium, tetramethylammonium, tetraethylammonium, methylamine, dimethylamine, trimethylamine, triethylamine, ethylamine and the like (cf. S. M. Berge, et al., "Pharmaceutical Salts," J. Pharm, Sci., 66: 1-19 (1977)."

Thus, by way of further illustration, one may use the mixtures of this invention to prepare pH independent extended release pharmaceutical formulations, such as those disclosed in U.S. Pat. No. 6,150,410, the entire disclosure of which is hereby incorporated by reference into this specification. Claim 1 of this patent describes "1. A pharmaceutical composition comprising a therapeutically effective amount of an acidic pharmacologic agent dissolved or dispersed in a polymer matrix comprising a) from about 10 weight percent to about 40 weight percent of a pharmaceutically acceptable neutral, water-swellable, hydrophilic polymer, and b) from about 15 weight percent to about 50 weight percent of a pharmaceutically acceptable acid soluble polymer which is water swellable above about pH 5, all percentages based upon the total weight of the formulation."

In the "background" section of U.S. Pat. No. 6,150,410, a detailed discussion of "prior art" relating to the drug delivery of "acid pharmacologic agents" is presented. It is disclosed that "The normal pH of gastric juices is about pH 1, while the pH in the intestinal tract averages about pH 7. This fact has been used to advantage for years in so-called "enteric coated" pharmaceutical formulations. These formulations are generally in the form of tablets coated with a substance which is insoluble or sparingly soluble in acidic solutions, but which dissolves rapidly at higher pH. Such enteric coated formulations permit the oral administration of drugs which would present problems if released in the stomach, such as irritation of the stomach lining. Moreover, enteric-coated tablets also permit extending the release of a drug over time. For example, a tablet can be formulated by compressing granules containing the drug, some of which granules are enteric coated and some of which are not. As the tablet disintegrates, the non-enteric coated granules dissolve in the stomach, immediately releasing the drug, while the enteric coated granules pass to the intestine before dissolving to release the drug. In this way, release of the drug can be extended over the time the drug is resident in both the stomach and intestine. Such an extended release system is crude, essentially releasing the drug in a bi-modal manner. It is generally desirable to release a drug more smoothly over time than can be done by a partially enteric coated formulation of the type just described." In one embodiment, some of applicants' "granules" are enteric coated, and some are not.

U.S. Pat. No. 6,150,410 also discloses that "In the effort to achieve smooth, controllable release of acidic pharmacologic agents, several systems have been devised. These fall into one of three general classes: osmotic systems, dissolution systems, and diffusion systems. An example of an osmotic system is a tablet consisting of a core of drug surrounded by a semi-permeable membrane containing a small orifice. When the tablet is exposed to an aqueous body fluid, water flows into the tablet through the semi-permeable membrane due to the osmotic pressure difference. The drug is then pumped out of the tablet through the orifice at a constant rate controlled by the parameters of drug concentration, orifice diameter, osmotic pressure difference, etc., until the drug concentration inside the tablet falls below saturation." Applicants' mixtures also can be formulated using such ". . . osmotic systems, dissolution systems, and diffusion systems."

U.S. Pat. No. 6,150,410 also discloses that "Dissolution systems take advantage of the inherent dissolution rate of the drug itself, or of a particular salt or derivative. Alternatively, the drug can be coated with a slowly dissolving coating, or by incorporating the drug into a slowly dissolving carrier. Diffusion systems include both reservoir devices, in which a core of drug is surrounded by a polymeric membrane, and matrix devices in which dissolved or dispersed drug is distributed uniformly throughout an inert polymer matrix. The release of drug from a reservoir system involves the flow of drug through the membrane, and is controlled by Fick's first law of diffusion. Depending upon the shape of the tablet, the equation describing the release will vary. In matrix systems, the mechanism of drug release is assumed to involve dissolution of the drug from the surface layer of the device first, followed by dissolution from the underlying layer and diffusion through the overlying drug-depleted layer, etc."

U.S. Pat. No. 6,150,410 also discloses that "The design of a sustained or extended release formulation for drugs which are acidic present particular problems for the pharmaceutical formulator. The solubility of such drugs in gastric juices is typically low as a result of the repression of ionization of the acid by the low pH in the stomach. On the other hand, such acidic drugs dissolve rapidly in the intestine, sometimes more rapidly than desired. The various systems described above lend themselves readily to the formulation of extended release formulations of drugs which are unaffected by pH as they traverse the alimentary canal, but do not provide adequate formulations where the drug has widely varying pH-dependent release rates between the stomach and intestinal tract."

In one embodiment, the one or more of the mixtures of this invention is part of a formulation that includes a "peptidic compound." Peptidic compounds are described in U.S. Pat. No. 6,180,608, the entire disclosure of which is hereby incorporated by reference into this specification. As is disclosed in such patent, "As used herein, the term 'peptidic compound' is intended to refer to compounds composed, at least in part, of amino acid residues linked by amide bonds (i.e., peptide bonds). The term 'peptidic compound' is intended to encompass peptides, polypeptide and proteins. Typically, a peptide will be composed of less than about 100 amino acids, more typically less than about 50 amino acid residues and even more typically, less than about 25 amino acid residues. The term 'peptidic compound' is further intended to encompass peptide analogues, peptide derivatives and peptidomimetics that mimic the chemical structure of a peptide composed of naturally-occurring amino acids. Examples of peptide analogues include peptides comprising one or more non-natural amino acids. Examples of peptide derivatives include peptides in which an amino acid side chain, the peptide backbone, or the amino- or carboxy-terminus has been derivatized (e.g., peptidic compounds with methylated amide linkages). Examples of peptidomimetics include peptidic compounds in which the peptide backbone is substituted with one or more benzodiazepine molecules (see e.g., James, G. L. et al. (1993) Science 260:1937-1942), "inverso" peptides in which all L-amino acids are substituted with the corresponding D-amino acids, "retro-inverso" peptides (see U.S. Pat. No. 4,522,752 by Sisto) in which the sequence of amino acids is reversed ("retro") and all L-amino acids are replaced with D-amino acids )"inverso") and other isosteres, such as peptide back-bone (i.e., amide bond) mimetics, including modifications of the amide nitrogen, the α-carbon, amide carbonyl, complete replacement of the amide bond, extensions, deletions or backbone crosslinks. Several peptide backbone modifications are known, including .psi.[CH2 S], .psi.[CH2 NH], .psi.[CSNH2], .psi.[NHCO], .psi.[COCH2], and .psi. [(E) or (Z) CH═CH]. In the nomenclature used above, .psi. indicates the absence of an amide bond. The structure that replaces the amide group is specified within the brackets. Other possible modifications include an N-alkyl (or aryl) substitution (.psi.[CONR]), backbone crosslinking to construct lactams and other cyclic structures, and other derivatives including C-terminal hydroxymethyl derivatives, O-modified derivatives and N-terminally modified derivatives including substituted amides such as alkylamides and hydrazides."

The "peptidic compound" that may be used in applicants' formulations include "pharmaceutically active peptidic compounds," as that term is defined in U.S. Pat. No. 6,180,608. As is also disclosed in such patent, "As used herein, the term "pharmaceutically active peptidic compound" is intended to refer to a peptidic compound that exhibits pharmacologic activity, either in its present form or upon processing in vivo (i.e., pharmaceutically active peptidic compounds include peptidic compounds with constitutive pharmacologic activity and peptidic compounds in a "prodrug" form that have to be metabolized or processed in some way in vivo following administration in order to exhibit pharmacologic activity)."

The "peptidic compound" that may be used in applicants' formulations include "multivalent cationic peptidic compounds" and "multivalent anionic peptidic compounds," as those terms are defined in U.S. Pat. No. 6,180,608. As is also disclosed in such patent, "As used herein, the terms "multivalent cationic peptidic compound" and "multivalent anionic peptidic compound" are intended to refer to peptidic compounds comprising a multiplicity of positive or negative charges, respectively. A "bivalent cationic" or "bivalent anionic" peptidic compound is intended to refer to a peptidic compound comprising two positive or negative charges, respectively. A "trivalent cationic" or "trivalent anionic" peptidic compound is intended to refer to a peptidic compound comprising three positive or negative charges, respectively."

Applicants' drug formulations may comprise one or more of applicants' mixtures and a poorly soluble drug substance. Poorly soluble drug substances are described in U.S. Pat. No. 6,197,787, the entire disclosure of which is hereby incorporated by reference into this specification. Claim 1 of this patent describes "1. A pharmaceutical formulation in the form of a solid dispersion comprising: a) a poorly soluble organic acid drug substance selected from the group consisting of: analgesics, anti-inflammatory agents, anthelmintics, anti-arrhythmic agents, antibiotics, anticoagulants, antidepressants, antidiabetic agents, antiepileptics, antihistamines, antihypertensive agents, antimuscarinic agents, antimycobacterial agents, antineoplastic agents, immunosuppressants, antithyroid agents, antiviral agents, anxiolytic sedatives, astringents, beta-adrenoceptor blocking agents, cardiac inotropic agents, contrast media, corticosteroids, cough suppressants, diagnostic agents, diagnostic imaging agents, diuretics, dopaminergics, haemostatics, immunological agents, lipid regulating agents, muscle relaxants, parasympathomimetics, parathyroid calcitonin, prostaglandins, radio-pharmaceuticals, sex hormones, anti-allergic agents, stimulants, anoretics, sympathomimetics, thyroid agents, vasodilators and xanthines; b) propylene glycol; c) a sufficient quantity of a solid diluent selected from the group consisting of xylitol, dicalcium phosphate dihydrate, and lactose monohydrate/microcrystalline cellulose to provide a solid dispersion."

Applicants' drug formulations may comprise one or more of applicants' mixtures and a hydrophobic pharmaceutical agent. Hydrophobic pharmaceutical agents are discussed in U.S. Pat. No. 6,248,771, the entire disclosure of which is hereby incorporated by reference into this specification. Claim 1 of this patent describes "1. A formulation comprising: (a) one or more hydrophobic pharmaceutical agents, wherein said agents are independently selected from the group consisting of quinazoline-, nitrothiazole-, and indolinone-based compounds; (b) one or more polyoxyhydrocarbyl compounds; and (c) one or more pharmaceutically acceptable surfactants; wherein said indolinone-based compound is an indolinone-based compound of formula VI [Figure] at a concentration of about 0.1 to about 100 mg/ml; wherein R1, R2, R3, R4 are selected from the group consisting of hydrogen, trihalomethyl, hydroxyl, thioether, cyano, alkoxy, alkyl, amino, bromo, fluoro, chloro, iodo, mercapto, thio, cyanoamido, alkylthio, aryl, heteroaryl, carboxyl, ester, oxo, alkoxycarbonyl, alkenyl, alkoxy, nitro, alkoxyl, and amido moieties; and R5 is an optionally substituted aryl or heteroaryl cyclic moiety; wherein at least one of said surfactants for the indolinone-based compound is PEG-400 at a concentration of about 0.01 to about 10 g/ml and at least one of said polyoxyhydrocarbyl compounds for the indolinone-based compound is ethoxylated castor oil at a concentration of about 0.01 to 10 g/ml." Some of these "hydrophobic agents" are discussed in the background section of this United States patent, wherein it is disclosed that "Various methods are available for administering therapeutic agents to a patient. Such methods include, parenteral, oral, ocular, nasal, topical, and transmucosal administration. Variations of these different types of administrations exist. For example, parenteral administration includes intravenous, subcutaneous, intraperitoneal, intramuscular, and intramedullary injection. The chosen mode of administration should take into account the nature of the therapeutic compound and the illness being treated."

U.S. Pat. No. 6,248,771 also discloses that "Certain potential pharmaceuticals are hydrophobic and typically have very low aqueous solubility and hence low oral bioavailability. Different techniques concerned with solubilizing hydrophobic compounds include those described by Praveen et al., U.S.

Pat. No. 5,314,685, and Fernandes et al., U.S. Pat. No. 4,992,271, both of which are incorporated by reference herein in their entirety including any figures and drawings. One measure of the potential usefulness of an oral formulation of a new pharmaceutical agent is the bioavailability observed after oral administration of the formulation. Various factors can affect the oral bioavailability of the drug. These factors include aqueous solubility, drug absorption throughout the gastrointestinal tract, dosage strength, and first pass effect. Aqueous solubility is one of the most important factors. The oral bioavailability of an aqueous solution formulation of a drug is generally used as the standard or the ideal bioavailability against which other oral formulations are measured. Formulations of drugs that increase the relative bioavailability of the drug as compared to an aqueous solution are desirable, especially with hydrophobic compounds."

In the specification of U.S. Pat. No. 6,248,771, the term "hydrophobic pharmaceutical agent" is defined as follow: "The term "hydrophobic pharmaceutical agent" as used herein refers to compounds having a greater solubility in organic solvents of low polarity, such as long chain alcohols, than in aqueous solution. "Hydrophobic" means "water-hating" and is used herein to indicate weakly soluble in water and soluble in non-polar solvents. The formulations described by the present invention facilitate solubilization of hydrophobic compounds which readily dissolve in alcohols. Preferably, the hydrophobic compound is insoluble in aqueous solution. More preferably, the compound has similar solubility characteristics in alcohols and aqueous solution to quinazoline-, nitrothiazole-, and indolinone-based compounds."

In one preferred embodiment, the mixtures of these inventions are used to make dry powder pharmaceutical formulations in accordance with the procedure described in U.S. Pat. No. 6,391,340, the entire disclosure of which is hereby incorporated by reference into this specification. Claim 1 of this patent describes "1. A solid particulate pharmaceutical formulation for application to the nose comprising finely divided additive particles and finely divided drug particles, wherein the mass median diameter of the drug particles is greater than that of the additive particles." The preferred sizes of the "additive particles" and the "drug particles" are specified in U.S. Pat. No. 6,391,340, wherein it is disclosed that "Thus according to the invention we provide a solid particulate pharmaceutical formulation suitable for application to the nose comprising finely divided additive particles and finely divided drug particles, wherein the mass median diameter of the drug particles is greater than that of the additive particles. We prefer at least 85% of the drug particles to have a size over 5 µm, and at least 90% a size of less than 20 µm. We prefer at least 85%, and more preferably at least 70% of the drug particles to have a size below 15 µm. We prefer at least 90% of the additive particles to be of a size of less than 10 µm. We further prefer at least 80% of the additive particles to be of a size of less than 7 µm, and more preferably not more than 10% of the additive particles to be of a size of less than 1 µm."

As is known to those skilled in the art, halloysite may exist in a variety of morphologies, including spherical agglomerates and tubular rods. The present invention utilizes the tubular halloysite rods as a hydrogen storage device.

Figure 2B:
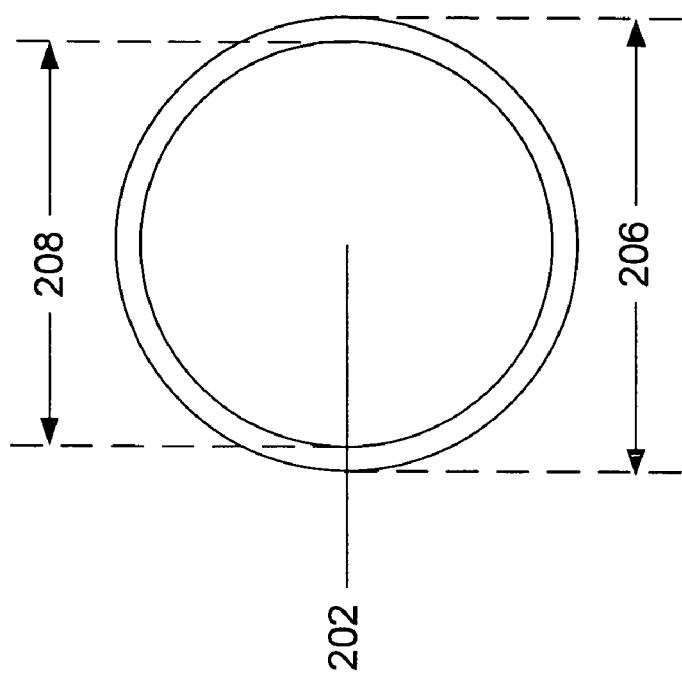
FIG. 2B is an end view of the halloysite rod of FIG. 2A.
Figure 2A:
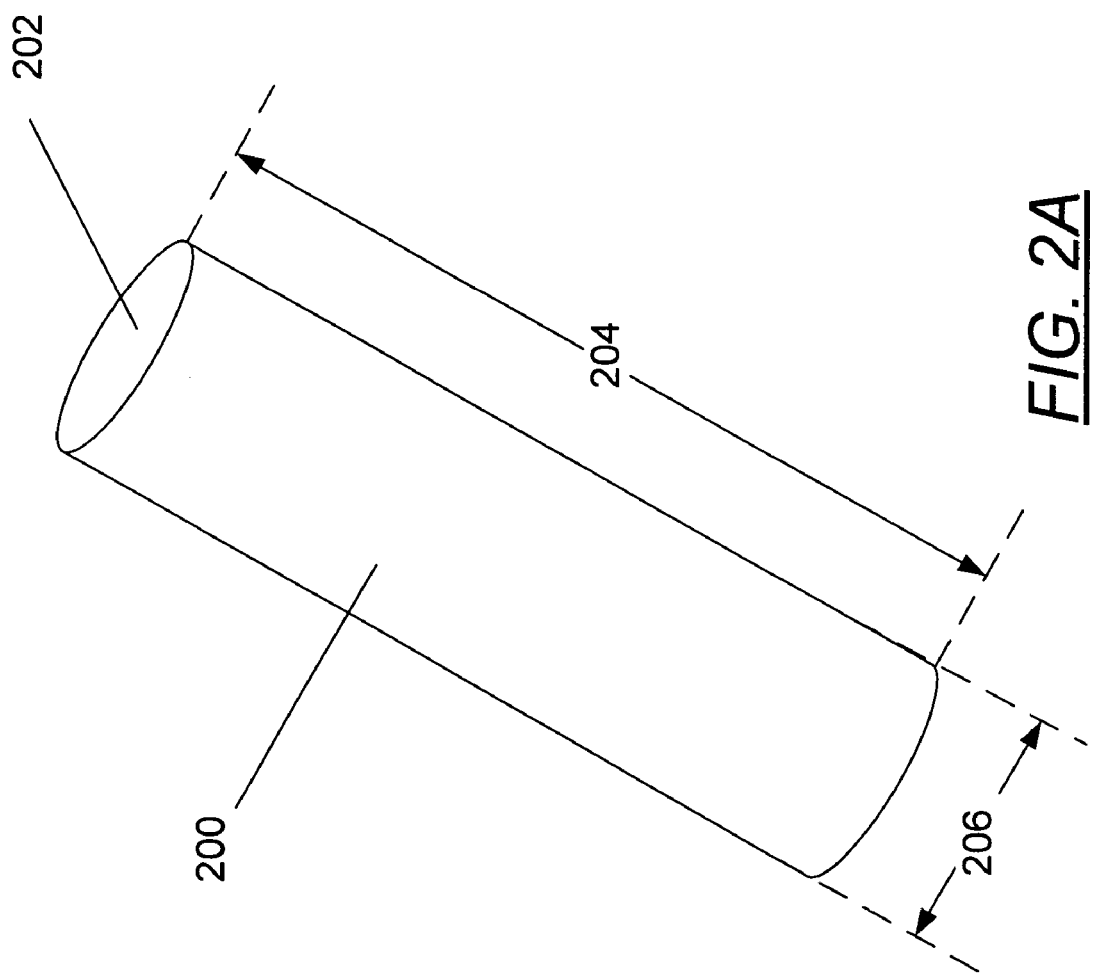
FIG. 2A is a perspective view of a single halloysite rod.

FIG. 2A is a perspective view of a single halloysite rod 200 and FIG. 2B is an end view of halloysite rod 200; this "halloysite rod" is also referred to in this specification as a "hydrated halloysite tubule." . Halloysite rod 200 is comprised of lumen 202. Without wishing to be bound to any particular theory, the applicants believe that molecular hydrogen (and/or other gases and/or other materials) may be disposed in lumen 202. Thus, halloysite rod 200 may, in one embodiment, function as a hydrogen storage apparatus in a manner similar to the hydrogen storage capability of carbon nanotubes but with improved storage efficiency In one embodiment, the length 204 of halloysite rods such as 200 vary from about 100 nanometers to about 1 micron or more. Transmission Electron Microscopy (TEM) shows that, in this embodiment, the inside diameter 208 of halloysite rods 200 ranges from about 0.02 to about 0.04 microns and the outside diameter 206 varies from about 0.04 to about 0.08 microns. As used in this specification, the term "aspect ratio" refers to the ratio of the length 204 to the outside diameter 206. In one embodiment, halloysite rods are selected which have an aspect ratio of from about 1 to about 10. In another embodiment, halloysite rods are selected which have an aspect ratio of from about 2 to about 8. In yet another embodiment, halloysite rods are selected which have an aspect ratio of from about 3 to about 10.

FIGS. 2A and 2B also illustrate another property of halloysite rods 200: their surface to volume ratio. The hollow lumen of the rods provides a high surface to volume ratio. In one embodiment, the halloysite rods 200 have a surface to volume ratio of about 1 to about 10,000. In another embodiment, the halloysite rods 200 have a surface to volume ratio of about 10 to about 1,000. Typically, the outer diameter 206 of halloysite rods is about 50 nanometers, the inner diameter 208 is about 20 nanometers, and the length may vary from about 200 to about 500 nanometers. In other embodiments, the length of the rod may be as long as several micrometers.

Figure 3:
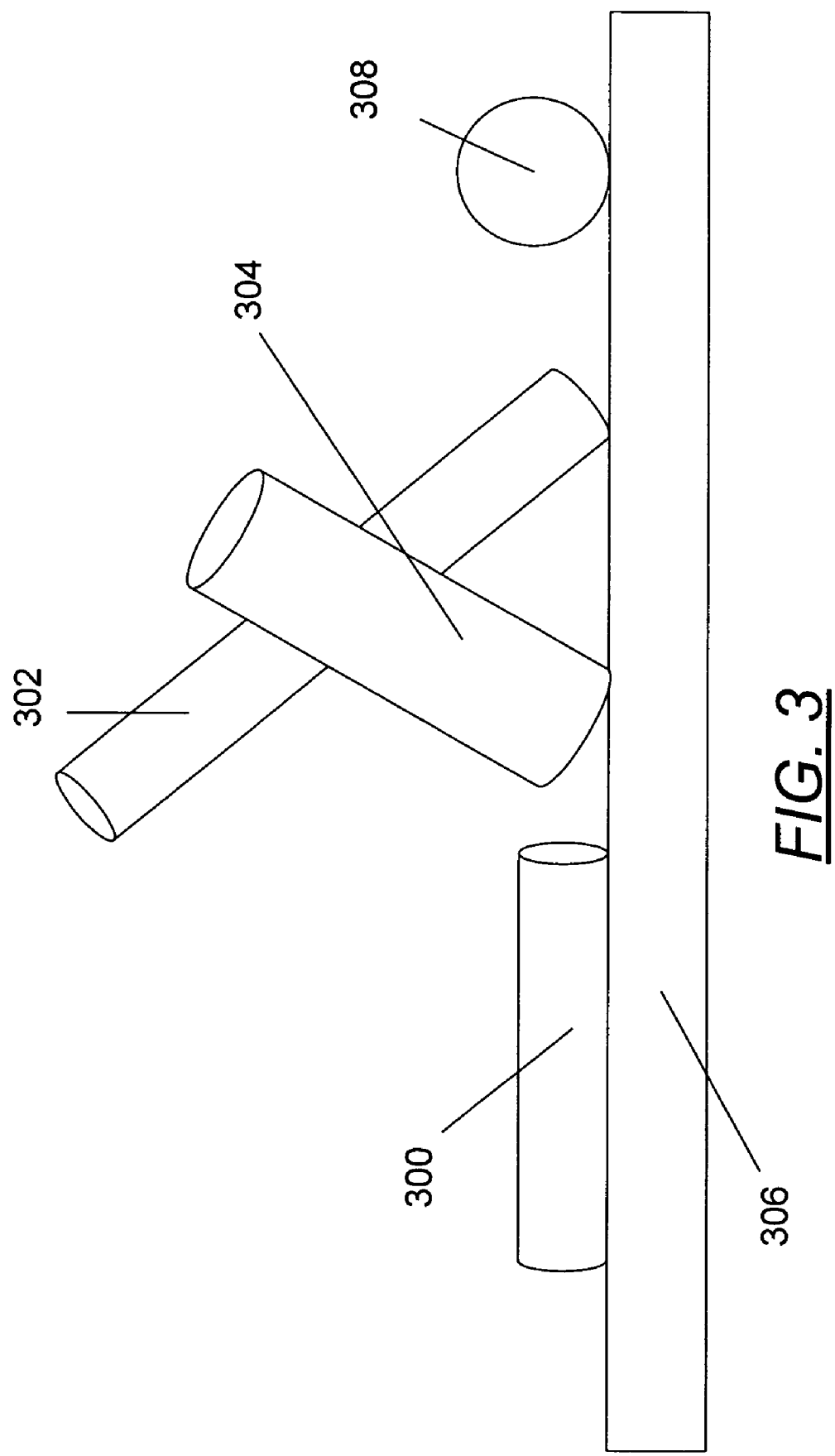
FIG. 3 is a schematic illustration of a multiplicity of halloysite rods disposed on a substrate.

FIG. 3 is a schematic illustration of a multiplicity of halloysite rods 300, 302 and 304 disposed on a substrate 306. In the embodiment depicted, rods 300, 302 and 304 each have different aspect ratios. In another embodiment (not shown) at least about 80 weight percent of the halloysite rods have substantially the same aspect ratio. In one such embodiment, the aspect ratio varies such that at least about 80 weight percent of the halloysite rods have an aspect ratio from about 3 to about 10. In another such embodiment, at least about 80 weight percent of the halloysite rods have an aspect ratio from about 5 to about 8.

As shown in the embodiment illustrated in FIG. 3, halloysite agglomerate 308 is also disposed on the surface of substrate 306. Without wishing to be bound to any particular theory, applicant believes that only the halloysite rods store appreciable amounts of molecular hydrogen. It is therefore desirable to minimize the amount of halloysite agglomerate 308 present on the surface of substrate 306. In one embodiment, the halloysite sample is comprised of at least about 30 weight percent halloysite rods and the remainder of the halloysite consists essentially of halloysite agglomerates. In anther embodiment, the halloysite sample is comprised of at least about 50 weight percent of halloysite rods. In yet another embodiment, the halloysite sample is comprised of at least about 60 weight percent of halloysite rods.

Figure 4:
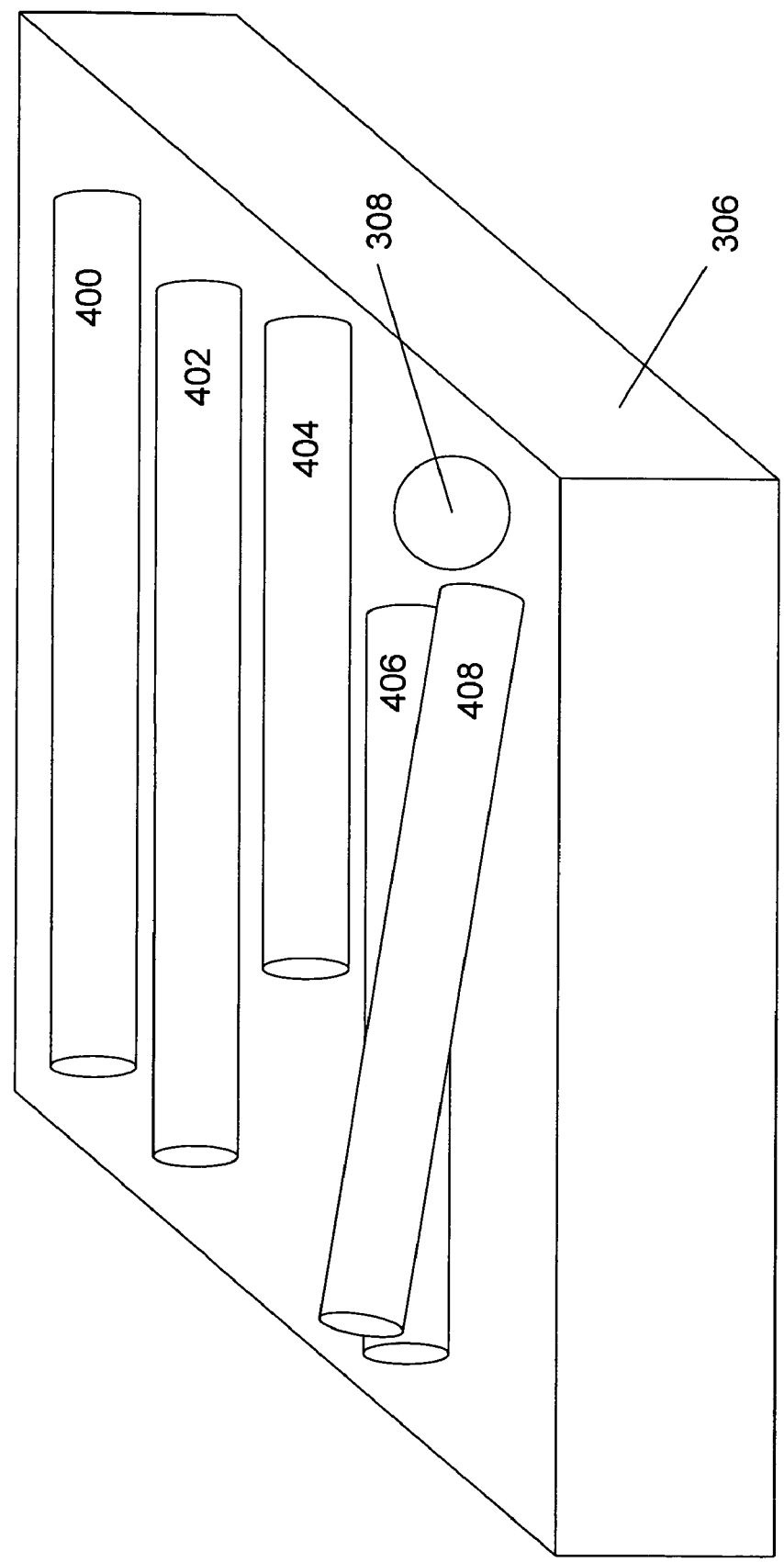
FIG. 4 is a perspective view of a substrate with halloysite rods disposed on the substrate.

FIG. 4 is a perspective view of a substrate with halloysite rods disposed thereon. In the embodiment depicted, substrate 306 is coated with halloysite rods 400, 402, 406 and 408. As illustrated in FIG. 4, halloysite rods 400 to 408 need not be parallel to one another, nor do they need to be parallel to the surface of substrate 306. For example, halloysite rod 408 is not parallel to the surface of substrate 306. Also disposed on the surface of substrate 306 is halloysite agglomerate 308. In one embodiment, substrate 306 is flexible, and can be folded into a tube or cylinder.

Figure 5C:
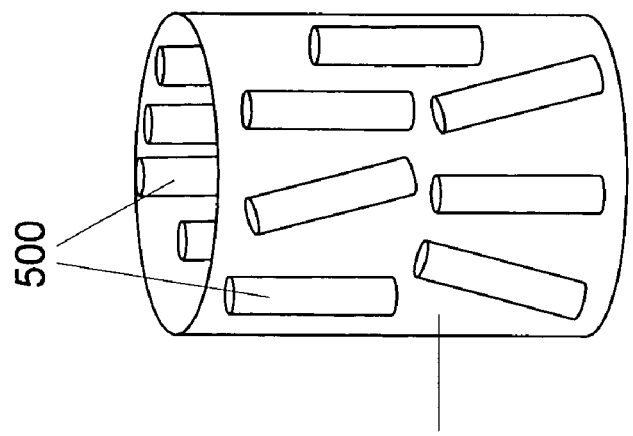
FIGS. 5A, 5B and 5C are perspective views of three tubular substrates with halloysite rods disposed thereon.
Figure 5B:
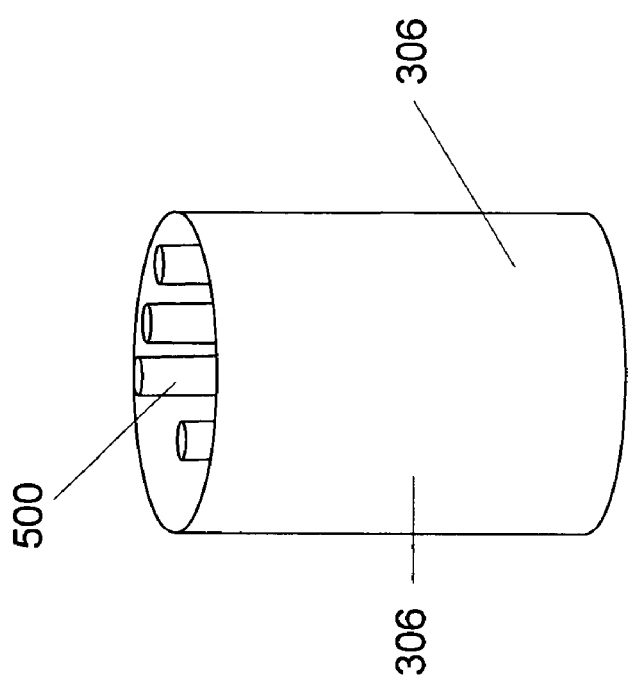
Figure 5A:
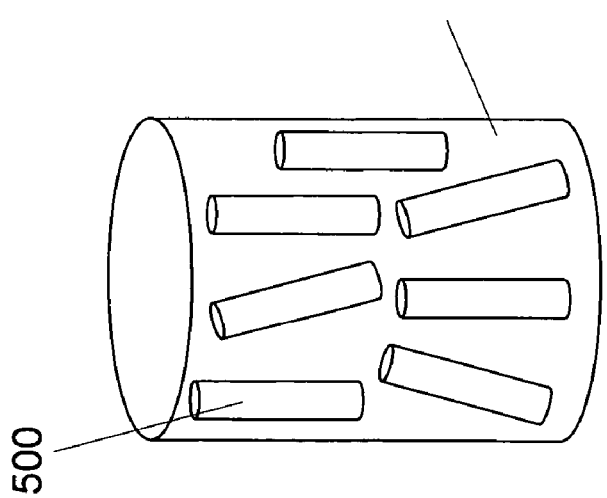

FIGS. 5A, 5B and 5C illustrate three embodiments wherein substrate 306 is sufficiently flexible to be folded into a tube or cylinder. In the embodiment depicted in FIG. 5A, the outer surface of flexible substrate 306 has been coated with halloysite rods 500. In the embodiment depicted in FIG. 5B, the inner surface of flexible substrate 306 has been coated with halloysite rods 500. In the embodiment depicted in FIG. 5C, both the inner and outer surface of flexible substrate 306 has been coated with halloysite rods 500.

FIG. 6 is a schematic view of one hydrogen storage apparatus of the present invention. The hydrogen storage apparatus 600 is comprised of flexible substrate 306 that, in the embodiment depicted, has halloysite rods 500 disposed on the surface thereof. Flexible substrate 306 has been folded into a tubular or cylindrical shape. Substrate 306 and halloysite rods 500 are disposed within sealed storage container 602. Storage container 602 is sealed such that it is substantially air-tight. The air-tight seal of storage container 602 may be broken by operating valves 604 and 606. In the embodiment depicted two such valves are illustrated. In another embodiment, only one such valve is used.

Figure 7:
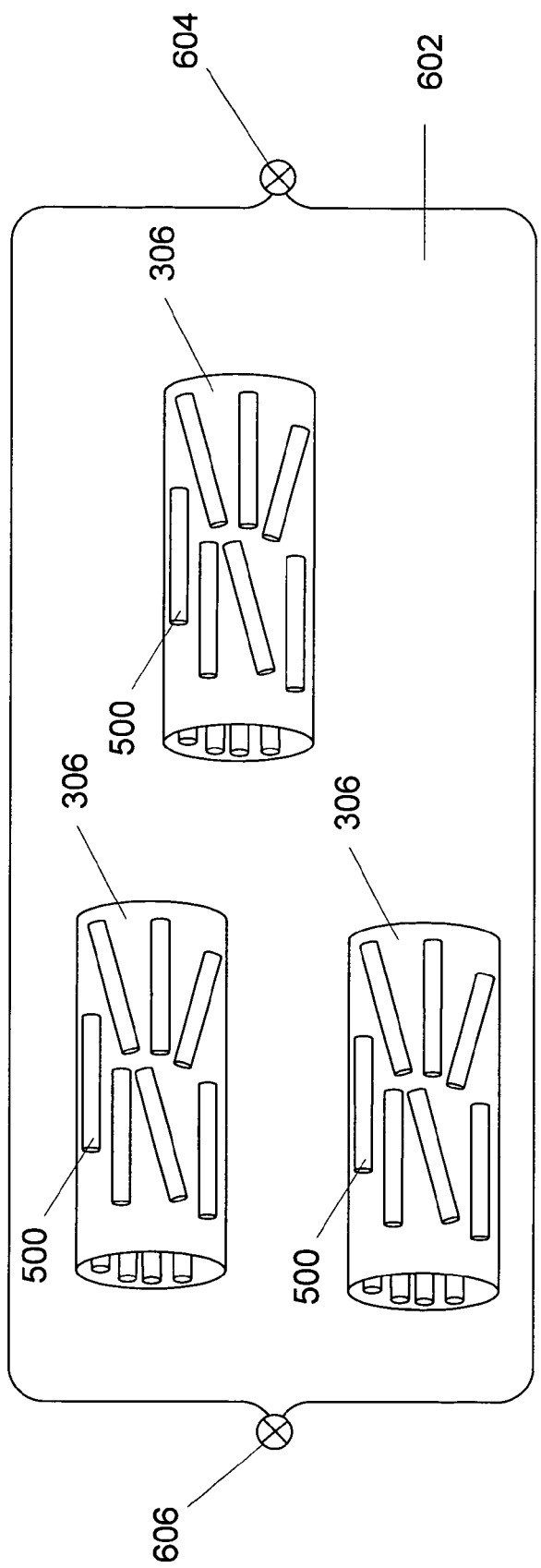
FIG. 7 is a schematic view of a plurality of substrates with halloysite rods disposed within a sealed storage container.

FIG. 7 is a schematic view of another hydrogen storage apparatus of the present invention. The hydrogen storage apparatus 700 is similar to apparatus 600 depicted in FIG. 6 except in that a plurality of substrates 306 are employed.

Figure 8:
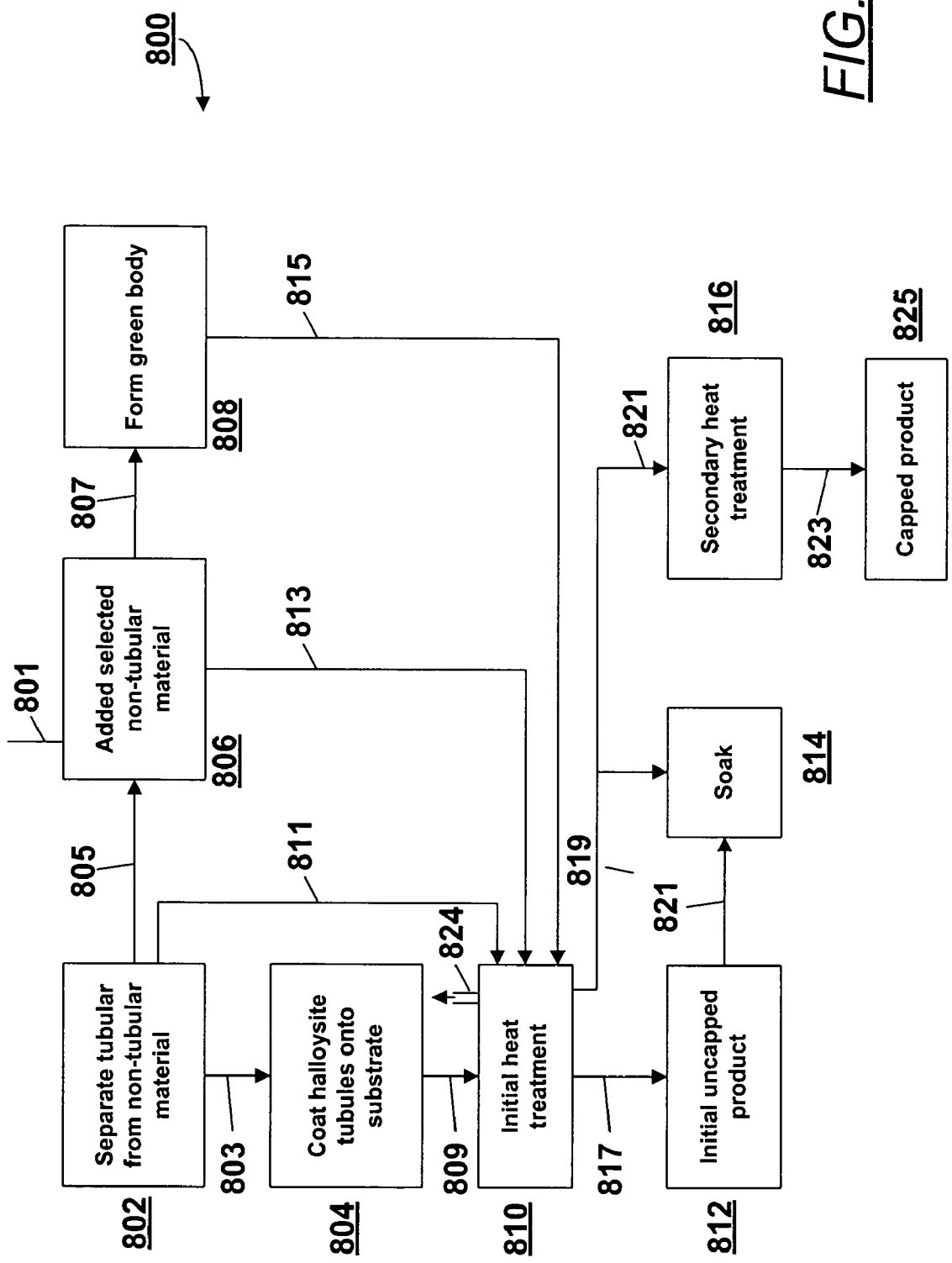
FIG. 8 is a flow diagram of a process for preparing shaped articles comprised of halloysite tubules.

FIG. 8 is a flow diagram of one process 800 of the invention. In step 802 of process 2, the tubular matter (such as, e.g., the halloysite tubules) are separated from the non-tubular matter (such as, e.g., the halloysite particulate matter and organic matter). One may use any conventional means for separating halloysite tubules from non-tubular matter.

It should be noted that, after that not all halloysite material contains halloysite tubules that are identical. Applicants have conducted XRD (X-ray Diffraction) analyses of two samples of naturally occurring halloysite samples identified as Halloysite AZ Mill (from Halloysite S. E. Wall AZ Mill (AZ sample)) and CA Mill (from Halloysite N. W. PitWall Canada Mill (CA sample)). It was found that the AZ samples contained more halloysite than the CA samples and that the AZ halloysite sample contained less than about 10 volume percent rods; the CA halloysite sample contained fewer rods than the AZ sample.

The halloysite material used in step 802 may be synthetic halloysite, or it may be a mixture of synthetic halloysite and naturally occurring halloysite. In one embodiment, some synthetic halloysite may be added in step 806 after the naturally occurring halloysite tubules have been separated in step 802.

As is known to those skilled in the art, procedures exist that allow one to synthesize halloysite in the laboratory. Reference may be had, e.g., to U.S. Pat. No. 4,098,676 to Robson (Synthetic Halloysites as Hydrocarbon Conversion Catalysts). The entire disclosure of this United States patent is hereby incorporated by reference into this specification.

Referring to U.S. Pat. No. 4,098,676, the synthetic halloysite described therein has a surface area greater than 85 square meters per gram. This United States patent claims (in claim 1) "1. A process for the conversion of hydrocarbons, which comprises contacting said hydrocarbons at hydrocarbon converting conditions with a synthetic, non-acid treated halloysite containing less than 0.05 wt. % iron and having a surface area greater than 85 sq. meters/gram." Claim 2 of this patent describes "2. A process for the conversion of hydrocarbons which comprises contacting said hydrocarbons and hydrocarbon converting conditions with a synthetic, non-acid treated halloysite having a surface area greater than 85 sq. meters/gram and having the empirical formula: [x Al+3/n (1−x)M]2 O3. (2+y)SiO2.2H2 O where M is a metal selected from Groups IIA, IIB, VIII and VIII of the Periodic Table; n is valence of M; x is equal to or less than 1; and y=0 to 1."

The preparation of the synthetic halloysites of U.S. Pat. No. 4,098,676 is described at columns 2-4 of such patent, wherein it is disclosed that "Preparation of the synthetic halloysite of the invention involves the reaction of hydrous alumina gel, i.e., Al(OH)3, and a source of silica. The hydrous alumina gel is prepared in accordance with known techniques such as by the reaction of aqueous mixtures of aluminum chloride or aluminum sulfate and an inorganic base such as NH4 OH, NaOH or NaAlO2, and the like. Preparation of alumina gel by use of ammonium hydroxide is preferable to the use of sodium hydroxide since it is desirable to maintain the soda (Na2 O) content to a low level and because the more alkaline gels tend to form crystalline boehmite."

U.S. Pat. No. 4,098,678 also discloses that "The silica source may include those sources which are conventionally used for the preparation of crystalline aluminosilicate zeolites. These include silicic acid, silica sol, silica gel, sodium silicate, etc. Silica sols are particularly useful. These are colloidal dispersions of discrete spherical particles of surface-hydroxylated silica such as is sold by E. I. du Pont de Nemours & Company, Inc. under the trademark "Ludox"."

U.S. Pat. No. 4,098,678 also discloses that "The proportions of the reactants employed in the initial reaction mixture are determined from the following molar ratio of reactants. . . . The pH of the reaction mixture should be adjusted to a range of about 4 to 10, preferably 6 to 8. The temperature of the reaction mixture should preferably be maintained at between about 230° and 270° C., more preferably 240° to 250° C., for a period from about 2 hours to 100 hours or more. The time necessary for crystallization will depend, of course, upon the temperature of the reaction mixture. By way of example, the crystallization of the synthetic halloysite occurs in about 24 hours at a temperature of about 250° C."

U.S. Pat. No. 4,098,678 also discloses that "The catalytic activity of the synthetic halloysites of the invention can be improved by incorporating therein metals selected from Groups IIA, IIIB, VIII, and VIII of the Periodic Table as given in "Websters Seventh New Collegiate Dictionary", (1963) published by G. C. Merriam Company. Specific examples of such metals include, among others, magnesium, lanthanum, molybdenum, cobalt, nickel, palladium, platinum and rare earths. Particularly preferred metals include magnesium, nickel, cobalt and lanthanum. The metals are incorporated into the synthetic halloysite structure by adding soluble salts of the metal to the reaction mixture or by coprecipitation of the metal hydroxide with Al(OH)3. The metals are most conveniently added to the reaction mixture in the form of their hydroxides. The synthetic halloysite of the invention, particularly when substituted with the afore-described metals, is useful for catalytic cracking, hydrocracking, desulfurization, demetallization and other hydrocarbon conversion processes. For example, substituted halloysites of the invention containing metals such as magnesium, lanthanum and rare earths such as cerium, praseodymium, neodymium, gadolinium, etc. are useful in catalytic cracking of petroleum feedstocks. Synthetic halloysite containing nickel, cobalt, palladium, platinum, and the like are particularly useful for hydrocracking petroleum feedstocks."

U.S. Pat. No. 4,098,678 also discloses that "The feedstocks suitable for conversion in accordance with the invention include any of the well-known feeds conventionally employed in hydrocarbon conversion processes. Usually they will be petroleum derived, although other sources such as shale oil are not to be excluded. Typical of such feeds are heavy and light virgin gas oils, heavy and light virgin naphthas, solvent extracted gas oils, coker gas oils, steam-cracked gas oils, middle distillates, steam-cracked naphthas, coker naphthas, cycle oils, deasphalted residua, etc."

U.S. Pat. No. 4,098,678 also discloses that "The operating conditions to be employed in the practice of the present invention are well-known and will, of course, vary with the particular conversion reaction desired. The following table summarizes typical reaction conditions effective in the present invention . . . ."

U.S. Pat. No. 4,098,678 also discloses that "The halloysite structure of the composition of this invention has been confirmed by X-ray diffraction and electron microscopy. However, there are a number of significant differences between naturally occurring halloysite and the synthetic halloysite of this invention. For example, the synthetic halloysites of the invention have surface areas ranging from about 85 sq. meters/gram to about 200 sq. meters/gram (BET Method as used, for example, in U.S. Pat. No. 3,804,741) as compared to naturally occurring halloysite which has a surface area generally within the range of 40-85 sq. meters/gram (BET Method). Further, the synthetic halloysite of the invention will be substantially iron-free, i.e., less than 0.05% iron, as compared to naturally occurring halloysite which contains significant amounts of iron. The synthetic and naturally occurring halloysites also differ in that the physical form of the synthetic halloysite is flakes, while the physical form of the natural halloysite has a tube-like configuration. Furthermore, it has been discovered that the synthetic halloysite has considerably better catalytic activity than natural halloysite under analogous hydrocarbon conversion conditions. Although the synthetic halloysite has the same empirical formula as naturally occurring halloysite, the higher surface area, the elimination of iron and the presence of selective metals makes the synthetic halloysite a more effective hydrocarbon conversion catalyst."

One may also utilize the synthetic halloysite described in U.S. Pat. No. 4,150,099 in the process of the invention, preferably as an additive in sep 806; the entire disclosure of such patent is hereby incorporated by reference into this specification. Claim 1 of this patent describes "1. A process for preparing halloysite which comprises forming a reaction mixture of aluminum hydroxide gel, silica sol and water having a Al(OH)3/SiO2 molar ratio in the range of 0.5 to 1.2 and a H2 O/SiO2 molar ratio in the range of 20 to 60 and maintaining said reaction mixture at a pH in the range of 4 to 10 and a temperature of about between 230° and 270° C. for a time sufficient to permit crystallization of halloysite."

The synthetic halloysite used in the process of applicants' invention may be a chlorinated halloysite, as that term is defined in U.S. Pat. No. 4,798,630, the entire disclosure of which is hereby incorporated by reference into this specification. Claim 1 of U.S. Pat. No. 4,798,630 describes a process for chlorinating an aluminosilicate clay mineral starting composition, describing "1. A method for chlorinating and functionalizing an aluminosilicate clay mineral starting composition, comprising: reacting said clay mineral composition selected from one or more members of the group consisting of clays of the halloysite, illite, kaolinite, montmorillonite, and polygorskite groups in substantially dry particulate form with gaseous SiCl4 to activate the surface of said composition, thereby forming a reactive chloride intermediate, said reaction being conducted at temperatures in the range of from about 56° C. to below 300° C.; maintaining said intermediate in a substantially dry state until used for further reaction; and thereafter functionalizing said intermediate with an active organic group."

The synthetic halloysite may be a halloysite that has undergone cation exchange with a specified cation. Such a "cation halloysite" is described, e.g., in claims 22, 28, and 29 of U.S. Pat. No. 5,530,052, the entire disclosure of which is hereby incorporated by reference into this specification; reference also may be had, e.g., to U.S. Pat. No. 5,707,439. As is disclosed in column 1 of U.S. Pat. No. 5,530,052, "Efforts have been disclosed for preparing polymeric nanocomposites. In International Application WO 94/11430, nanocomposites having two essential components are described and the two essential components are gamma phase polyamides and layered and fibrillar inorganic materials which are treated with quaternary ammonium cations . . . . Still other efforts have been made to prepare composite materials containing a layered silicate. In U.S. Pat. No. 4,889,885, a composite material having high mechanical strength and heat resistance which is suitable for use in automotive parts, aircraft parts and building materials is described . . . . The instant invention is patentably distinguishable from the, above-described since, among other reasons, it is directed to novel layered minerals that have undergone a cation exchange with at least one heteroaromatic cation comprising a positively charged organo-substituted heteroatom and/or a positively charged heteroatom not part of an aromatic ring with at least one bond having a bond order greater than one, and compositions prepared therefrom. Additionally, the instant invention is directed to novel compositions prepared from low viscosity macrocyclic oligomers."

The synthetic halloysite may be an organophilic halloysite, as described in U.S. Pat. No. 6,197,849, the entire disclosure of which is hereby incorporated by reference into this specification. Claim 1 of this patent describes "1. An organophilic phyllosilicate which has been prepared by treating a naturally occurring or synthetic phyllosilicate, or a mixture of such silicates, with a salt of a quaternary or other cyclic amidine compound or with a mixture of such salts." Claim 2 describes "2. An organophilic phyllosilicate according to claim 1, whose preparation uses naturally occurring or synthetic smectite clay minerals, bentonite, vermiculite and/or halloysite . . . " Claim 3 describes "3. An organophilic phyllosilicate according to claim 1, which has a distance between layers of from about 0.7 nm-1.2 nm (nanometers) and a cation-exchange capacity in the range from 50-200 meq/100 g."

The organophylosilicates of these claims are further described in column 1 of U.S. Pat. No. 6,197,849, wherein it is disclosed that "It is known that organophilic phyllosilicates prepared, for example, by ion exchange, can be used as fillers for thermoplastic materials and also for thermosets, giving nanocomposites. When suitable organophilic phyllosilicates are used as fillers, the physical and mechanical properties of the mouldings thus produced are considerably improved. A particular interesting feature is the increase in stiffness with no decrease in toughness. Nanocomposites which comprise the phyllosilicate in exfoliated form have particularly good properties."

U.S. Pat. No. 6,197,849 also discloses that "U.S. Pat. No. 4,810,734 has disclosed that phyllosilicates can be treated with a quaternary or other ammonium salt of a primary, secondary or tertiary linear organic amine in the presence of a dispersing medium. During this there is ion exchange or cation exchange, where the cation of the ammonium salt becomes embedded into the space between the layers of the phyllosilicate. The organic radical of the absorbed amine makes phyllosilicates modified in this way organophilic. When this organic radical comprises functional groups the organophilic phyllosilicate is able to enter into chemical bonding with a suitable monomer or polymer. However, the use of the linear amines mentioned in U.S. Pat. No. 4,810,734 has the disadvantage that they decompose thermally at the high temperatures of up to 300° C. usually used for thermoplastics processing and can discolour the product. The formation of decomposition products can lead to emissions and to impairment of mechanical properties, for example impact strength."

U.S. Pat. No. 6,197,849 also discloses that "Surprisingly, it has now been found that organophilic phyllosilicates which have been prepared by treating phyllosilicates, i.e. using cation exchange with salts of quaternary or other cyclic amidine compounds, have greater thermal stability during processing combined with excellent dispersing effect and interfacial adhesion. When the amidinium compounds according to the invention are used in thermosets there is no change in the stoichiometry of the reactive components, in contrast to the use of linear ammonium salts, and this allows addition to the thermosetting materials of an increased proportion of tillers. If the cyclic amidines used contain reactive groups the organophilic phyllosilicates prepared therewith and used as fillers can be covalently linked to the matrix by grafting. Amidinium ions derived, for example, from hydroxystearic acid or hydroxyoleic acid have surprisingly good layer separation combined with excellent adhesion to a wide variety of polymers and fillers. In contrast to the prior art alkyl groups with nonterminal hydroxyl groups in particular are useful, as well as alkyl substituents with terminal hydroxyl groups. The hydroxyl groups in the alkyl side chain may easily be derivatized in order to tailor a system-specific property spectrum. The compounds also create excellent dispersing effect and interfacial adhesion. It is also surprising that, despite their bulk, the heterocyclic amidine salts according to the invention, with long substituted or unsubstituted alkyl radicals, exchange cations efficiently within the spaces between the layers of the phyllosilicates."

The synthetic halloysite may be an acidified calcined halloysite, as that term is defined in U.S. Pat. No. 6,294,108, the entire disclosure of which is hereby incorporated by reference into this specification. Claim 1 of this patent refers to "1. A dry solid composition for generating chlorine dioxide gas consisting essentially of a combination of at least one dry metal chlorite and at least one dry solid hydrophilic material comprising at least one inorganic material selected from the group consisting of hydrous clays, calcined clays, acidified clays and acidified calcined clays, wherein said combination is one which passes both the Dry Air and Humid Air Tests." Claim 6 of this patent refers to a "hydrous halloysite," stating "6. The composition of claim 1 wherein the hydrous clay is selected from the group consisting of bentonite, kaolin, attapulgite and halloysite." Claim 7 refers to "calcined halloysite," stating "7. The composition of claim 1 wherein the calcined clay is selected from the group consisting of metakaolin, spinel phase kaolin, calcined bentonite, calcined halloysite and calcined attapulgite." Claim 8 refers to "acidified halloysite," stating "8. The composition of claim 1 wherein the acidified clay is selected from the group consisting of bentonite, kaolin, attapulgite and halloysite that have been contacted with one or more acidic solutions containing sulfuric acid, hydrochloric acid, nitric acid or other acidic compounds so that the pH of the resulting liquid phase of the mixture is below 10.5." Claim 9 refers to "acidified, calcined halloysite," stating "9. The composition of claim 1 wherein the acidified calcined clay is selected from the group consisting of metakaolin, spinel phase kaolin, calcined bentonite, calcined halloysite and calcined attapulgite that have been contacted with one or more acidic solutions containing sulfuric acid, hydrochloric acid, nitric acid or other acidic compounds so that the pH of the resulting liquid phase of the mixture is below 10.5."

The synthetic halloysite may be an organophilic halloysite, as that term is defined in U.S. Pat. No. 6,617,020. The term "organophilic clay" is described in the claims of U.S. Pat. No. 6,617,020, the entire disclosure of which is hereby incorporated by reference into this specification. Claim 1 of U.S. Pat. No. 6,617,020 describes "1. A composition comprising: at least one elastomer; organophilic clay plate-like particles; and at least one non-volatile organophilic exfoliating agent; wherein the composition is a hot melt processable pressure sensitive adhesive." Claim 5 describes the "organophilic clay plate-like particles" as comprising ". . . organophilically modified versions of hydrated aluminum silicate, kaolinite, atapulgite, illite, bentonite, halloysite, beidelite, nontronite, hectorite, hectite, saponite, montmorillonite, and combinations thereof." Claim 6 describes the "organophilic exfoliating agent" as comprising ". . . a resin having a number average molecular weight of less than about 20,000 g/mol."

The term "organophilic clay" is defined at column 2 of U.S. Pat. No. 6,617,020 as including ". . . a clay that has been surface-modified to convert at least a portion of its surface nature from an organophobic state to an organophilic state (preferably to a hydrophobic state). For example, in one embodiment, a clay may initially have both organophobic and organophilic sites. However, upon modification according to the present invention, at least a portion of the organophobic sites are converted to organophilic sites. In other embodiments, a clay initially contains essentially only organophobic sites and, upon modification according to the present invention, at least a portion of the organophobic sites are converted to organophilic sites. Preferably, at least about 50% of exchangeable cations on the unmodified organophilic clay are exchanged with organophilic modifying cations."

The term "organophilic exfoliating agent" is defined in column 2 of U.S. Pat. No. 6,617,020 as including ". . . an organophilic material capable of separating an organophilic clay sheet into plate-like particles and maintaining the clay in plate-like particles at the use temperature (typically room temperature, i.e., about 21° C.)."

"Organophilic clays" and "organophilic exfoliating agents" are also described at columns 5-6 of U.S. Pat. No. 6,617,020, wherein it is disclosed that "Organophilic clay is obtainable by modifying a hydrophilic clay such that the clay is organophilic. Conventional hydrophilic clays are generally not able to be adequately exfoliated according to the present invention. Thus, the present invention utilizes organophilic clays to achieve a higher degree of exfoliation in the clay."

U.S. Pat. No. 6,617,020 also discloses that "The hydrophilic clay to be modified can be any phyllosilicate or other clay that has a sheet-like structure. Examples thereof include, but are not limited to, hydrated aluminum silicate, kaolinite, atapulgite, illite, halloysite, beidelite, nontronite, hectorite, hectite, bentonite, saponite, and montmorillonite. The smectite clays such as, for example, beidelite, nontronite, hectorite, hectite, bentonite, saponite, and montmorillonite are preferred."

U.S. Pat. No. 6,617,020 also discloses that "The organophilic clays useful for the invention may be prepared from commercially available hydrophilic clays. The following is an example of a method of preparing organophilic clay: The hydrophilic clay is stirred and dissolved in water to form an exfoliated hydrophilic clay solution. Then, depending on the clay, exchangeable ions (e.g., sodium or calcium ions), for example, of the hydrophilic clay are exchanged with organophilic modifying cations. Typical organophilic modifying cations comprise onium cations. For example, such cations include, but are not limited to, C2 to C60 alkyl primary, secondary, tertiary, and quaternary ammonium cations and quaternary phosphonium cations. Examples thereof include, but are not limited to, (meth)acrylate ammonium cations, such as 2-(dimethylammonium)ethyl methacrylate cations, octadecylammonium cations, dimethyl dihydrogenated tallow ammonium cations, thiol group functionalized alkyl ammonium cations, and combinations thereof. Exchange of the hydrophilic clay ions with organophlic modifying cations causes the modified clay to precipitate from the water solution. The precipitated clay (which is no longer in an exfoliated state) is then dried to remove excess water.

U.S. Pat. No. 6,617,020 also discloses that "Some organophilic clays are commercially available. For example, organophilically-modified montmorillonite is available as SCPX CLOISITE 20A, SCPX CLOISITE 15A, SCPX CLOISITE 10A, SCPX CLOISITE 6A, SCPX CLOISITE 30b, and SCPX CLOISITE 2398 from Southern Clay Products; Gonzalez, Tex., and under the trade designation, NANOMER, from Nanocor Inc.; Arlington Heights, Ill."

U.S. Pat. No. 6,617,020 also discloses that "The composition of the invention typically comprises any suitable amount of organophilic clay. Generally, the amount of organophilic clay present is such that the overall composition is a pressure sensitive adhesive. Preferably the composition includes about 1 to about 40 weight percent of the organophilic clay plate-like particles, more preferably about 1 to about 20 weight percent, and most preferably 1 to about 10 weight percent based on the total weight of the composition. The exact amount varies depending on, for example, the type of elastomer and the presence and amount of other components in the composition."

U.S. Pat. No. 6,617,020 also discloses that "The composition of the invention typically comprises about 1 to about 75 weight percent of a non-volatile organophilic exfoliating agent based on the total weight of the composition. A non-volatile organophilic exfoliating agent is used to exfoliate the organophilic clay. It has been found that the organophilic clay can be easily exfoliated by exfoliating agents, that are low molecular weight resins. Examples of useful low molecular weight resins include, but are not limited to, tackifying agents and low molecular weight block copolymers such as styrene-isoprene block copolymers, styrene-butadiene block copolymers, and hydrogenated block copolymers. Such exfoliating agents typically have a number average molecular weight of less than about 20,000 g/mol, preferably less than about 10,000 g/mol, and most preferably less than about 5,000 g/mol."

The synthetic halloysite may be a halloysite bridged with a metal compound, as that term is defined in U.S. Pat. No. 6,674,009, the entire disclosure of which is hereby incorporated by reference into this specification. As is disclosed in such patent, and as is described in claim 3 thereof, the bridged clay may be selected from the group consisting of ". . . montmorillonite, laponite, beidellite, nontronite, saponite, sauconite, hectorite, stevensite, kaolinite, halloysite, vermiculite, and sepiolite, or one of their synthetic or naturally interstratified mixtures . . . ." As is disclosed at column 2 of this patent, "The starting clay treated with a solution of a salt of a metallic compound, preferably a solution of iron and/or aluminum salt. After drying and heat treatment, a bridged clay is obtained."

Referring again to FIG. 8, and to step 802 thereof, there are several techniques to separate and/or select halloysite rods from halloysite agglomerates. In one embodiment, step 802 is comprised of the step of using electrostatic techniques to select halloysite rods.

One may use any of the conventional electrostatic separation techniques and/or apparatuses known to those skilled in the art. Reference may be had, e.g., to U.S. Pat. No. 3,625,360 (electrostatic separation method and apparatus), U.S. Pat. No. 3,835,996 (process for the electrostatic separation of clay), U.S. Pat. No. 3,891,537 (electrostatic separation apparatus), U.S. Pat. No. 4,066,526 (method and apparatus for electrostatic separating dispersed matter from a fluid medium), U.S. Pat. No. 5,147,045 (particulate separations by electrostatic coalescence), U.S. Pat. No. 5,256,270 (electrostatic separating apparatus), U.S. Pat. No. 5,542,543 (electrostatic separation and classification apparatus), U.S. Pat. No. 5,704,490 (electrostatic separation of particulate material), U.S. Pat. No. 5,829,598 (method and apparatus for electrostatic separation), U.S. Pat. No. 6,290,919 (electrostatic separating apparatus), U.S. Pat. No. 6,320,148 (electrostatic method of separating particulate materials), U.S. Pat. No. 6,323,451 (particle separation system using parallel multistage electrostatic separators), U.S. Pat. No. 6,329,623 (electrostatic separation apparatus and method using box-shaped electrodes), U.S. Pat. No. 6,498,313 (electrostatic particle separation system, apparatus, and related method). The entire disclosure of each of these United States patents is hereby incorporated by reference into this specification.

The device disclosed in U.S. Pat. No. 5,542,543 is of interest, for it allows one both to separate and classify the materials in the raw halloysite material. Claim 1 of this patent describes "1. An apparatus for separating and classifying powders and/or particles by using different fall positions depending upon difference in polarity of said powders and/or particles which are charged, said apparatus comprising:

a pair of spaced electrodes for producing an electrostatic field therebetween;

a pair of insulative endless belts covering respective opposite surfaces of said electrodes, said belts being opposed to each other and fed in circulation; and a pair of deposit scratching members remote from a position in which the electrostatic field produced between said electrodes works and contacting outer surfaces of said endless belts throughout their width, respectively; a pair of support frames, each of said support frames carrying one of said pair of electrodes, one of said pair of endless belts, and one of said pair of scratching members, one of said support frames being a movable frame adapted for movement toward and away from the other said support frame."

By way of further illustration of electrostatic separation techniques, and as is disclosed in a paper by Yuri M. Lvov, entitled "Nanofabrication of ordered multilayers by alternate adsorption of polyions, nanoparticles and proteins: From planer films to microtemplates." [online], [retrieved on 2005 Mar 27]. <URL: http://www2.1atech.edu/~ylvov/research.html>, "At pH above 4, halloysite is negatively charged." In one embodiment, a positively charged substrate is brought into the proximity of a crude halloysite sample. The negatively charged particles of halloysite are attracted to the positively charged substrate. As the mass of the halloysite particle increases, a larger positive charge is required to move the particle. Therefore, one can select hollow halloysite rods (low density) from relatively solid halloysite agglomerates (higher density) by simply altering the amount of positive charge on the substrate."

Referring again to FIG. 8, and in step 802 thereof, in another embodiment, centrifugal techniques are used to select the halloysite rods. As it known to those skilled in the art, centrifugation is a well known technique that separates particles and solutions based on a variety of factors, including particle density, density of the supporting media, particle shape, and particle mass. A wide variety of centrifugation techniques have been developed to separate particulates. In one embodiment, continuous flow centrifugation is used to separate large quantities of halloysite rods from crude halloysite. Reference may be had to U.S. Pat. No. 5,641,622 to Lake (Continuous Centrifugation Process for the Separation of Biological Components from Heterogeneous Cell Populations); U.S. Pat. Nos. 5,053,127 and 4,944,883 to Schoendorfer (Continuous Centrifugation System and Method for Directly Deriving Intermediate Density Material from a Suspension); and the like. In another embodiment, equilibrium centrifugation is used. Reference may be had to U.S. Pat. No. 5,171,206 to Marque (Optimal Centrifugal Separation). In yet another embodiment, elutriation centrifugation is used. Reference may be had to U.S. Pat. No. 5,674,173 to Hlavinka (Apparatus for Separating Particles); U.S. Pat. No. 5,722,923 to Hlavinka (Method for Separating Particles); U.S. Pat. Nos. 5,913,768 and 5,906,570 to Langley (Particle Filter Apparatus); U.S. Pat. No. 5,951,877 to Langley (Particle Filter Method); U.S. Pat. No. 5,939,319 to Hlavinka (Particle Separation Method and Apparatus); U.S. Pat. No. 6,051,146 to Green (Methods for Separation of Particles); U.S. Pat. No. 6,071,422 to Hlavinka (Particle Separation Method and Apparatus); U.S. Pat. No. 6,354,986 to Hlavinka (Reverse-Flow Chamber Purging During Centrifugal Separation); and the like. The content of each of the aforementioned patents is hereby incorporated by reference into this specification.

In another embodiment, a simple filtering technique is used wherein the small agglomerates are removed, thus increasing the percentage of rods. In another embodiment, the halloysite rods are obtained by synthesizing the rods. In yet another embodiment, the density difference between halloysite rods and halloysite agglomerates is exploited, and the halloysite is disposed in an appropriate liquid with the desirable density.

In another embodiment, and referring again to step 802 of FIG. 8, rods are selected by first placing the crude halloysite within a media of a selected density. Those halloysite particles with a density substantially similar to the density of the media will be buoyant and are thus easily isolated from the particles wherein the density is not substantially similar. Similar technology is well known to those skilled in the art. Reference may be had to U.S. Pat. No. 4,547,286 to Hsiung (Water Filtration Process and Apparatus Having Upflow Filter with Buoyant Filter Media and Downflow Filter with Nonbuoyant Filter Media), the content of which is hereby incorporated by reference into this specification. As is also known to those skilled in the art, similar buoyancy based separation may be combined with centrifugation techniques. Such techniques are often referred to as equilibrium centrifugation or gradient centrifugation and utilize CsCl as the media.

Any of the aforementioned techniques may be used to select halloysite rods of a specified morphology, for example, a certain aspect ratio. In one embodiment, halloysite rods are selected which have an aspect ratio of from about 1 to about 10. In another embodiment, halloysite rods are selected which have an aspect ratio of from about 2 to about 8. In yet another embodiment, halloysite rods are selected which have an aspect ratio of from about 3 to about 10. Additional information related to the isolation of halloysite rods can be found in applicant's co-pending patent application U.S. Ser. No. 11/042,219, filed on Jan. 25, 2005, the content of which is hereby incorporated by reference into this specification.

One preferred process for separating the halloysite tubular material involves suspending the halloysite material in slurry (water) at 10 to 95 weight percent, by weight of halloysite. The halloysite material then is preferably poured into a test tube filled with water, and the tube is then placed into a centrifuge. The tube is thus subjected to centrifugation until the water phase and the halloysite are separately formed. The water is decanted, and solid material is then poured onto filter paper with a pore size of 10 microns to 100 microns. The agglomerated materials will stay on the paper, and the tubules will pass through it. Then the tubules can be air dried or dried in an oven at a temperature of about 80 degrees C. One aspect of this process is illustrated in FIG. 9.

Figure 9:
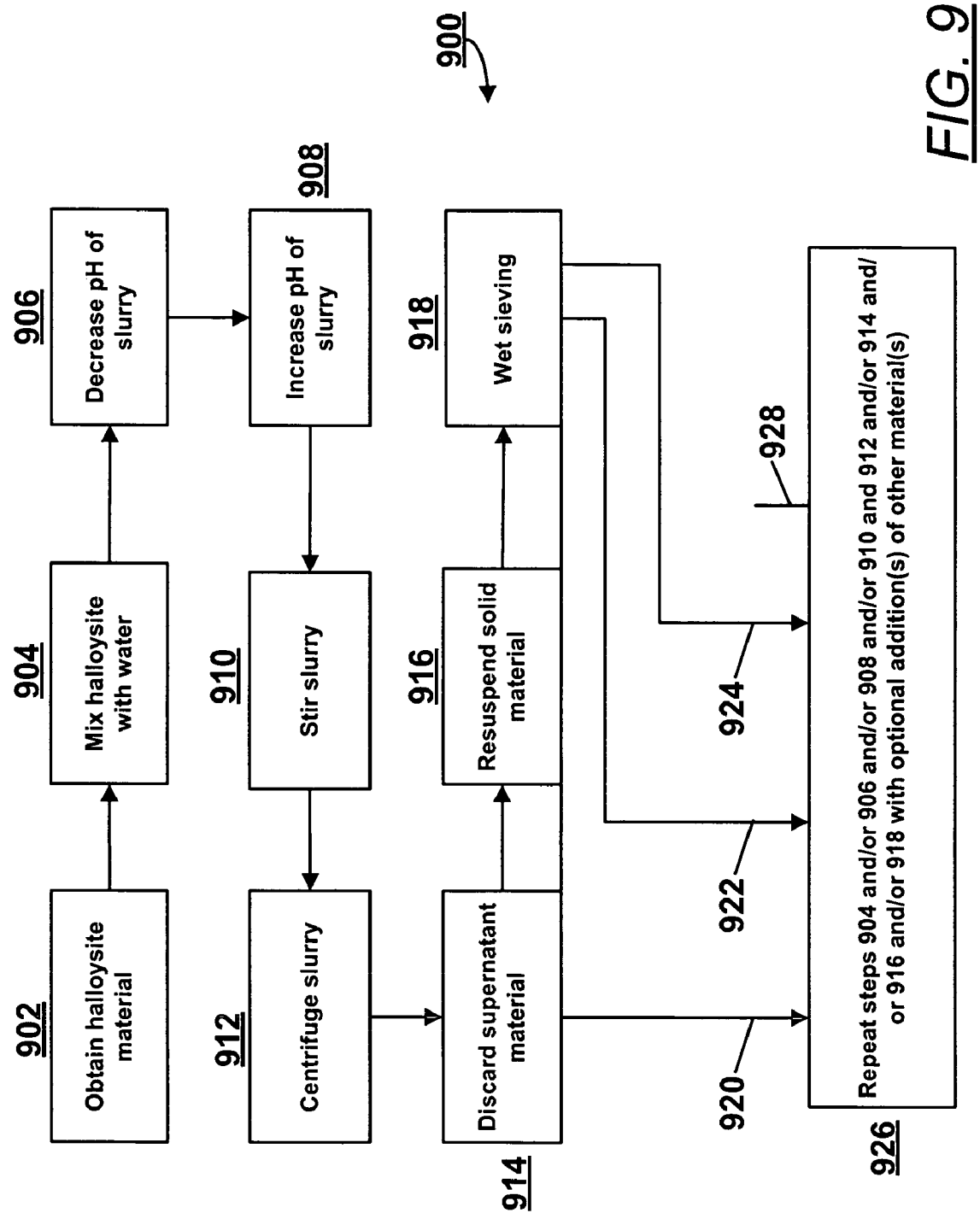
FIG. 9 is a flow diagram of a process for isolating halloysite tubules from non-tubular matter.

Referring to FIG. 9, and to the process 900 illustrated therein, in step 902 the halloysite material is obtained from a clay deposit, and in step 904 the halloysite material thus obtained is mixed with a sufficient amount of water, preferably deionized water, to prepare a suspended slurry of such halloysite containing at least 60 volume percent of water. In one embodiment, such slurry contains at least 90 volume percent of water.

The mixing conducted in step 904 should preferably be relatively gentle so as not to disturb the structural integrity of the halloysite tubules. In one embodiment, a magnetic stirrer operated at a speed of about 1 revolution per minute is used for about 5 minutes or until a substantially homogeneous slurry is produced.

In step 906, the pH of the slurry produced in step 904 is manipulated to first decrease such pH and then to increase. In general, prior to step 906, the pH of the slurry produced in step 904 will be from about 6 to about 7. The pH of this slurry is then preferably decreased to a pH of from about 2 to 5. In one embodiment, the pH of the slurry is decreased to a pH of from about 2 to about 4. In another embodiment, the pH of the slurry is decreased to a pH of from about 2.5 to about 3.5.

One may decrease the pH of the slurry by adding an acid to it, such as nitric acid and/or acetic acid and/or phosphoric acid. In one aspect of this process, the slurry is gently stirred while such acid is being added until the desired pH end point is reached.

In one embodiment, while acid is added to the slurry to decrease its pH, deionized water is also added to the slurry to facilitate the mixing and homogeneous dispersion of acid.

In step 908 of the process, and after a homogeneous dispersion has been obtained with the desired pH of from about 2 to about 5 in step 906, it is preferred to then increase the pH of the slurry to a pH of from about 8 to about 10. In one embodiment, in step 908 the pH is increased to a pH of from about 8.5 to about to about 9.5.

One may add a suitable pH-increasing agent in step 908, such as, e.g., ammonium hydroxide. Additionally, one may also add additional water to the system to facilitate the homogeneous mixing thereof.

Without wishing to be bound to any particular theory, applicants believe that this manipulation of the pH in steps 906 and 908 weakens the attractive forces between the halloysite tubules and/or between the halloysite particulate matter and/or between the tubules and the particulate matter.

After the pH of the slurry has been increased to the desired range, and in step 910, the slurry is gently stirred, preferably by a magnetic stirrer, while being maintained at a temperature of at least about 30 degrees Celsius and, more preferably at least about 40 degrees C. In one embodiment, the temperature of the slurry is maintained blow 80 degrees Celsius but preferably at least about 50 degrees Celsius (and more preferably, at least about 60 degrees Celsius). The stirring in step 910 should preferably occur for at least 1 about 1 hour and, more preferably, at least about 2 hours, until a uniform dispersion of the material has been obtained. It is preferred to stir the material in step 910 for at least 2 hours and, more preferably, for at least about 4 hours. In one embodiment, the material in step 910 is stirred for at least about 8 hours and, more preferably, for at least 12 hours.

In one embodiment, and referring again to step 910, it is preferred that the slurry contain less than 1 volume percent of particles larger than 2 millimeter.

In step 912, after a uniform dispersion of the material has been obtained in step 910, the slurry is preferably mechanically accelerated by shaking, centrifugation, sonic vibration, or other means to further separate the slurry components with different specific masses. One may use conventional separation means such as, e.g., conventional centrifugation means. Reference may be had, e.g., to U.S. Pat. No. 3,599,861 (centrifuge for separation of mixtures of solids and liquids of different weights), U.S. Pat. No. 3,948,770 (centrifuge for separation of suspensions), U.S. Pat. No. 3,948,771 (method and apparatus for separating suspended matter from a fluid by centrifugal force), U.S. Pat. No. 3,955,754 (continuously operating centrifuge having a plurality of separating screens), U.S. Pat. No. 4,015,773 (centrifuge for separating solids from liquids), U.S. Pat. No. 4,129,249 (centrifuge for separating solids and liquids), U.S. Pat. No. 4,247,392 (screen for vibrating centrifugal separation machines), U.S. Pat. No. 4,261,507 (separating centrifuge), U.S. Pat. No. 4,339,072 (centrifuge for separating solids/liquids mixtures), U.S. Pat. No. 4,378,289 (method and apparatus for centrifugal separation), U.S. Pat. No. 4,413,771 (method and apparatus for centrifugal separation), U.S. Pat. No. 4,413,772 (apparatus for centrifugal separation), U.S. Pat. No. 4,413,773 (method an apparatus for centrifugal separation), U.S. Pat. No. 4,457,746 (apparatus for centrifugal separation), U.S. Pat. No. 4,478,718 (centrifugal separation apparatus), U.S. Pat. No. 4,533,468 (centrifugal separation method and apparatus), U.S. Pat. No. 4,648,864 (centrifugal separator and method of separating buoyant particles from a liquid), U.S. Pat. No. 4,673,491 (process and apparatus for the centrifugal separation of fine-grain mineral mixtures), U.S. Pat. No. 4,729,760 (apparatus for the centrifugal separation of a mixture of phases), U.S. Pat. No. 4,824,429 (centrifuge for separating liquids), U.S. Pat. No. 5,182,020 (centrifuge separating systems), U.S. Pat. No. 5,229,014 (high efficiency centrifugation device), U.S. Pat. No. 5,776,618 (centrifugal separating filter), U.S. Pat. No. 5,792,039 (decanter centrifuge for separating feed suspensions into fractions), U.S. Pat. No. 5,843,211 (method and apparatus for separating a heavier phase from a lighter phase in a material flow by centrifugal force), U.S. Pat. No. 6,063,019 (centrifuge with rotatable tube), U.S. Pat. No. 6,267,899 (centrifugal separation apparatus), and the like. The entire disclosure of each of these United States patents is hereby incorporated by reference into this specification.

Referring again to FIG. 9, and to step 912 thereof, and in one embodiment, one may dispose the slurry in tubes of various sizes (such as about 1 milliliter, 10 milliliters, 100 milliliters, etc.) and then centrifuge such tubes/samples at a rotational speed of from about 1 to about 20,000 rpm for at least about 5 minutes. In one embodiment, such centrifugation occurs for at least 10 minutes and, more preferably, for at least about 30 minutes. In another embodiment, such centrifugation occurs for at least about 1 hour.

Thereafter, and in step 914, the "supernatant liquid" is decanted in step 914. Without wishing to be bound to any particular theory, applicants believe that this supernatant liquid contains undesirable impurities such as, e.g., organic matter.

The solid phase obtained in step 914 is then resuspended in step 916, preferably in accordance with the procedure set forth for step 904, preferably with deionized water. The resuspended solids may then be separated into their constituent size fractions by conventional means in step 918 such as, e.g., by wet sieving.

One may use any of the wet sieving devices described in the prior art. Thus, by way of illustration and not limitation, one may use the automated wet sieving device disclosed in U.S. Pat. No. 4,116,824, the entire disclosure of which is hereby incorporated by reference into this specification. This patent claims (in claim 1 thereof) "1. An automated wet sieving apparatus comprising: (a) distributing means for supplying wetting liquid to a sieve containing particles to be sieved; (b) eccentric drive means connected to said distributing means for driving said distributing means in an orbital path about a vertical axis generally perpendicular to and generally in the center of said sieve; and (c) vacuum and pressure creating means actuated by said eccentric drive means for alternately creating vacuum and pressure below the sieves, to draw undersized particles through the sieve and loosen particles which may blind the sieve openings."

As will be apparent to those skilled in the art, by the separation process of step 918, one will obtain a multiplicity of differently sized fractions that may be removed from the wet sieving device 918 via lines 920, 922, and 924. In step 926, each of these fractions may be separately subjected to process 900 (and to steps 904 and/or 906 and/or 908 and/or 910 and/or 912 and/or 914 and/or 916 and/or 918) to provide many more differently sized fractions, any of which may then be used in the process depicted in FIG. 8.

Referring again to FIG. 8, and in one preferred embodiment thereof, once halloysite rods have been obtained in step 802, the rods then conveyed via line 803 to coating apparatus 804, wherein the rods are coated onto a supporting substrate. As previously discussed elsewhere in this specification, this substrate may be a flexible substrate. In one embodiment, the flexible substrate is stainless steel. In another embodiment, the substrate is a flexible polymeric substrate. In one such embodiment, the flexible polymeric substrate is a polyanionic substrate.

In one embodiment, the substrate is flexible. In one embodiment, the substrate is substantially impermeable to hydrogen. Such peremeability, or lack thereof, may be tested by a process in which the candidate material for the substrate is formed into a container, and hydrogen is flowed into the container at a pressure of 2,000 pounds per square inch (p.s.i.). Thereafter, the container is capped and heated at a temperature of 500 degrees Celsius for 10 minutes. Thereafter, the hydrogen pressure within the container is determined. A "hydrogen impermeable" substrate is one that, under the conditions of this test, maintains the pressure within about 1 percent of the original pressure.

Methods for coating halloysite onto a polyanionic substrate are known. Reference may be had to the aforementioned paper by Yuri M. Lvov, entitled "Nanofabrication of ordered multilayers by alternate adsorption of polyions, nanoparticles and proteins: From planer films to microtemplates." [online], [retrieved on 2005 Mar. 27]. <URL: http://www2.1atech.edu/~ylvov/research.html>. In this paper it is disclosed that "A cleaned substrate of any shape and dimension is immersed into a dilute solution of a cationic polyelectrolyte, for a time optimized for the adsorption of a monolayer (ca 1 nm thick), then is rinsed and dried. The next step is the immersion of the polycation covered substrate into a dilute dispersion of polyanion or negatively charged nanoparticles (or any other nanosized charged species) also for a time optimized for the adsorption of a monolayer, then rinsed and dried. These operations complete the self-assembly of a polyelectrolyte monolayer and monoparticulate layer sandwich unit onto the substrate. . . Subsequent sandwich units are self-assembled analogously." The same paper also discloses that "At pH above 4 halloysite is negatively charged" and may thus serve as a "nanosized charged species." A variety of polycations (positively charged polymers) may be used to facilitate the binding of anionic halloysite to the substrate. For example, one may use poly(ethyleneimine) (PEI), poly(dimethyldiallylammonium chloride) (PDDA), poly(allylamine) (PAH), polylysine, chitosan, and the like. In this manner, Lvov provided a variety of substrates with halloysite attached. Lvov provided both monolayered halloysite (thickness of approximately 54±5 nm) and multilayered (thickness of approximately 720 nm) halloysite. The resulting polyanion films were ". . . insoluble in water and in many organic solvents and are stable to at least 200° C."

Referring again to step 804, after the halloysite tubules are coated onto the substrate, the coated assembly may be formed into a container; in one embodiment, a sealed storage container is formed about the substrate(s). In one embodiment the sealed storage container is formed about a single coated substrate (see FIG. 6). In another embodiment, the sealed storage container is formed about a plurality of coated substrates (see FIG. 7). In another embodiment (not shown) the sealed storage container is formed prior to step 804.

Prior to or after the formation of the sealed container (and preferably the latter), hydrogen is stored within the lumen of the halloysite rods. This storage may be effected by conventional means such as, e.g., the processes used to store hydrogen in carbon nanotube assemblies. Reference may be had, e.g., to U.S. Pat. No. 6,159,538 to Rodriguez (Method For Introducing Hydrogen Into Layered Nanostructures); U.S. Pat. No. 6,672,077 to Bradley (Hydrogen Storage In Nanostructure With Physisorption); U.S. Pat. No. 6,596,055 to Cooper (Hydrogen Storage Using Carbon-Metal Hybrid Compositions); U.S. Pat. No. 6,591,617 to Wolfe (Method And Apparatus For Hydrogen Storage And Retrieval); U.S. Pat. No. 6,290,753 to Maeland (Hydrogen Storage In Carbon Material); U.S. Pat. No. 6,517,800 to Cheng (Production Of Single-Walled Carbon Nanotubes By a Hydrogen Arc Discharge Method); U.S. Pat. No. 6,294,142 to Nazri (Hydrogen Storage Systems and Method of Making Them); and the like. The content of each of the aforementioned patents is hereby incorporated by reference into this specification.

To get the hydrogen out of the halloysite rods, it is preferred to heat the assembly to a temperature of from about 500 to about 800 degrees Celsius.

Referring again to FIG. 8, and in another embodiment thereof, the tubules separated in step 802 are preferably dried to remove excess water; these tubules preferably have a maximum dimension of 3 microns. The tubules may, e.g. be air dried. Alternatively, they may be heated in a drying oven at a temperature of less than about 80 degrees Celsius for at least one hour. In one embodiment, a drying temperature of from about 50 to about 75 degrees Celsius is used for at least about 6 hours and, more preferably, for at least about 12 hours.

Referring again to FIG. 8, and in one preferred embodiment, the purified tubular material from step 802 is conveyed via line 803 to mixer 806, wherein other material(s) may be added to the tubules via line 801.

In one embodiment, and referring again to step 806, and referring again to step 806, porous glass fibers and/or porous glass beads and/or halloysite particulate matter and/or carbon nanotubes are mixed with the halloysite tubules in such step 806. Alternatively, or additionally, one may mix other halloysite tubules and/or other materials with the halloysite tubules from step 802.

In the process depicted in FIG. 9, the wet sieving step produced at least three different size fractions (see lines 920, 922, and 924) that, in turn, could be further treated to produce many more size fractions. One or more of these differently sized fractions may be added in step 806 to produce a halloysite mixture comprised of differently sized materials and different physical properties.

As will be apparent to those skilled in the art, by controlling the ratios and concentrations of the differently sized fractions, one may design a composition with a desired elution profile. Some of the tubules in the composition may, e.g., be designed to elute their material relatively quickly, say, e.g., within about 1 month; while others of the tubules in the composition may, e.g., be designed to elute their material relatively slowly, say, e.g., within about 1 year or more.

Figure 10:
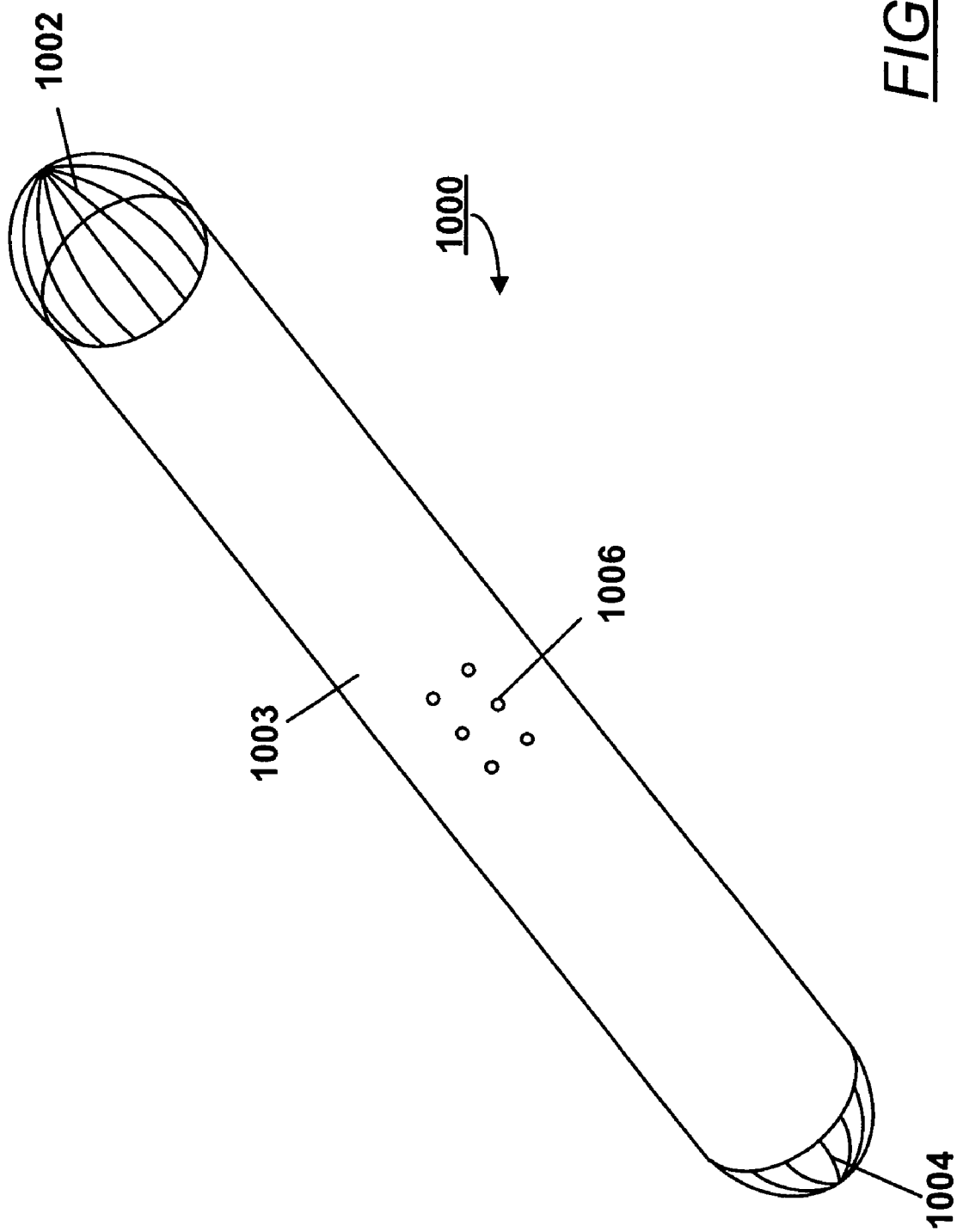
FIG. 10 is a schematic illustration of one preferred type of capped halloysite tubule.

In one embodiment, a multiplicity of capped halloysite tubules 1000 (see FIG. 10) are added during step 806. In one aspect of this embodiment, the capped halloysite tubules are loaded with a desired "eluting material" prior to the time they are admixed in step 806.

Any of the halloysite tubules, whether capped or uncapped, may be loaded with a desired elution material either before or after step 806. Thus, e.g., one may use one or more of the elution materials disclosed as "active agents" in the prior art.

In one preferred embodiment, while the materials are being mixed in step 806, it is preferred to reduce their particle size (if not already so reduced) so that at least about 90 weight percent of such material has a size within the range of from about 0.1 to about 100 nicrons and, more preferably, from about 0.1 to about 10 microns. In one embodiment, at least 90 weight percent of such material has a size within the range of from about 0.1 to about 5 microns. In another embodiment, at least 90 weight percent of such material has a size within the range of from about 0.1 to about 2 micron.

Some of the active agents that may be incorporated into the halloysite tubules are discussed in U.S. Pat. No. 5,651,976, the entire disclosure of which is hereby incorporated by reference into this specification. This patent discloses that "Active agents are chemicals that have some effect in some environment of use. For almost any active agent, for use in almost any use environment, it is desired to modulate the release of the active agent into the use environment, so that the active agent is released into the use environment at a selected rate, and over a selected time. There are several, frequently complementary, reasons for modulating active agent release."

U.S. Pat. No. 5,651,976 also discloses that "Many active agents are preferably released at a desired concentration, or in a desired concentration range. Drugs, for example, are preferably introduced into the body within a therapeutic range. Below this range, there will not be enough of the drug in the body to achieve the desired therapeutic effect. Above this range, no additional therapeutic effect will be conferred, or adverse side effects of the drug will outweigh the therapeutic effect of the drug."

U.S. Pat. No. 5,651,976 also discloses that "Analogous dynamics are at work for most every active agent. As another example, antifouling agents for use on ship hulls are typically environmentally unfriendly. Thus, it is desired to control the release rate of these antifouling agents, to keep their release into the environment at an acceptable level. At the same time, it is desired to release these antifouling agents at effective levels. See generally U.S. Pat. No. 5,049,382, issued Sep. 17, 1991 to Price et al."

U.S. Pat. No. 5,651,976 also discloses that "Likewise, many active agents are preferably released at a sustained rate over a desirable period. For example, many drugs (e.g., antibiotics) are preferably absorbed and metabolized by the body over a prolonged therapeutic course of treatment. Traditionally, this is done by administering repeated, regular doses (e.g., regular oral or injected doses), or by a sustained administration, such as an intravenous drip. Other drugs (e.g., antihypertensive drugs, birth control hormones) do not have a finite course of treatment. For these drugs, sustained controlled delivery is a matter of convenience and an assurance against a lapse of memory."

U.S. Pat. No. 5,651,976 also discloses that "Sustained delivery is also desired for many other active agents. For antifouling agents, it is highly desirable to sustain delivery of an effective amount of the antifouling agent for as long as possible, to maximize the time between applications of the agent. For pesticides, pheromones, and other active agents used to control pest populations, sustained delivery of these agents for at least the duration of a growth or reproduction cycle is highly desirable. See generally U.S. Pat. No. 4,017,303, issued Apr. 12, 1977 to Coplan et al."

U.S. Pat. No. 5,651,976 also discloses that "Polymers and other carriers are sometimes used for the modulated release of an active agent that has at least some solubility in these carriers. In these applications, the active agent is mixed with the carrier, to dissolve the active agent in the carrier. As the active agent diffuses through the carrier to the interface of the carrier and the use environment, the active agent is released into the use environment. Typical examples of such systems are flea and tick collars for pets. Unfortunately, many active agents have undesirably low solubility in many of the available carriers. A consequence of this low solubility is that in many instances, the delivery system will contain only an undesirably small amount of the active agent, limiting the useful life of the delivery system. For example, flea and tick collars for pets have undesirably short useful lives, shorter than the flea and tick seasons in many parts of the country. A delivery system that would permit the inclusion of a larger volume of active agent in a delivery system is desired. Also, many of these polymers used in modulated release applications are environmentally unfriendly."

U.S. Pat. No. 5,651,976 also discloses that "In preferred embodiments of the invention, an active agent is adsorbed onto the inner surface of the lumen of a mineral microstructure. Skilled practitioners will be able to employ known techniques for introducing a wide range of active agents into the lumen of a mineral microstructure according to the invention, thereby making a structure for the modulated release of the active agent. Such structures according to the invention may be used as-is, i.e., as free structures which may be dispensed as desired. Dispensing techniques include scattering, spreading, injecting, etc."

U.S. Pat. No. 5,651,976 also discloses that "Such structures may be included in a surrounding matrix, such as a paint or a polymer. After release from the mineral microstructures, the active agent then diffuses through the surrounding matrix to interface with the use environment. If the surrounding matrix is ablative in the use environment, then the diffusion distance through the matrix is mitigated or eliminated by this ablation."

U.S. Pat. No. 5,651,976 also discloses that "Suitable surrounding matrices will typically be insoluble in the use environment. These matrices include paints (including marine paints), stains, lacquers, shellacs, wood treatment products, and all manner of applied coatings."

The mixtures of this invention may have tubular material that contains both an active agent and a carrier. U.S. Pat. No. 5,651,976 also discloses that "In another embodiment of the invention, the lumen of the microstructure contains both an active agent and a carrier. This carrier further modulates the release of the active agent from the lumen of the microstructure. The active agent may be soluble or mobile in the carrier. In this case, the release rate of the active agent will depend on the solubility and diffusion rate of the active agent through the carrier and any coating or matrix. The active agent may be insoluble or immobile in the carrier. In this case, the release rate of the active agent will depend on the release rate of the carrier from the tubule, and any coating or matrix."

The mixtures of this invention may have tubular material that contains a coating such as, e.g., a coating of nanomagnetic material. U.S. Pat. No. 5,651,976 also discloses that "In another embodiment of the invention, the microstructure is coated with a coating material. This coating further modulates the release of the active agent from the lumen of the microstructure. By carefully selecting a coating for its chemical and physical properties, very precise control of the release of the active agent from the lumen of the microstructure can be achieved." These nanomagnetic coatings are described and claimed in Xingwu Wang's U.S. Pat. No. 6,506,972 (magnetically shielded conductor), U.S. Pat. No. 6,673,999 (magnetically shielded assembly), U.S. Pat. No. 6,713,671 (magnetically shielded assembly), U.S. Pat. No. 6,765,144 (magnetic resonance imaging coated assembly), U.S. Pat. No. 6,768,053 (optical fiber assembly), U.S. Pat. No. 6,815,609 (nanomagnetic composition), U.S. Pat. No. 6,844,492 (magnetically shielded conductor) U.S. Pat. No. 6,846,985 (magnetically shielded conductor), U.S. Pat. No. 6,864,418 (nanomagnetically shielded substrate), and U.S. Pat. No. 6,876,886 (magnetically shielded conductor). The entire disclosure of each of these U.S. Patents is hereby incorporated by reference into this specification.

For additional disclosure on how to incorporate nanomagnetic material into and/or onto halloysite tubules, reference also may be had to Xingwu Wang's published United States patent applications US 20040210289 (novel nanomagnetic particles), US20040226603 (optical fiber assembly), US20040254419 (therapeutic assembly), US20050119725 (energetically controlled delivery of biologically active material from an implanted device), US20050025797 (medical device with low magnetic susceptibility), US20050079132 (medical device with low magnetic susceptibility), and US20050107870 (medical device with multiple coating layers). The entire disclosure of each of these published U.S. patent applications is hereby incorporated by reference into this specification.

Referring again to U.S. Pat. No. 5,651,976, and to the coatings it describes, such patent discloses that "For example, a thermoset polymer may be used as a coating in a preferred embodiment of the invention. By carefully selecting the degree of crosslinking in a thermoset polymer coating, and thus the porosity of the thermoset polymer coating, one can obtain a precise degree of control over the release of the active agent from the lumen of the microstructure. Highly crosslinked thermoset coatings will retard the release of the active agent from the lumen more effectively than less crosslinked thermoset coatings."

U.S. Pat. No. 5,651,976 also discloses that "Likewise, the chemical properties of a coating may be used to modulate the release of an active agent from the lumen of a microstructure. For example, it may be desired to use a hydrophobic active agent in an aqueous use environment. However, if one were to load a highly hydrophobic active agent into the lumen of a microstructure according to the invention, and then place this loaded microstructure in an aqueous use environment, the active agent typically would release into the use environment unacceptably slowly, if at all."

U.S. Pat. No. 5,651,976 also discloses that "This problem of active agents that are highly insoluble in an intended use environment is a common one. Many antibiotics are highly insoluble in the serum. This problem can be largely mitigated by coating the microstructures with a coating material in which the active agent has an intermediate solubility (i.e., a solubility somewhere between the solubility of the active agent in itself and the solubility of the active agent in the use environment)."

U.S. Pat. No. 5,651,976 then presents a list of coatings that also may be used in the mixtures of the instant invention. Such patent discloses that "A wide range of active agents will be suitable for use in the present invention. These suitable active agents include pesticides, antibiotics, antihelmetics, antifouling compounds, dyes, enzymes, peptides, bacterial spores, fungi, hormones, etc."

U.S. Pat. No. 5,651,976 also discloses that "Suitable herbicides include tri-chloro compounds (triox, ergerol), isothiazoline, and chlorothanolil (tufficide). Suitable pesticides include malathion, spectricide, and rotenone. Suitable antibiotics include albacilin, amforol, amoxicillin, ampicillin, amprol, ariaprime, aureomycin, aziumycin, chloratetracycline, oxytetracycline, gallimycin, fulvicin, garacin, gentocin, liquamicin, lincomix, nitrofurizone, penicillin, sulfamethazine, sulfapyridine, fulfaquinoxaline, fulfathiozole, and sulkamycin. Suitable antihelmetics include ivermictin, vetisulid, trichorofon, tribrissen, tramisol, topazone, telmin, furox, dichlorovos, anthecide, anaprime, acepromazine, pyrantel tartrate, trichlofon, fanbentel, benzimidazoles, and oxibenzidole. Suitable antifouling agents include ergerol, triazine, decanolactone, angelicalactone, galactilone, any lactone compound, capsicum oil, copper sulphate, isothiazalone, organochlorine compounds, organotin compounds, tetracyclines, calcium ionophores such as 504, C23187, tetracycline. Suitable hormones include estrogen, progestin, testosterone, and human growth factor."

U.S. Pat. No. 5,651,976 then proceeds to list many of the carriers that may be used in applicants' mixtures. It discloses that "Carriers are selected in view of their viscosity and the solubility of the active agent in the carrier. The carrier typically should possess a sufficiently low viscosity to fill the lumen of the microstructure. Alternatively, a low viscosity carrier precursor may be used, and the carrier formed in situ. For example, the lumen may be filled with a low viscosity monomer, and this monomer subsequently may be polymerized inside the lumen. Accordingly, suitable carriers include low molecular weight polymers and monomers, such as polysaccharides, polyesters, polyamides, nylons, polypeptides, polyurethanes, polyethylenes, polypropylenes, polyvinylchlorides, polystyrenes, polyphenols, polyvinyl pyrollidone, polyvinyl alcohol, ethyl cellulose, gar gum, polyvinyl formal resin, water soluble epoxy resins, quietol 651/nma/ddsa, aquon/ddsa/nsa, urea-formaldehyde, polylysine, chitosan, and polyvinylacetate and copolymers and blends thereof."

U.S. Pat. No. 5,651,976 also discloses that "Frequently, skilled practitioners may desire to select a carrier that has a very highly selective binding affinity for an active agent of interest. A carrier that has a highly selective binding affinity for an active agent will tend to release that active agent very slowly. Thus, very slow release rates may be achieved by the use of carriers with high binding affinities for the active agent to be released. Skilled practitioners will recognize that a consequence of the extensive research that has been done on surface acoustic wave (SAW) analysis is that a large number of polymers have been identified as selective adsorbents for particular organic analytes. See generally, D. S. Ballantine, Jr., S. L. Rose, J. W. Grate, H. Wohltjen, Analytical Chemistry 58 3058-66 (1986), and references therein, incorporated by reference herein. See also R. A. McGill et al., "Choosing Polymer Coatings for Chemical Sensors", CHEMTECH 24 (9) 27-37, and references therein, incorporated by reference herein."

U.S. Pat. No. 5,651,976 also discloses that "Preferred carriers include polylactate, polyglycolic acid, polysaccharides (e.g., alginate or chitosan), and mixtures thereof. Each of these carriers is biodegradable. When used in combination with a naturally occurring mineral microtubule, such biodegradable carriers provide an environmentally friendly delivery system."

U.S. Pat. No. 5,651,976 was issued to Ronald R. Price. One may use one or more of the active agents and/or carriers and/or coatings disclosed in other patents of Ronald R. Price including, e.g., U.S. Pat. No. 5,492,696 (controlled release microstructures), U.S. Pat. No. 5,705,191 (sustained delivery of active compounds from tubules, with rational control), U.S. Pat. No. 6,280,759 (method of controlled release and controlled release microstructures), and the like. The entire disclosure of each of these United States patents is hereby incorporated by reference into this specification.

After the desired mixture has been formed in step 806, it is optionally conveyed via line 807 to former 808, wherein it is formed into a "green body" having a controlled size, shape, and surface and a particular density and microstructure. One may form such a "green body" by well known ceramic forming processes. Reference may be had, e.g., to U.S. Pat. No. 3,920,781 (method of forming a ceramic dielectric body), U.S. Pat. No. 4,343,604 (die for extruding ceramic material to form a body of cellular structure), U.S. Pat. No. 4,518,704 (activated carbon formed body and method of producing same), U.S. Pat. No. 4,931,242 (method of forming shaped body to be sintered), U.S. Pat. No. 5,156,856 (mold for forming molded body), U.S. Pat. No. 5,174,935 (method of forming a ceramic body), U.S. Pat. No. 5,215,697 (method of forming shaped body from fine particles with carrier fluid under pressure gradient), U.S. Pat. No. 5,294,393 (method of forming shaped body from fine particles), U.S. Pat. No. 5,296,175 (method of forming a molded body), U.S. Pat. No. 5,714,025 (process for forming a ceramic body), U.S. Pat. No. 6,698,267 (method and impact machine for forming a body), and the like. The entire disclosure of each of these United States patents is hereby incorporated by reference into this specification.

Referring again to FIG. 8, and to step 810, the green body formed in 808 may be conveyed via line 815 for initial heat treatment in step 810. Alternatively, the formation of such green body in step 808 may be omitted, and the mixture formed in step 806 may be directly conveyed via line 813 for initial heat treatment in step 810. Alternatively, the formation of a mixture in step 806 may be omitted, and the purified halloysite rods from step 802 may be conveyed via line 811 for initial heat treatment in step 810. Alternatively, or additionally, any of the distinctly sized particles in lines 920 and/or 922 and/or 924 (see FIG. 9) (may be heat treated in step 810) prior to or after the time they are mixed in step 806. Alternatively, the coated substrate formed in step 804 may be initially heat treated in step 810.

In the first step of the heat treatment process of step 810, the material/assembly to be heat dried is placed in a heating vessel (such as an oven), and its temperature is quickly raised from about ambient temperature (about 30 degrees Celsius) to a temperature of about 500 degrees Celsius at a rate of at least about 10 degrees per minute, and, more preferably, at least about 20 degrees per minute. In one embodiment, the heating rate is at least about 50 degrees per minute. In another embodiment, the high heating rate is at least about 100 degrees per minute.

Without wishing to be bound to any particular theory, it is believed that the use of this relatively high heating rate allows the removal of water from the material/assembly to be treated while retaining the halloysite tubular structure. In one embodiment, depicted in step 810, a vacuum is applied via line 824 to facilitate the removal of water from the system.

In another embodiment, not shown, the material/assembly to be treated is heated from ambient to a temperature of about 800 degrees Celsius at a rate of from about 0.1 to about 10 degrees per minute, and, more preferably, from about 0.5 to about 1.5 degrees per minute. In one aspect of this embodiment, the heating rate varies from about 0.8 to about 1.2 degrees per minute.

Regardless of the heat treatment regimen used in step 810, it is preferred to rapidly produce a material/assembly that contains less than about 5 weight percent of water (and, more preferably, less than about 1 weight percent of water). In one embodiment, the material/assembly also preferably contains less than about 1 weight percent of carbonaceous material.

In one embodiment, the coated or uncoated halloysite rods are heat treated in step 810 after they have been disposed within the container 12 (see FIG. 1). One may first dispose these materials onto substrate 306, roll it up, shake it, and then heat treat it.

In optional step 814, after the material/assembly has been rapidly raised to a temperature of between about 500 and 800 degrees Celsius, it is held at this temperature and "soaked" Such "soaking" may optionally occur at a temperature of from between about 500 to about 800 degrees Celsius for from about 10 minutes to 12 hours. In one embodiment, the soak period is from about for 30 minutes to 1.5 hours. In another embodiment, the soak period is from about 50 to about 70 minutes. Without wishing to be bound to any particular theory, applicants believe that this soaking step 814 imparts structural rigidity to the halloysite material/assembly. After the soaking step 814, one may cool the material/assembly to ambient temperature.

Alternatively, and after the initial heat treatment 810, one may subject the material/assembly to be treated to a secondary heat treatment in step 816. In this step 810, the temperature of the material/assembly is raised from the "soak temperature" to a temperature of about 1,000 degrees Celsius at a heating rate of at least about 10 degrees per minute and, more preferably, at least about 20 degrees per minute. In one embodiment, the heating rate is at least about 50 degrees per minute. In another embodiment, the high heating rate is at least about 100 degrees per minute.

In secondary heating step 816, after the material/assembly has reached a temperature of about 1,000 degrees Celsius, it is quenched to suddenly cool it and reduce its temperature to ambient at a rate of at least about 200 degrees per minute. One may use conventional means of effectuating such quenching such as, e.g., water or liquid nitrogen. Reference may be had to, e.g., U.S. Pat. No. 3,887,524 (quenching with liquid medium), U.S. Pat. No. 4,201,570 (process for quenching of fine particulates), U.S. Pat. No. 4,523,748 (very high pressure apparatus for quenching), U.S. Pat. No. 4,960,571 (quench assembly design), U.S. Pat. No. 4,992,112 (annealing and quenching method), U.S. Pat. No. 5,178,814 (quenching method and apparatus), U.S. Pat. No. 5,464,057 (quench cooler), U.S. Pat. No. 5,651,925 (process for quenching molten ceramic material), U.S. Pat. No. 5,816,322 (quench cooler), U.S. Pat. No. 5,839,271 (quench cooler), U.S. Pat. No. 6,132,534 (liquid quenching apparatus and method), U.S. Pat. No. 6,648,997 (quenching method), and the like. The entire disclosure of each of these United States patents is hereby incorporated by reference into this specification.

The secondary heat treatment 821 produces a capped inorganic tubule 1000 comprised of tubular portion 1003 and porous capped ends 1002 and 1004. When active agent(s) 1006 are disposed within such tubule 1000, their elution rate from such tubule 1000 is slower than the eluton rate from a similar tubule without capped ends 1002 and 1004. The uncapped tubule (not shown) is produced in, e.g., step 814.

By the appropriate choice of materials and concentrations, one may produce mixtures of halloysite materials with "engineered properties" that contain tubules that are uncapped and/or capped, heat treated and/or not heat treated, tubular or non-tubular (and, when tubular, with different cross-sectional shapes such as, e.g., circular, rectangular, etc.), long and/or short, with different aspect rations, with or without porous glass beads and/or porous glass fibers and/or mullite and/or carbon nanotubes and/or active ingredient, etc. Some or all of the components of such mixture may be coated, e.g., with biodegradable coatings and/or nanomagnetic material, and some or all of the tubules may have carrier material disposed therein or theron.

In one embodiment, the mixture of this invention contains both halloysite rods and microspheres, such as glass microspheres. In one aspect of this embodiment, such mixture contains at least about 50 weight percent of such halloysite rods and, more preferably, at least about 60 weight percent of such halloysite rods. In another aspect of such this embodiment, the mixture contains at least about 70 weight percent of such halloysite rods and, more preferably, at least about 80 weight percent of halloysite rods. In one aspect of this embodiment, the microspheres are porous glass microspheres and the mixture contains at least about 90 weight percent of such halloysite rods.

In one embodiment, the mixture of this invention contains such halloysite rods and has an average particle size such that at least 95 weight percent of its particles are smaller than about 100 microns. In another embodiment, the mixture of this invention contains such halloysite rods and has an average particle size such that at least 95 weight percent of its particles are smaller than about 2 microns.

In one embodiment, the mixture of this invention is present in a formulation such as a tablet, a capsule, an injectable formulation, and/or a cream. In one aspect of this embodiment, the formulation also contains an "active ingredient" (such as a compound and/or drug) at a loading of from about 1 to about 99 weight percent.

In one embodiment, the mixture of this invention is present in a formulation that is insoluble in deionized water at a temperature of 21 degrees Celsius and under 1 atmosphere.

In one embodiment, the mixture of this invention is present in a formulation that, at a relative humidity of 30 percent, is stable.

In one embodiment, the mixture of this invention is present in a formulation that is non-hydroscopic.

In one embodiment, the mixture of this invention is present in a formulation that is non-biodegradable. In another embodiment, the mixture of this invention is present in a formulation that is partially biodegradable.

In one embodiment, the mixture of this invention is present in a formulation that is nonimmunogenic.

In one embodiment, the mixture of this invention is present in a slurry formulation where the suspending agent may be, e.g., water, organic solvent, etc.

It is therefore, apparent that there has been provided, in accordance with the present invention, a method and apparatus for the storage of molecular hydrogen. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An enclosure assembly comprised of an enclosure defining a volume, wherein said enclosure is comprised of a multiplicity of inorganic tubules, wherein at least 100 of said inorganic tubules are present for each cubic micron of said volume of said enclosure, and wherein said enclosure has a storage capacity of at least 20 grams of hydrogen per liter of said volume of said enclosure.

2. An enclosure assembly comprised of an enclosure defining a volume, wherein said enclosure is comprised of a multiplicity of hydrated halloysite tubules, wherein at least 100 of said inorganic tubules are present for each cubic micron of said volume of said enclosure, and wherein said enclosure has a storage capacity of at least 20 grams of hydrogen per liter of said volume of said enclosure.

3. The enclosure assembly as recited in claim 2, wherein said hydrated halloysite tubules have an average length of at least about 1 micron.

4. The enclosure assembly as recited in claim 2, wherein said hydrated halloysite tubules have an average outside diameter of at least about 10 nanometers.

5. The enclosure assembly as recited in claim 2, wherein said hydrated halloysite tubules have an average outside diameter of at least about 50 nanometers.

6. The enclosure assembly as recited in claim 2, wherein said hydrated halloysite tubules have an average outside diameter of at about 80 to about 110 nanometers.

7. The enclosure assembly as recited in claim 2, wherein at least about 150 of such hydrated halloysite tubules are present for each cubic micron of said volume of said enclosure.

8. The enclosure assembly as recited in claim 1, wherein at least about 150 of such inorganic tubules are present for each cubic micron of said volume of said enclosure.

9. The enclosure assembly as recited in claim 2, wherein at least about 80 weight percent of said hydrated halloysite tubules have an aspect ratio of from about 1 to about 10.

10. The enclosure assembly as recited in claim 2, wherein at least about 80 weight percent of said hydrated halloysite tubules have an aspect ratio of from about 2 to about 8.

11. The enclosure assembly as recited in claim 2, wherein at least about 80 weight percent of said hydrated halloysite tubules have a surface to volume ratio of about 1 to about 10,000.

12. The enclosure assembly as recited in claim 2, wherein at least about 80 weight percent of said hydrated halloysite tubules have a surface to volume ratio of about 10 to about 1,000.

13. The enclosure assembly as recited in claim 2, wherein said enclosure assembly is a flexible enclosure assembly.

14. The enclosure assembly as recited in claim 13, wherein said enclosure is comprised of polymeric material.

15. The enclosure assembly as recited in claim 14, wherein said polymeric material is polyanionic polymeric material.

16. The enclosure assembly as recited in claim 15, wherein said polyanionic polymeric material is selected from the group consisting of poly(ethyleneimine), poly(dimethyldiallylammonium chloride), poly(allylamine), polylysine, chitosan, and combinations thereof.

17. An enclosure assembly comprised of an enclosure defining a volume, wherein said enclosure is comprised of a multiplicity of inorganic tubules and porous glass fibers
wherein said porous glass fibers comprise from about 1 to about 10 volume percent of the total volume of said inorganic tubules and said porous glass fibers, and wherein said enclosure has a storage capacity of at least 20 grams of hydrogen per liter of said volume of said enclosure.

18. The enclosure assembly as recited in claim 17, wherein at least 100 of said inorganic tubules are present for each cubic micron of said volume of said enclosure.

19. An enclosure assembly comprised of an enclosure defining a volume, wherein said enclosure is comprised of a multiplicity of hydrated halloysite tubules and porous glass fibers, wherein said porous glass fibers comprise from about 1 to about 10 volume percent of the total volume of said inorganic tubules and said porous glass fibers, and wherein said enclosure has a storage capacity of at least 20 grams of hydrogen per liter of said volume of said enclosure.

20. The enclosure assembly as recited in claim 19, wherein at least 100 of said hydrated halloysite tubules are present for each cubic micron of said volume of said enclosure.

21. The enclosure assembly as recited in claim 20, wherein said enclosure has a storage capacity of at least 21 grams of hydrogen per liter of said volume of said enclosure.

22. The enclosure assembly as recited in claim 20, wherein said enclosure has a storage capacity of at least 22 grams of hydrogen per liter of said volume of said enclosure.

23. The enclosure assembly as recited in claim 20, wherein said enclosure has a storage capacity of at least 23 grams of hydrogen per liter of said volume of said enclosure.

24. The enclosure assembly as recited in claim 20, wherein said enclosure has a storage capacity of at least 24 grams of hydrogen per liter of said volume of said enclosure.

25. An enclosure assembly comprised of an enclosure defining a volume, wherein said enclosure is comprised of a multiplicity of inorganic tubules and biochemically active material, wherein at least 100 of said inorganic tubules are present for each cubic micron of said volume of said enclosure, and wherein said enclosure has a storage capacity of at least 20 grams of hydrogen per liter of said volume of said enclosure.

26. An enclosure assembly comprised of an enclosure defining a volume, wherein said enclosure is comprised of a multiplicity of hydrated halloysite tubules and biochemically active material, wherein at least 100 of said inorganic tubules are present for each cubic micron of said volume of said enclosure, and wherein said enclosure has a storage capacity of at least 20 grams of hydrogen per liter of said volume of said enclosure.

27. An enclosure assembly comprised of an enclosure defining a volume, wherein said enclosure is comprised of a multiplicity of inorganic tubules and hollow glass fibers,
wherein said hollow glass fibers comprise from about 1 to about 10 volume percent of the total volume of said inorganic tubules and said hollow glass fibers, and wherein said enclosure has a storage capacity of at least 20 grams of hydrogen per liter of said volume of said enclosure.

28. The enclosure assembly as recited in claim 27, wherein at least 100 of said inorganic tubules are present for each cubic micron of said volume of said enclosure.

29. An enclosure assembly comprised of an enclosure defining a volume, wherein said enclosure is comprised of a multiplicity of hydrated halloysite tubules and hollow glass fibers, wherein said hollow glass fibers comprise from about 1 to about 10 volume percent of the total volume of said inorganic tubules and said porous glass fibers, and wherein said enclosure has a storage capacity of at least 20 grams of hydrogen per liter of said volume of said enclosure.

30. The enclosure assembly as recited in claim 29, wherein at least 100 of said hydrated halloysite tubules are present for each cubic micron of said volume of said enclosure.

31. An enclosure assembly comprised of an enclosure defining a volume, wherein said enclosure is comprised of a multiplicity of inorganic tubules and solid glass fibers,
   wherein said hollow glass fibers comprise from about 1 to about 10 volume percent of the total volume of said inorganic tubules and said solid glass fibers, and wherein said enclosure has a storage capacity of at least 20 grams of hydrogen per liter of said volume of said enclosure.

32. The enclosure assembly as recited in claim 31 wherein at least 100 of said inorganic tubules are present for each cubic micron of said volume of said enclosure.

33. An enclosure assembly comprised of an enclosure defining a volume, wherein said enclosure is comprised of a multiplicity of hydrated halloysite tubules and solid glass fibers, wherein said solid glass fibers comprise from about 1 to about 10 volume percent of the total volume of said inorganic tubules and said porous glass fibers, and wherein said enclosure has a storage capacity of at least 20 grams of hydrogen per liter of said volume of said enclosure.

34. The enclosure assembly as recited in claim 33, wherein at least 100 of said hydrated halloysite tubules are present for each cubic micron of said volume of said enclosure.

35. An enclosure assembly comprised of an enclosure defining a volume, wherein said enclosure is comprised of a multiplicity of inorganic tubules and glass fibers,
   wherein said glass fibers comprise from about 1 to about 10 volume percent of the total volume of said inorganic tubules and said glass fibers, and wherein said enclosure has a storage capacity of at least 20 grams of hydrogen per liter of said volume of said enclosure.

36. The enclosure assembly as recited in claim 35 wherein at least 100 of said inorganic tubules are present for each cubic micron of said volume of said enclosure.

37. An enclosure assembly comprised of an enclosure defining a volume, wherein said enclosure is comprised of a multiplicity of hydrated halloysite tubules and glass fibers, wherein said glass fibers comprise from about 1 to about 10 volume percent of the total volume of said inorganic tubules and said glass fibers, and wherein said enclosure has a storage capacity of at least 20 grams of hydrogen per liter of said volume of said enclosure.

38. The enclosure assembly as recited in claim 37, wherein at least 100 of said hydrated halloysite tubules are present for each cubic micron of said volume of said enclosure.

39. The enclosure assembly as recited in claim 37, wherein said glass fibers have an average outside diameter of from about 100 nanometers to about 1 micron.

40. The enclosure assembly as recited in claim 37, wherein said glass fibers have an average outside diameter of from about 200 to about 400 nanometers.

41. The enclosure assembly as recited in claim 37, wherein said glass fibers have an average outside diameter that is at least 1.5 as great as the average outside diameter of said hydrated halloysite tubules.

42. The enclosure assembly as recited in claim 37, wherein from about 1 to about 5 volume percent of said glass fibers, by total volume of said glass fibers and said hydrated halloysite tubules, is present in said enclosure.

43. An enclosure assembly comprised of an enclosure defining a volume, wherein said enclosure is comprised of a multiplicity of inorganic tubules, wherein said enclosure has a storage capacity of at least 20 grams of hydrogen per liter of said volume of said enclosure, and wherein said enclosure assembly has a flexural strength of at least about 4 MegaPascals.

44. The enclosure assembly as recited in claim 43, wherein said enclosure assembly has a flexural strength of at least about 10 MegaPascals.

45. The enclosure assembly as recited in claim 43, wherein said enclosure assembly has a flexural strength of at least about 100 MegaPascals.

46. The enclosure assembly as recited in claim 43, wherein at least 100 of said inorganic tubules are present for each cubic micron of said volume of said enclosure.

47. The enclosure assembly as recited in claim 44, wherein at least 100 of said inorganic tubules are present for each cubic micron of said volume of said enclosure.

48. The enclosure assembly as recited in claim 45, wherein at least 100 of said inorganic tubules are present for each cubic micron of said volume of said enclosure.

49. An enclosure assembly comprised of an enclosure defining a volume, wherein said enclosure is comprised of a multiplicity of hydrated halloysite tubules, wherein said enclosure has a storage capacity of at least 20 grams of hydrogen per liter of said volume of said enclosure, and wherein said enclosure assembly has a flexural strength of at least about 4 MegaPascals.

50. The enclosure assembly as recited in claim 49, wherein said enclosure assembly has a flexural strength of at least about 10 MegaPascals.

51. The enclosure assembly as recited in claim 49, wherein said enclosure assembly has a flexural strength of at least about 100 MegaPascals.

52. The enclosure assembly as recited in claim 49, wherein at least 100 of said inorganic tubules are present for each cubic micron of said volume of said enclosure.

53. The enclosure assembly as recited in claim 50, wherein at least 100 of said inorganic tubules are present for each cubic micron of said volume of said enclosure.

54. The enclosure assembly as recited in claim 51, wherein at least 100 of said inorganic tubules are present for each cubic micron of said volume of said enclosure.

55. An enclosure assembly comprised of an enclosure defining a volume, wherein said enclosure is comprised of a multiplicity of inorganic tubules, wherein said enclosure has a storage capacity of at least 20 grams of hydrogen per liter of said volume of said enclosure, and wherein said enclosure assembly has a compressive strength of at least 2000 kilograms per square centimeter.

56. The enclosure assembly as recited in claim 55, wherein said enclosure assembly has a compressive strength of at least about 3000 kilograms per square centimeter.

57. The enclosure assembly as recited in claim 55 wherein at least 100 of said inorganic tubules are present for each cubic micron of said volume of said enclosure.

58. The enclosure assembly as recited in claim 56, wherein at least 100 of said inorganic tubules are present for each cubic micron of said volume of said enclosure.

59. An enclosure assembly comprised of an enclosure defining a volume, wherein said enclosure is comprised of a multiplicity of hydrated halloysite tubules, wherein said enclosure has a storage capacity of at least 20 grams of hydrogen per liter of said volume of said enclosure, and wherein said enclosure assembly has a compressive strength of at least 2000 kilograms per square centimeter.

60. The enclosure assembly as recited in claim 59, wherein said enclosure assembly has a compressive strength of at least about 3000 kilograms per square centimeter.

61. The enclosure assembly as recited in claim 59 wherein at least 100 of said hydrated halloysite tubules are present for each cubic micron of said volume of said enclosure.

62. The enclosure assembly as recited in claim 60, wherein at least 100 of said hydrated halloysite tubules are present for each cubic micron of said volume of said enclosure.

* * * * *